United States Patent
Naruse et al.

(10) Patent No.: US 9,805,452 B2
(45) Date of Patent: Oct. 31, 2017

(54) IMAGE PROCESSING APPARATUS, IMAGE PROCESSING METHOD, PROGRAM, AND RECORDING MEDIUM

(71) Applicant: FUJIFILM Corporation, Tokyo (JP)

(72) Inventors: Yousuke Naruse, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/462,454

(22) Filed: Mar. 17, 2017

(65) Prior Publication Data

US 2017/0193643 A1 Jul. 6, 2017

Related U.S. Application Data

(63) Continuation of application No. PCT/JP2015/074316, filed on Aug. 28, 2015.

(30) Foreign Application Priority Data

Sep. 30, 2014 (JP) ................. 2014-201085

(51) Int. Cl.
*G06K 9/40* (2006.01)
*G06T 5/20* (2006.01)
*G06T 5/00* (2006.01)

(52) U.S. Cl.
CPC ............... *G06T 5/20* (2013.01); *G06T 5/001* (2013.01); *G06T 2207/20024* (2013.01)

(58) Field of Classification Search
CPC .. G06T 5/20; G06T 5/001; G06T 2207/20024
See application file for complete search history.

(56) References Cited

U.S. PATENT DOCUMENTS 5,739,922 A * 4/1998 Matama .................. G06T 5/004 348/E5.076
6,728,003 B1 * 4/2004 Gallagher ............... G06T 5/004 358/1.9

(Continued)

FOREIGN PATENT DOCUMENTS

JP 2008-177801 A 7/2008
JP 2009-206822 A 9/2009

(Continued)

OTHER PUBLICATIONS

Fessler et al., "Space-Alternating Generalized Expectation-Maximization Algorithm", IEEE Transactions on Signal Processing, vol. 42, No. 10, Oct. 1994, pp. 2664-2677.

(Continued)

*Primary Examiner* — Jonathan S Lee
(74) *Attorney, Agent, or Firm* — Birch, Stewart, Kolasch & Birch, LLP

(57) ABSTRACT

There are provided an image processing apparatus, an image processing method, a program, and a recording medium capable of compatibly achieving a high-accuracy filtering process and reduction in a necessary storage capacity. An image processing apparatus 35 includes a filtering process unit 41 that performs an image filtering process including a plurality of filtering processes. The filtering process unit 41 applies a filter to processing target data to acquire filter application process data, and applies a gain to the filter application process data to acquire gain application process data, in each filtering process. In each filtering process, the gain applied to the filter application process data is acquired based on a target frequency characteristic of the image filtering process determined according to a pixel position in original image data.

33 Claims, 32 Drawing Sheets

(56) References Cited

U.S. PATENT DOCUMENTS

| | | | |
|---|---|---|---|
| 2006/0077470 A1* | 4/2006 | Saquib | G06T 5/004 358/3.28 |
| 2006/0239549 A1* | 10/2006 | Kelly | H04N 1/58 382/167 |
| 2008/0175510 A1 | 7/2008 | Matsushita | |
| 2009/0123085 A1* | 5/2009 | Yoshimura | G06T 5/008 382/264 |
| 2013/0038748 A1 | 2/2013 | Hatakeyama | |
| 2013/0343670 A1* | 12/2013 | Damkat | H04N 5/208 382/261 |
| 2014/0111532 A1* | 4/2014 | Manchi | G06T 3/4007 345/582 |
| 2015/0312538 A1* | 10/2015 | Nashizawa | H04N 5/202 348/256 |

FOREIGN PATENT DOCUMENTS

| | | |
|---|---|---|
| JP | 2010-147926 A | 7/2010 |
| JP | 2012-252646 A | 12/2012 |
| JP | 2013-38562 A | 2/2013 |

OTHER PUBLICATIONS

Fleury et al., "Channel Parameter Estimation in Mobile Radio Environments Using the SAGE Algorithm", IEEE Journal on Selected Areas in Communications, vol. 17, No. 3, Mar. 1999, pp. 434-450.

International Search Report issued in PCT/JP2015/074316 (PCT/ISA/210), dated Oct. 27, 2015.

Pati et al., "Orthogonal Matching Pursuit: Recursive Function Approximation with Application to Wavelet Decomposition", Proc. of the 27th Annual Asilomar Conference on Signals Systems and Computers, Nov. 1-3, 1993, pp. 1-5.

Written Opinion of the International Searching Authority issued in PCT/JP2015/074316 (PCT/ISA/237), dated Oct. 27, 2015.

* cited by examiner

FIG. 13

| REPRESENTATIVE PIXEL POSITION | CANDIDATE DATA |
|---|---|
| REPRESENTATIVE PIXEL POSITION 1 | CANDIDATE DATA 1-1, ⋯, CANDIDATE DATA 1-N |
| REPRESENTATIVE PIXEL POSITION 2 | CANDIDATE DATA 2-1, ⋯, CANDIDATE DATA 2-N |
| ... | ... |
| REPRESENTATIVE PIXEL POSITION J | CANDIDATE DATA J-1, ⋯, CANDIDATE DATA J-N |

FIG. 14

| PROCESSED PIXEL INFORMATION Fi | LARGE-AREA COORDINATE DATA AL | | LOCAL COORDINATE DATA AS |
|---|---|---|---|
| PROCESSING TARGET PIXEL POSITION | FIRST REPRESENTATIVE PIXEL POSITION DATA | ... M-TH REPRESENTATIVE PIXEL POSITION DATA | RELATIVE POSITION DATA |
| 1 | ... | ... | ... |
| ... | ... | ... | ... |
| ... | ... | ... | ... |

FIG. 15

| LOCAL COORDINATE DATA AS | W1 | | WM |
|---|---|---|---|
| RELATIVE POSITION DATA | FIRST WEIGHT COORDINATE | ... | M-TH WEIGHT COORDINATE |
| ... | ... | ... | ... |
| ... | ... | ... | ... |
| ... | ... | ... | ... |

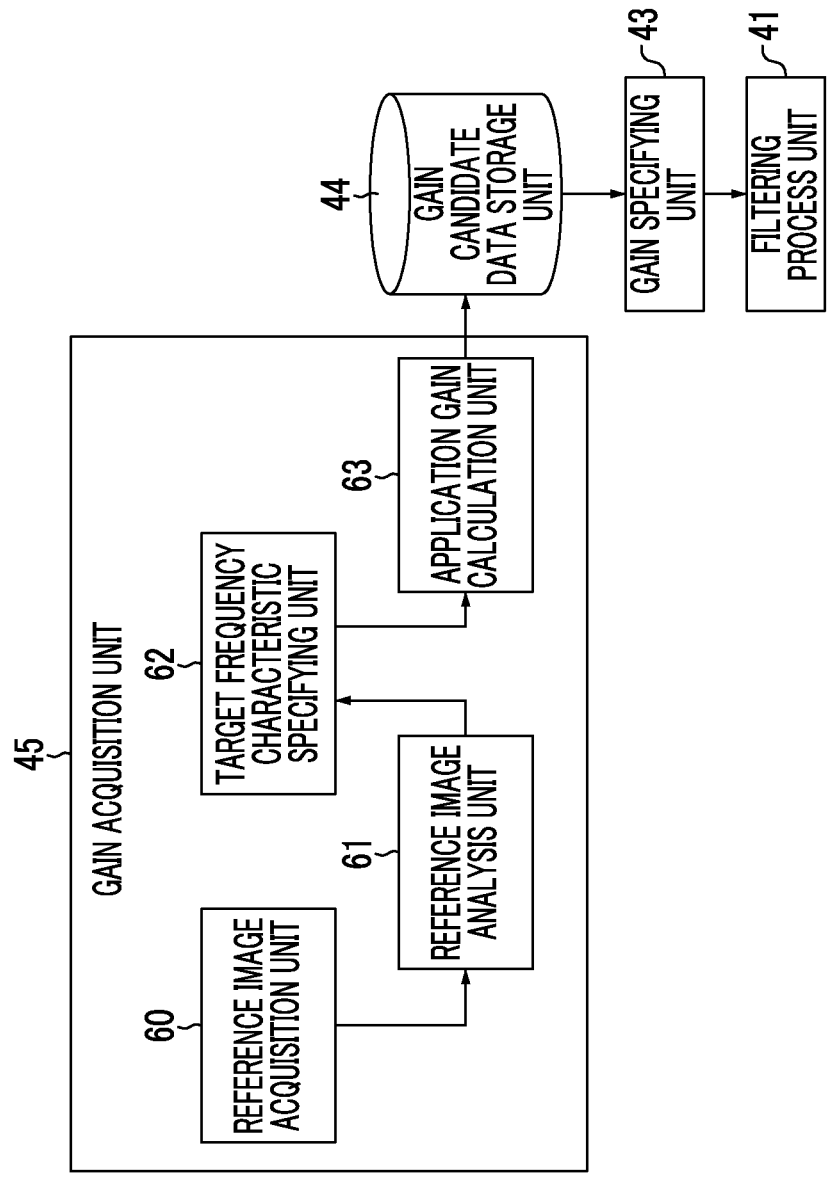

FIG. 28A $$f(\omega) = g_0 \phi_0(\omega) + g_1 \phi_1(\omega) + g_2 \phi_2(\omega)$$

FIG. 28B

| IMAGE FILTERING PROCESS | $g_0$ | $g_1$ | $g_2$ |
|---|---|---|---|
| P1 | 1.0 | 10.5 | 5.5 |
| P2 | 1.0 | 8.5 | 0.2 |
| P3 | 1.0 | 0.1 | 0.4 |
| P4 | 1.0 | -2.3 | 5.3 |

FIG. 34A $$f(\omega) = g_0 \phi_0^{(i)}(\omega) + g_1 \phi_1^{(i)}(\omega) + g_2 \phi_2^{(i)}(\omega)$$

FIG. 34B

| IMAGE FILTERING PROCESS | CLUSTER INDEX (i) | $g_0$ | $g_1$ | $g_2$ |
|---|---|---|---|---|
| P1 | 1 | 1.0 | 5.2 | -0.1 |
| P2 | 1 | 1.0 | 0.2 | 2.1 |
| P3 | 1 | 1.0 | -4.2 | 4.6 |
| P4 | 2 | 1.0 | 4.2 | -2.1 |
| P5 | 2 | 1.0 | 1.2 | 0.1 |
| P6 | 2 | 1.0 | -3.2 | 3.6 |

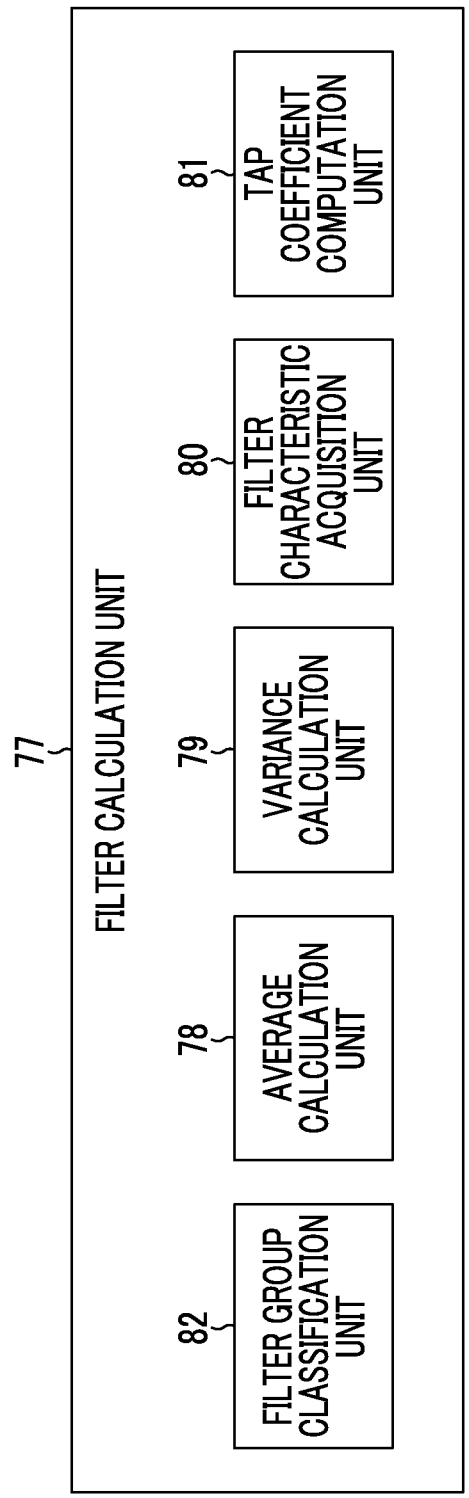

IMAGE PROCESSING APPARATUS, IMAGE PROCESSING METHOD, PROGRAM, AND RECORDING MEDIUM

CROSS-REFERENCE TO RELATED APPLICATIONS

This application is a Continuation of PCT International Application No. PCT/JP2015/074316 filed on Aug. 28, 2015, which claims priority under 35 U.S.C §119(a) to Patent Application No. 2014-201085 filed in Japan on Sep. 30, 2014, all of which are hereby expressly incorporated by reference into the present application.

BACKGROUND OF THE INVENTION

1. Field of the Invention

The present invention relates to an image processing apparatus, an image processing method, a program, and a recording medium, and particularly, to an image filtering process.

2. Description of the Related Art

Various image filtering process techniques such as a filtering process for enhancing image quality or a filtering process for providing a special visual effect have been proposed. For example, a point image restoration process that restores an original image using a filter determined based on a point spread function (PSF) indicating an image deterioration characteristic due to aberration of an imaging lens or the like is known.

JP2009-206822A discloses an imaging apparatus for the purpose of improving a manufacturing tolerance to reduce manufacturing variation. The imaging apparatus includes an aberration control optical system and an image processing unit. In the aberration control optical system, a spherical aberration greatly occurs in a peripheral portion compared with the vicinity of the center of an optical axis. The image processing unit performs a restoration process of components degraded due to the spherical aberration, and retains the amount of noise increased by the image processing to be equal to or less than two times in a standard deviation. In this way, by intentionally generating spherical aberration at a position distant from the optical axis, a manufacturing tolerance of a lens is improved. Further, by restoring an MTF by image processing using a filter, a recovery process of the components degraded by the spherical aberration is performed.

Further, JP2010-147926A discloses an imaging apparatus that generates an image having an enlarged depth of field and an image having an arbitrary depth of field by image processing after imaging. In JP2010-147926A, in a case where a point spread function (PSF) is directly calculated with respect to all pixel positions in an original image, since a processing amount increases and a processing time becomes long, a technique for directly calculating a point spread function only with respect to representative pixel positions, and acquiring a point spread function relating to non-representative pixel positions by performing interpolation based on the point spread function relating to the representative pixel positions in the vicinity thereof is disclosed.

SUMMARY OF THE INVENTION

If the type and number of filters used in the above-described image filtering process increase, a data amount of the entire filters dramatically increases, and thus, it is necessary to secure a huge storage area (ROM: read only memory).

That is, in a case where filters used in the image filtering process are determined according to a plurality of conditions, a necessary amount of data of the filters increases at an exponential rate. For example, a point spread function of an imaging optical system varies according to imaging conditions such as a diaphragm value (F-number), a zoom value (focal length), a subject distance, a focal position, an optical system type, a sensor SN ratio (signal-noise ratio) of an imaging element, an image height (in-image position) and an individual optical system difference. However, if characteristic filters are prepared for all combinations of individual imaging conditions, a total amount of data necessary for the filters becomes enormous.

In particular, since the point spread function varies according to the image height of the optical system and continuously varies according to a position angle about an optical axis, in a case where a filter based on the point spread function is created, ideally, it is desirable to design and retain filters by measuring point spread functions for all positions of the optical system. However, designing and retaining a filter optimized for each of all the positions of the optical system does not only require a large amount of computation, but also requires a huge storage capacity for retaining the filters. In order to provide a memory having such a large storage capacity in a limited space, it is necessary to prepare an expensive memory which is compact and has a large capacity. Thus, preparing in advance and storing filters corresponding to all the positions of the optical system is not necessarily desirable from a viewpoint of actually constructing an image processing system.

JP2009-206822A discloses a technique in which a filter for restoring point spreading based on spherical aberration which is intentionally generated is created and an MTF is improved by using the filter, but there is no mention about the above-mentioned adverse effects according to increase in the number of filters and about a method for solving the adverse effects.

In addition, in the imaging apparatus described in JP2010-147926A, the point spread function is directly calculated with respect to only the representative pixel positions, so that reduction of a calculation load of the point spread function is intended. However, as described above, since the point spread function varies according to a plurality of conditions such as an F-number or a focal length other than pixel positions, even in the case of only the representative pixel positions, retaining filters optimized with respect to all combinations of the plurality of conditions still requires a huge storage capacity. Further, in the imaging apparatus disclosed in JP2010-147926A, since the point spread function relating to the non-representative pixel positions is estimated by interpolation, there is no guarantee that an actual point spread function relating to the non-representative pixel positions is appropriately realized by the estimated point spread function.

Further, in an image filtering process in which specific anisotropy or a specific frequency characteristic is considered, the number of necessary patterns of filters increases. Furthermore, in a case where filters (filter coefficients) to be used are changed according to pixel positions, a data amount of the filters increases according to the number of pixels of an image which is a processing target.

In an image filtering process that uses a multiplicity of filters, there is a problem that the amount of calculation for determining filter coefficients increases. For example, in a case where a filter to be used in an image filtering process is realized by a finite impulse response (FIR) filter having a limited number of taps, the amount of calculation necessary for computing filter coefficients allocated to each tap increases.

For example, in a case where a filter is generated based on a point spread function, a Wiener filter may be calculated from an optical transfer function (OTF) obtained by Fourier transforming the point spread function (PSF). In a case where the number of taps of a filter is not limited, it is possible to realize a desired frequency characteristic obtained by inverse Fourier transform of the Wiener filter using a filter having an arbitrary number of taps.

However, if hardware which is actually usable is limited, the number of taps of a filter is also limited. Thus, in order to calculate a tap coefficient having a desired frequency characteristic under the condition that the number of taps of a filter is limited, since it is necessary to solve a nonlinear optimization problem, a very large amount of calculation is necessary.

Accordingly, in a case where an image filtering process is performed immediately after an image deterioration characteristic of a point spread function or the like is acquired, it is necessary to secure a tremendous calculation resource for calculation of tap coefficients which are actually used. However, it is not necessarily desirable to secure such a calculation resource from a viewpoint of actually building an image processing system.

The invention is made in consideration of the above-described problems, and an object of the invention is to provide an image processing technique capable of compatibly achieving a high-accuracy filtering process and reduction of a necessary storage capacity.

According to an aspect of the invention, there is provided an image processing apparatus comprising: a filtering process unit that performs an image filtering process that includes a plurality of times of filtering processes with respect to original image data to acquire processed image data, in which in each of the plurality of times of filtering processes, the filtering process unit applies a filter to processing target data to acquire filter application process data, applies a gain to the filter application process data to acquire gain application process data, and acquires filtering process data from the gain application process data, and in which in each of the plurality of times of filtering processes, the gain applied to the filter application process data is acquired based on a target frequency characteristic of the image filtering process determined according to a pixel position in the original image data.

According to this aspect, in each of the plurality of times of filtering processes, the gain applied to the filter application process data is acquired based on the target frequency characteristic of the image filtering process, and the target frequency characteristic is determined based on the pixel position in the original image data. By performing the gain adjustment in this way, it is possible to perform a high-accuracy filtering process according to the pixel position while reducing a data amount of a filter applied to processing target data in each filtering process.

The "frequency characteristic" is a characteristic relating to a frequency, and represents a ratio of an amplitude for each frequency component of image data after processing to an amplitude for each frequency component of image data before processing (=amplitude for each frequency component of image data after processing/amplitude for each frequency component of image data before processing), and represents a response according to a frequency.

Preferably, the target frequency characteristic of the image filtering process is a frequency characteristic based on an optical characteristic.

According to this aspect, it is possible to perform the image filtering process based on the optical characteristic.

Here, it is preferable that the "optical characteristic" is an optical characteristic of an imaging optical system used for imaging and acquisition of original image data which is a target of an image filtering process. For example, a characteristic based on a point spread function PSF or an optical transfer function OTF (including a modulation transfer function (MTF) and a phase transfer function (PTF)) may be used as the "optical characteristic", and "the target frequency characteristic of the image filtering process" may be represented by using an inverse filter design technique using an arbitrary standard such as a Wiener filter.

Preferably, the image processing apparatus further comprises: a gain candidate data storage unit that stores gain table information obtained by associating candidate data of the gain applied to the filter application process data with the pixel position, in each of the plurality of times of filtering processes; and a gain specifying unit that specifies, with reference to the gain table information, the candidate data associated with the pixel position according to the target frequency characteristic of the image filtering process as the gain applied to the filter application process data in each of the plurality of times of filtering processes. The filtering process unit applies the gain specified by the gain specifying unit to the filter application process data to acquire the gain application process data in each of the plurality of times of filtering processes.

According to this aspect, it is possible to simply specify the gain applied to the filter application process data from the gain candidate data.

The format of "the gain table information" is not particularly limited as long as gain candidate data and a pixel position are appropriately associated with each other. For example, in a case where the target frequency characteristic of the image filtering process is based on a point spread function, gain candidate data may be associated with factors (for example, a diaphragm value (F-number), a zoom value (focal length), a subject distance, a focal position, an optical system type, a sensor SN ratio of an imaging element, an image height (a pixel position), and an individual optical system difference) that may affect the point spread function.

Preferably, the filtering process unit performs the plurality of times of filtering processes for each pixel of the original image data, and the gain specifying unit acquires processed pixel information indicating the pixel position in the original image data which is a target of the plurality of times of filtering processes, and specifies the candidate data associated with the pixel position indicated by the processed pixel information as the gain applied to the filter application process data in each of the plurality of times of filtering processes.

According to this aspect, it is possible to easily specify the gain used in the plurality of times of filtering processes from the candidate data based on the processed pixel information.

Preferably, the gain is acquired by fitting a frequency characteristic of the image filtering process to the target frequency characteristic of the image filtering process using a least squares method based on each frequency characteristic of the plurality of times of filtering processes.

According to this aspect, it is possible to acquire a gain for realizing the target frequency characteristic of the image filtering process with high accuracy based on the least squares method.

Preferably, weighting is performed based on a frequency in the least squares method.

In particular, in the least squares method, it is preferable that an approximation error evaluation function of frequency characteristics is weighted based on a frequency. Here, the approximation error evaluation function is a function that represents evaluation of the level of approximation (that is, the level of an error), and for example, "a generic function ($J_{LMS}[_g]$) based on a weighted least squares standard" which will be described later may be used as the approximation error evaluation function. According to this aspect, by increasing the weight of a frequency band which is to be emphasized and decreasing the weight in a frequency band which is not to be emphasized, it is possible to acquire a gain depending on an actual request with high accuracy.

Preferably, a weight in a low-frequency band is set to be larger than a weight in a high-frequency band in the least squares method.

According to this aspect, it is possible to acquire a gain for particularly realizing a frequency characteristic in a low-frequency band in the target frequency characteristic of the image filtering process with high accuracy. Since a low-frequency component is easily perceived compared with a high-frequency component in terms of human's visual characteristics, by increasing the weight in the low-frequency band to acquire a gain, it is possible to generate processed image data having excellent visibility using an image filtering process.

Here, it is preferable that "the low-frequency band" is determined according to an image quality characteristic which is actually necessary. For example, the "low-frequency band" may be set in a range where a sampling frequency is equal to or smaller than ¼ (=0.25 fs=½ of Nyquist frequency).

Preferably, a weight in a high-frequency band is set to be larger than a weight in a low-frequency band according to an imaging condition when the original image data is acquired, in the least squares method.

According to this aspect, it is possible to acquire a gain for particularly realizing a frequency characteristic in a high-frequency band in the target frequency characteristic of the image filtering process with high accuracy, according to the imaging condition when the original image data is acquired. Generally, in a case where MTF deterioration in a high-frequency band is large and there is a large amount of noise in an imaging system, the noise may be amplified by an image filtering process. That is, image quality may be lowered. Thus, in an image filtering process of original image data acquired under an imaging condition that it is predicted that the SN ratio is bad in a high-frequency band, it may be preferable to prioritize a high-frequency component with respect to a low-frequency component as the accuracy of "the approximation to the target frequency characteristic of the image filtering process".

Here, it is preferable that "the high-frequency band" is determined according to an image quality characteristic which is actually necessary. For example, "the high-frequency band" may be set in a range where a sampling frequency is larger than ¼ (=0.25 fs) and is equal to or smaller than ½ (=0.5 fs), based on a frequency characteristic of assumed noise.

Further, "the imaging condition when the original image data is acquired" is determined based on an arbitrary factor that may have influences on noise. For example, one or a plurality of conditions selected from setting conditions of an imaging optical system used when the original image data is acquired, subject state conditions (scene conditions), or the like may be set to "the imaging condition when the original image data is acquired".

Preferably, the weight in the least squares method is determined according to a pixel position in the original image data.

According to this aspect, it is possible to change the weight in the least squares method according to the pixel position in the original image data, and to perform an image filtering process according to the pixel position. For example, at a pixel position where sharp image quality is necessary, a weight in a high-frequency band may be set to be larger than a weight in a low-frequency band, and at a pixel position where image quality with excellent visibility is necessary, a weight in a low-frequency band may be set to be larger than a weight in a high-frequency band.

Preferably, in the least squares method, the weight in the high-frequency band is large at a pixel position which is equal to or shorter than a first distance from the center of an image of the original image data, compared with a pixel position which is more distant than the first distance from the center of the image of the original image data.

According to this aspect, it is possible to acquire a gain with excellent reproducibility of a high-frequency component in a central portion of an image compared with a peripheral portion of the image. For example, in a case where a main subject is disposed in the central portion of the image, or in similar cases, this aspect may be suitably applied to a case where sharpness is necessary in the central portion of the image.

Here, "the first distance" is not particularly limited, and may be appropriately set based on an image range where a high-frequency band is emphasized.

Preferably, the weight in the low-frequency band is large at a pixel position which is more distant than a second distance from the center of an image of the original image data, compared with a pixel position which is equal to or shorter than the second distance from the center of the image of the original image data, in the least squares method.

According to this aspect, it is possible to acquire a gain with excellent reproducibility of a low-frequency component in a peripheral portion of an image compared with a central portion of the image. For example, as in a case where a subject which is an observation target may be disposed in a peripheral portion of an image, in a case where excellent visibility is necessary in a peripheral portion of an image, it is possible to suitably apply this aspect.

Here, "the second distance" is not particularly limited, and may be appropriately set based on an image range where a low-frequency band is emphasized.

Preferably, the filtering process unit uses a filter that makes the filtering process data equal to the processing target data in each of the plurality of times of filtering processes at a frequency where a ratio of the processed image data to the original image data is smaller than 1 in the target frequency characteristic of the image filtering process.

If an image filtering process is performed using an excessively small value of data, noise is easily mixed in data after processing, and also, such noise may be amplified, which consequently may lead to deterioration in image quality. According to this aspect, by using a filter that makes the filtering process data equal to the processing target data, it is possible to effectively prevent mixing of noise and amplification of the noise.

Preferably, the filtering process unit acquires the filter application process data using a filter determined according to a characteristic of the optical system used when the original image data is acquired by imaging, in at least any one filtering process among the plurality of times of filtering processes.

According to this aspect, the filtering process based on the characteristic of the optical system can be performed at least once.

Preferably, the filter determined according to the characteristic of the optical system is a filter determined based on a point spread function of the optical system.

According to this aspect, the filtering process based on the point spread function of the optical system can be performed at least once.

Preferably, the filtering process unit acquires the filter application process data using a filter determined irrespectively of a characteristic of the optical system used when the original image data is acquired through imaging, in at least any one filtering process among the plurality of times of filtering processes.

According to this aspect, the filtering process determined irrespectively of the characteristic of the optical system can be performed at least once.

Preferably, the filter determined irrespectively of the characteristic of the optical system is a contour emphasis filter.

According to this aspect, the filtering process relating to contour emphasis (edge emphasis) can be performed at least once. The contour emphasis filter may have a frequency characteristic according to a pixel position in the processing target data, or may have a common frequency characteristic without depending on the pixel position in the processing target data.

Preferably, the plurality of times of filtering processes include at least a first filtering process and a second filtering process, and the filtering process unit uses the filtering process data acquired in the first filtering process as the processing target data in the second filtering process.

According to this aspect, the first filtering process and the second filtering process can be performed in series.

Preferably, the plurality of times of filtering processes include at least a first filtering process and a second filtering process, and the filtering process unit uses the same data in the first filtering process and the second filtering process as the processing target data, and acquires the processed image data based on the filtering process data acquired in the first filtering process and the filtering process data acquired in the second filtering process.

According to this aspect, the first filtering process and the second filtering process can be performed in parallel.

Preferably, the plurality of times of filtering processes include at least a first filtering process and a second filtering process, and the filtering process unit includes a first filter application unit that applies a filter for the first filtering process to the processing target data of the first filtering process and acquires the filter application process data, a first gain application unit that applies a gain for the first filtering process to the filter application process data of the first filtering process and acquires the gain application process data, a second filter application unit that applies a filter for the second filtering process to the processing target data of the second filtering process and acquires the filter application process data, and a second gain application unit that applies a gain for the second filtering process to the filter application process data of the second filtering process and acquires the gain application process data.

According to this aspect, the first filtering process and the second filtering process can be performed by "the filter application unit (the first filter application unit and the second filter application unit)" and "the gain application unit (the first gain application unit and the second gain application unit)" which are separately provided, and thus, the processing flow can become simple.

Preferably, the plurality of times of filtering processes include at least a first filtering process and a second filtering process. Here, the filtering process unit includes a filter application unit that applies the filter to the processing target data to acquire the filter application process data, and a gain application unit that applies the gain to the filter application process data to acquire the gain application process data. The filter application unit acquires the filter application process data using a filter for the first filtering process in the first filtering process, and acquires the filter application process data using a filter for the second filtering process in the second filtering process. The gain application unit acquires the gain application process data using a gain for the first filtering process in the first filtering process, and acquires the gain application process data using a gain for the second filtering process in the second filtering process.

According to this aspect, the first filtering process and the second filtering process can be performed by "the filter application unit" and "the gain application unit" which are the same, and thus, a hardware configuration (circuit configuration) can become simple.

Preferably, the plurality of times of filtering processes include at least a first filtering process and a second filtering process, in which the filtering process unit acquires the filter application process data using a reference filter determined according to an average of a plurality of types of frequency characteristics of the image filtering processes in the first filtering process, and acquires the filter application process data using a variance filter determined according to a variance of the plurality of types of frequency characteristics of the image filtering processes in the second filtering process.

According to this aspect, since the reference filter and the variance filter determined according to the average and the variance of the plurality of types of frequency characteristics of the image filtering processes are used, it is possible to averagely perform an image filtering process to be applied with high accuracy.

The variance filter may correspond to directly or indirectly the variance of the plurality of types of frequency characteristics of the image filtering processes. For example, the variance filter may be determined based on a standard deviation derived from the variance, or may be determined based on other factors (for example, an average or the like) in addition to the variance.

According to another aspect of the invention, there is provided an image processing apparatus comprising: a filtering process unit that performs an image filtering process including a plurality of times of filtering processes with respect to original image data to acquire processed image data. Here, the plurality of times of filtering processes include at least a first filtering process and a second filtering process. The filtering process unit applies a filter to a processing target data to acquire filter application process data, applies a gain to the filter application process data to acquire gain application process data, and acquires filtering process data from the gain application process data, in each of the plurality of times of filtering processes, acquires, in the first filtering process, the filter application process data using a reference filter determined according to an average of frequency characteristics of the plurality of types of image filtering processes, which are frequency characteristics of the plurality of types of image filtering processes determined according to a pixel position in the original image data, and acquires, in the second filtering process, the filter application process data using a variance filter determined according to a variance of the frequency characteristics of the plurality of types of image filtering processes, which are the frequency characteristics of the plurality of types of image filtering processes determined according to the pixel position in the original image data. The gain applied to the filter application process data is determined according to the pixel position in the original image data, in each of the plurality of times of filtering processes.

According to this aspect, the gain applied to the filter application process data in each of the plurality of times of filtering processes is determined according to the pixel position in the original image data. By performing the gain adjustment in this way, it is possible to realize a desired image filtering process specified based on the optical characteristic of the optical system according to the pixel position by a simple computation process with high accuracy. In addition, since the reference filter and the variance filter according to the average and variance of the frequency characteristics of the plurality of types of image filtering processes determined according to the pixel positions are used, it is possible to averagely perform the image filtering process with high accuracy.

Preferably, the gain table information is configured so that specific candidate data is associated with a plurality of representative pixel positions, and the candidate data associated with one or more pixel positions among the plurality of representative pixel positions is associated with pixel positions other than the plurality of representative pixel positions.

According to this aspect, candidate data of gains associated with the representative pixel positions is associated with the pixel positions other than the plurality of representative pixel positions. Thus, it is possible to reduce a data amount of "associated data between pixel positions and candidate data of gains" in the gain table information.

"The candidate data associated with one or more pixel positions among the plurality of representative pixel positions" may be directly or indirectly associated with "the pixel positions other than the plurality of representative pixel positions". Accordingly, for example, the gain table information may be configured so that "one or more pixel positions among the plurality of representative pixel positions" are directly associated with "the pixel positions other than the plurality of representative pixel positions", and thus, "the candidate data associated with one or more pixel positions among the plurality of representative pixel positions" is indirectly associated with "the pixel positions other than the plurality of representative pixel positions".

Preferably, the filtering process unit applies a plurality of types of the filters to the processing target data to acquire a plurality of pieces of filter application process data, and the gain table information is configured so that a plurality of pieces of candidate data is respectively associated with the plurality of representative pixel positions, in which each of the plurality of pieces of candidate data respectively associated with the plurality of representative pixel positions is specified by the gain specifying unit as the gains which are respectively applied to the plurality of pieces of filter application process data.

According to this aspect, it is possible to acquire gain application process data with high accuracy using a plurality of gains with respect to each of the plurality of representative pixel positions.

Preferably, the plurality of types of filters include a reference filter determined according to an average of a plurality of target frequency characteristics determined according to the plurality of representative pixel positions, and a variance filter determined according to a variance of the plurality of target frequency characteristics.

According to this aspect, by using the reference filter and the variance filter, it is possible to averagely perform the image filtering process with respect to the plurality of representative pixel positions with high accuracy.

Preferably, the filtering process unit includes a filter application block that applies the plurality of types of filters to the processing target data to acquire the plurality of pieces of filter application process data, a gain application block that applies the gain to the plurality of pieces of filter application process data to acquire the gain application process data and acquires the filtering process data from the gain application process data, and a processed data acquisition unit that acquires the processed image data. Here, the gain application block includes a plurality of gain blocks, and the plurality of times of filtering processes is performed by the filter application block and each of the plurality of gain blocks. Each of the plurality of gain blocks applies the gain to the plurality of pieces of filter application process data to acquire a plurality of pieces of gain application process data, acquires a plurality of pieces of filtering process data from the plurality of pieces of gain application process data, and acquires block process data from the plurality of pieces of filtering process data. The processed data acquisition unit acquires the processed image data based on the block process data acquired in the plurality of gain blocks.

According to this aspect, it is possible to perform the plurality of times of filtering processes with high accuracy by each of the filter application block and the plurality of gain blocks.

Preferably, the plurality of gain blocks include at least a first gain block and a second gain block. Here, each of the first gain block and the second gain block applies the gain to each of the plurality of pieces of filter application process data. The processed data acquisition unit acquires the processed image data based on the block process data acquired in the first gain block and the block process data acquired in the second gain block. In a case where the filtering process unit performs the plurality of times of filtering processes with respect to the pixel positions other than the plurality of representative pixel positions, the gain specifying unit specifies the candidate data associated with a first representative pixel position as the gain used in the first gain block and specifies the candidate data associated with a second representative pixel position as the gain used in the second gain block, among the candidate data associated with the pixel positions other than the plurality of representative pixel positions.

According to this aspect, with respect to the pixel positions other than the representative pixel positions, the candidate data associated with the first representative pixel position and the candidate data associated with the second representative pixel position are specified as gains used in the gain blocks.

Preferably, the processed data acquisition unit acquires the processed image data by performing a weighting computation with respect to the block process data acquired in the plurality of gain blocks.

According to this aspect, it is possible to acquire the processed image data with high accuracy using the weighting computation.

Preferably, the processed data acquisition unit determines a weight coefficient allocated to each piece of block process data acquired in the plurality of gain blocks based on the pixel position, and acquires the processed image data by performing the weighting computation for applying the weight coefficient to the block process data.

According to this aspect, it is possible to acquire the processed image data with high accuracy by performing the weighting computation using the weight coefficient determined based on the pixel position.

According to still another aspect of the invention, there is provided an image processing method for performing an image filtering process including a plurality of times of filtering processes with respect to original image data to acquire processed image data, comprising: applying a filter to processing target data to acquire filter application process data, applying a gain to the filter application process data to acquire gain application process data, and acquiring filtering process data from the gain application process data, in each of the plurality of times of filtering processes, and acquiring the gain applied to the filter application process data based on a target frequency characteristic of the image filtering process determined according to a pixel position in the original image data, in each of the plurality of times of filtering processes.

According to still another aspect of the invention, there is provided an image processing method for performing an image filtering process including a plurality of times of filtering processes with respect to original image data to acquire processed image data, in which the plurality of times of filtering processes include at least a first filtering process and a second filtering process, in which the method comprises: applying a filter to processing target data to acquire filter application process data, applying a gain to the filter application process data to acquire gain application process data, and acquiring filtering process data from the gain application process data, in each of the plurality of times of filtering processes; acquiring, in the first filtering process, the filter application process data using a reference filter determined according to an average of frequency characteristics of a plurality of types of image filtering processes, which are frequency characteristics of the plurality of types of image filtering processes determined according to a pixel position in the original image data; and acquiring, in the second filtering process, the filter application process data using a variance filter determined according to a variance of the frequency characteristics of the plurality of types of image filtering processes, which are the frequency characteristics of the plurality of types of image filtering processes determined according to the pixel position in the original image data, and in which the gain applied to the filter application process data is determined according to the pixel position in the original image data, in each of the plurality of times of filtering processes.

According to still another aspect of the invention, there is provided a program that causes a computer to realize a function for performing an image filtering process including a plurality of times of filtering processes with respect to original image data to acquire processed image data, the program causing the computer to execute: a process of applying a filter to processing target data to acquire filter application process data, a process of applying a gain to the filter application process data to acquire gain application process data, and a process of acquiring filtering process data from the gain application process data, in each of the plurality of times of filtering processes, in which the gain applied to the filter application process data is acquired based on a target frequency characteristic of the image filtering process determined according to a pixel position in the original image data, in each of the plurality of times of filtering processes.

According to still another aspect of the invention, there is provided a program that causes a computer to realize a function for performing an image filtering process including a plurality of times of filtering processes with respect to original image data to acquire processed image data, in which the plurality of times of filtering processes include at least a first filtering process and a second filtering process, in which the program causes the computer to execute: a process of applying a filter to processing target data to acquire filter application process data, a process of applying a gain to the filter application process data to acquire gain application process data, and a process of acquiring filtering process data from the gain application process data, in each of the plurality of times of filtering processes; a process of acquiring, in the first filtering process, the filter application process data using a reference filter determined according to an average of frequency characteristics of the plurality of types of image filtering processes, which are the frequency characteristics of the plurality of types of image filtering processes determined according to a pixel position in the original image data; and a process of acquiring, in the second filtering process, the filter application process data using a variance filter determined according to a variance of the frequency characteristics of the plurality of types of image filtering processes, which are the frequency characteristics of the plurality of types of image filtering processes determined according to the pixel position in the original image data, and in which the gain applied to the filter application process data is determined according to the pixel position in the original image data, in each of the plurality of times of filtering processes.

According to still another aspect of the invention, there is provided a computer-readable recording medium that stores a program that causes a computer to realize a function for performing an image filtering process including a plurality of times of filtering processes with respect to original image data to acquire processed image data, the program causing the computer to execute: a process of applying a filter to processing target data to acquire filter application process data, a process of applying a gain to the filter application process data to acquire gain application process data, and a process of acquiring filtering process data from the gain application process data, in each of the plurality of times of filtering processes, in which the gain applied to the filter application process data is acquired based on a target frequency characteristic of the image filtering process determined according to a pixel position in the original image data, in each of the plurality of times of filtering processes.

According to still another aspect of the invention, there is provided a computer-readable recording medium that stores a program that causes a computer to realize a function for performing an image filtering process including a plurality of times of filtering processes with respect to original image data to acquire processed image data, in which the plurality of times of filtering processes include at least a first filtering process and a second filtering process, in which the program causes the computer to execute: a process of applying a filter to processing target data to acquire filter application process data, a process of applying a gain to the filter application process data to acquire gain application process data, and a process of acquiring filtering process data from the gain application process data, in each of the plurality of times of filtering processes; a process of acquiring, in the first filtering process, the filter application process data using a reference filter determined according to an average of frequency characteristics of the plurality of types of image filtering processes, which are the frequency characteristics of the plurality of types of image filtering processes determined according to a pixel position in the original image data; and a process of acquiring, in the second filtering process, the filter application process data using a variance filter determined according to a variance of the frequency characteristics of the plurality of types of image filtering processes, which are the frequency characteristics of the plurality of types of image filtering processes determined according to the pixel position in the original image data, and in which the gain applied to the filter application process data is determined according to the pixel position in the original image data, in each of the plurality of times of filtering processes.

According to the invention, it is possible to acquire a gain applied to filter application process data in each of a plurality of times of filtering processes based on a target frequency characteristic of an image filtering process, and the target frequency characteristic is determined according to a pixel position in original image data. Thus, it is possible to perform a high-accuracy filtering process according to the pixel position while reducing a data amount of a filter applied to processing target data in each filtering process.

BRIEF DESCRIPTION OF THE DRAWINGS

FIG. 13 is a conceptual diagram showing a relationship between a representative pixel position and candidate data relating to a gain output from a gain output unit.

FIG. 14 is a conceptual diagram showing a relationship between large-area coordinate data and local coordinate data output from a position coordinate calculation unit and pixel position data.

FIG. 15 is a conceptual diagram showing a relationship between local coordinate data input to a weight coefficient determination unit and a weight coefficient output from the weight coefficient determination unit.

FIG. 16 is a block diagram showing an example of a functional configuration of a gain acquisition unit, and shows a gain acquisition unit which is suitably combined with the image processing unit shown in FIG. 3.

FIGS. 27A to 27C are diagrams schematically showing examples of base filters (characteristic vectors) acquired from an average and a variance of frequency characteristics of the plurality of types of image filtering processes shown in FIG. 25, in which FIG. 27A shows "$\phi_0$", FIG. 27B shows "$\phi_1$", and FIG. 27C shows "$\phi_2$".

FIGS. 28A and 28B show a frequency characteristic (see FIG. 28A) and a gain example (see FIG. 29B) relating to image filtering processes (first filtering process to third filtering process) performed by a filtering process unit having the circuit configuration shown in FIG. 10.

FIGS. 31A and 31B are diagrams schematically showing an example of a variance of frequency characteristics of a plurality of types of image filtering processes shown in FIG. 30, in which FIG. 31A shows a variance of frequency characteristic data of a first image filtering process to a third image filtering process classified as a first variation distribution, and FIG. 31B shows a variance of frequency characteristic data of a fourth image filtering process to a sixth image filtering process classified as a second variation distribution.

FIGS. 32A to 32C are diagrams schematically showing examples of base filters (characteristic vectors) acquired from an average and a variance of frequency characteristics of the first image filtering process to the third image filtering process classified as the first variation distribution, in which FIG. 32A shows "$\phi_0$", FIG. 32B shows "$\phi_1$", and FIG. 32C shows "$\phi_2$".

FIGS. 33A to 33C are diagrams schematically showing examples of base filters (characteristic vectors) acquired from an average and a variance of frequency characteristics of the fourth image filtering process to the sixth image filtering process classified as the second variation distribution, in which FIG. 33A shows "$\phi_0$", FIG. 33B shows "$\phi_1$", and FIG. 33C shows "$\phi_2$".

FIGS. 34A and 34B show a frequency characteristic (see FIG. 34A) and a gain example (see FIG. 34B) relating to image filtering processes (first filtering process to third filtering process) performed by a filtering process unit having the circuit configuration shown in FIG. 10.

FIG. 35 is a block diagram showing an example of a functional configuration of a filter calculation unit that calculates a filter coefficient based on a multimodal distribution.

Figure 40:
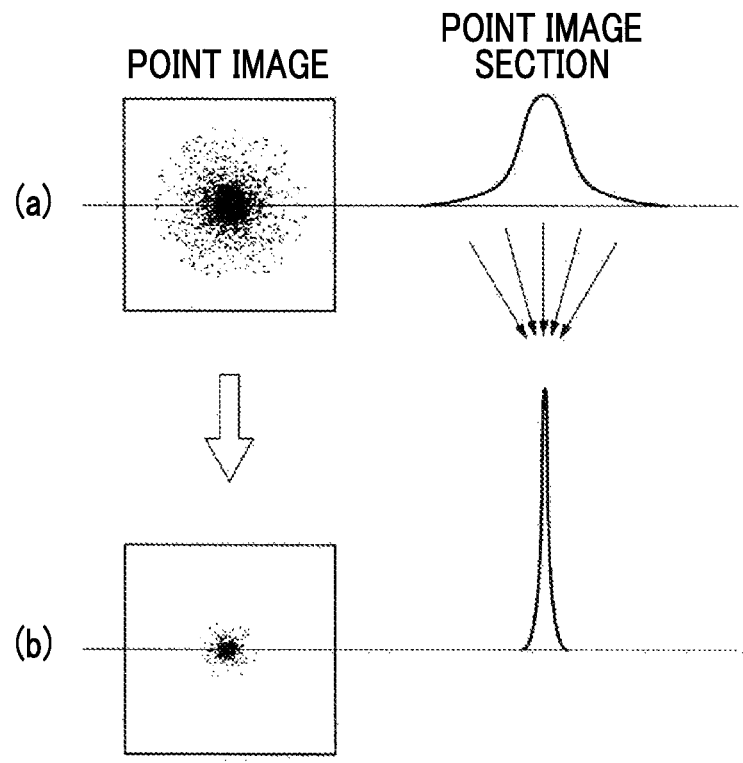

(a) of FIG. 40 and (b) of FIG. 40 are diagrams showing an example of restoration of an image acquired through the EDoF optical system, in which (a) of FIG. 40 shows a blurred image before the restoration process and (b) of FIG. 40 shows an image (point image) in which blurring is canceled after the restoration process.

Figure 41:
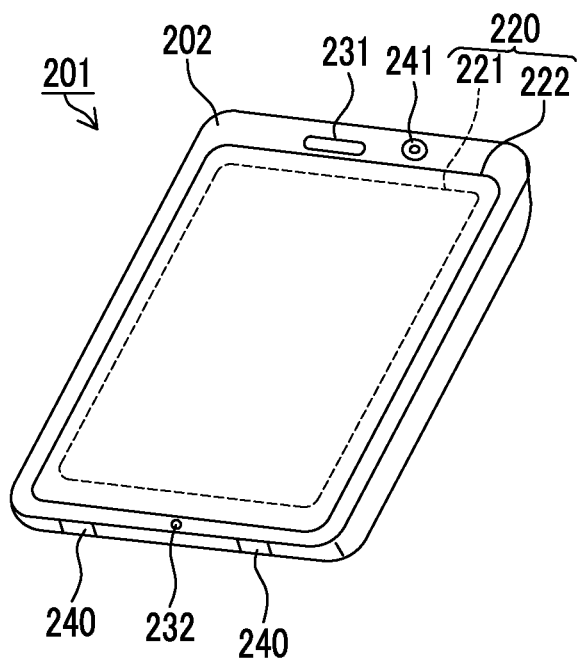

FIG. 41 is a diagram showing an appearance of a smartphone.

Figure 42:
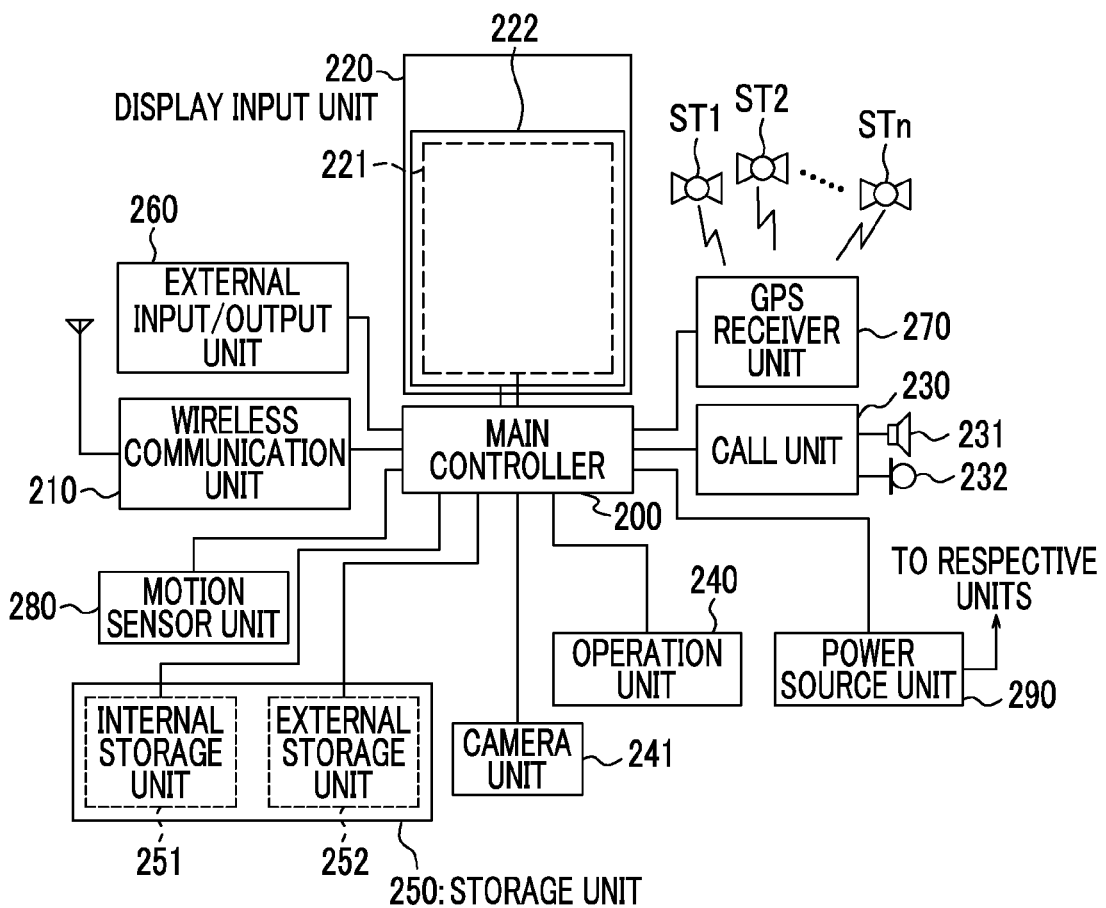

FIG. 42 is a block diagram showing a configuration of the smartphone shown in FIG. 41.

DESCRIPTION OF THE PREFERRED EMBODIMENTS

Embodiments of the invention will be described with reference to the accompanying drawings. In the following embodiments, a case in which the invention is applied to a digital camera (imaging apparatus) capable of being connected to a computer (PC: personal computer) will be described as an example.

Figure 1:
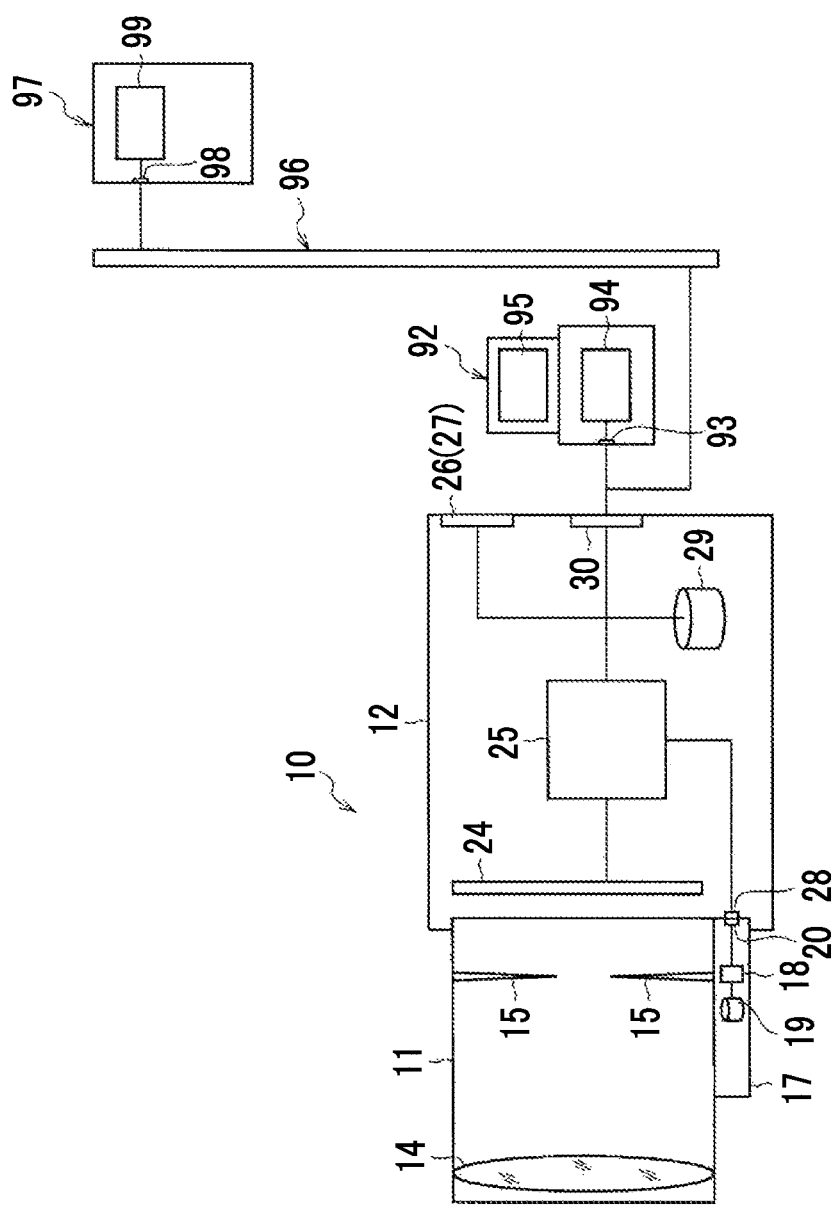
FIG. 1 is a block diagram showing a digital camera connected to a computer.

FIG. 1 is a block diagram showing a digital camera 10 connected to a computer 92.

The digital camera 10 in this example includes an exchangeable lens unit 11, and a camera main body 12 that includes an imaging element 24, in which the lens unit 11 and the camera main body 12 are electrically connected to each other through a lens unit input/output unit 20 of the lens unit 11 and a camera main body input/output unit 28 of the camera main body 12.

The lens unit 11 includes an optical system that includes a lens 14 and a diaphragm 15, and an optical system operation unit 17 that controls the optical system. The optical system operation unit 17 includes a lens unit controller 18 connected to the lens unit input/output unit 20, a lens unit storage unit 19 that stores a variety of information such as optical system information, and an actuator (not shown) that operates the optical system. The lens unit controller 18 controls the optical system through the actuator based on a control signal transmitted from the camera main body 12 through the lens unit input/output unit 20, and for example, performs a focus control or a zoom control based on lens movement, a diaphragm amount control of the diaphragm 15, and the like. Further, the lens unit controller 18 reads out a variety of information stored in the lens unit storage unit 19 based on a control signal transmitted from the camera main body 12 through the lens unit input/output unit 20, and transmits the read information to the camera main body 12 (main body controller 25).

The imaging element 24 of the camera main body 12 includes a focusing microlens, color filters of R (red), G (green) and B (blue), or the like, and an image sensor (photodiode) configured by a complementary metal oxide semiconductor (CMOS), a charge coupled device (CCD) or the like. The imaging element 24 converts subject image light irradiated through the optical system (the lens 14, the diaphragm 15, and the like) of the lens unit 11 into an electric signal, and transmits the image signal (image data) to the main body controller 25.

The main body controller 25 has a function as a device controller that generally controls the respective units of the digital camera 10, and a function as an image processing unit (image processing apparatus) that performs image processing with respect to image data transmitted from the imaging element 24, but details thereof will be described later (see FIG. 2).

The digital camera 10 includes other devices (release button or the like) necessary for imaging or the like, and a part of the other devices forms a user interface 26 through which a user is capable of performing checks and operations. In the example shown in FIG. 1, the user interface 26 is provided in the camera main body 12, but the user interface 26 may be disposed in the lens unit 11 and/or the camera main body 12. The user may determine and change various settings (exposure value (EV)) for imaging or the like, may give an imaging instruction, or may check a live view image and a captured image through the user interface 26, for example. The user interface 26 is connected to the main body controller 25, so that various setting and various instructions determined and changed by the user are reflected in various processes in the main body controller 25. The user is guided through a display on a display unit 27 (electronic view finder (EVF), and a rear surface liquid crystal display unit) included in the user interface 26, and thus, imaging may be prompted.

Image data which is subjected to image processing in the main body controller 25 is stored in a main body storage unit 29 provided in the camera main body 12, and is transmitted to an external apparatus such as the computer 92 through an input/output interface 30, as necessary. The main body storage unit 29 is configured by an arbitrary memory device, and an exchangeable memory such as a memory card may be suitably used. A format of the image data output from the main body controller 25 is not particularly limited, and image data having a format such as RAW, joint photographic experts group (JPEG) and/or tagged image file format (TIFF) may be generated and output by the main body controller 25. Further, the main body controller 25 may form one image file by associating a plurality of pieces of related data such as header information (imaging information (imaging date and time, device type, the number of pixels, a diaphragm value, or the like), or the like), main image data and thumbnail image data with each other, such as a so-called exchangeable image file format (Exif), and may output the image file.

The computer 92 is connected to the digital camera 10 through the input/output interface 30 of the camera main body 12 and the computer input/output unit 93, and receives a variety of data such as image data transmitted from the camera main body 12. The computer controller 94 totally controls the computer 92, performs image processing with respect to image data from the digital camera 10, and for example, controls communication with a server 97 connected to the computer input/output unit 93 through a network 96 such as the Internet. The computer 92 includes a display 95, and processed content or the like in the computer controller 94 is displayed on the display 95 as necessary. A user may operate input means (not shown) such as a keyboard while checking a display on the display 95, to thereby input data or commands into the computer controller 94. Thus, the user may control the computer 92 or devices (the digital camera 10, the server 97, and the like) connected to the computer 92.

The server 97 includes a server input/output unit 98 and a server controller 99. The server input/output unit 98 configures a transmission/reception connection unit with respect to an external apparatus such as the computer 92, and is connected to the computer input/output unit 93 of the computer 92 through the network 96 such as the Internet. The server controller 99 works in cooperation with the computer controller 94 according to a control instruction signal from the computer 92, performs transmission and reception of a variety of data with respect to the computer controller 94 as necessary, performs a computation process, and transmits a computation result to the computer 92.

Each controller (the lens unit controller 18, the main body controller 25, the computer controller 94, and the server controller 99) includes a variety of circuits necessary for a control process, and for example, includes a computational circuit (central processing unit (CPU), or the like), a memory, or the like. Further, communication between the digital camera 10, the computer 92, and the server 97 may be a wired communication or a wireless communication. In addition, the computer 92 and the server 97 may be integrally formed, or the computer 92 and/or the server 97 may not be provided. Furthermore, a communication function with respect to the server 97 may be given to the digital camera 10, and transmission and reception of a variety of data may be directly performed between the digital camera 10 and the server 97.

Figure 2:
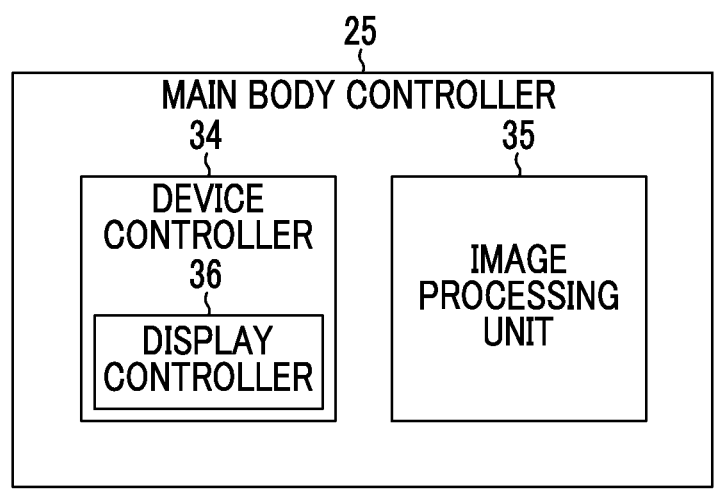
FIG. 2 is a block diagram showing an example of a configuration of a main body controller.

FIG. 2 is a block diagram showing an example of a configuration of the main body controller 25. The main body controller 25 includes a device controller 34 and an image processing unit (image processing apparatus) 35, and totally controls the camera main body 12.

The device controller 34 appropriately controls various types of devices provided in the digital camera 10, for example, controls the imaging element 24 to control an output of an image signal (image data) from the imaging element 24, generates a control signal for controlling the lens unit 11, transmits the control signal to the lens unit 11 (lens unit controller 18) through camera main body input/output unit 28, stores the image data before and after image processing (RAW data, JPEG data, or the like) in the main body storage unit 29, and transmits the image data before and after the image processing (RAW data, JPEG data, or the like) to an external apparatus or the like (computer 92 or the like) connected through the input/output interface 30. Further, the device controller 34 of this example includes a display controller 36 that controls the display unit 27. The display controller 36 may cause the display unit 27 to display a guide for guiding a user's imaging operation in cooperation with the image processing unit 35.

On the other hand, the image processing unit 35 performs arbitrary image processing with respect to an image signal output from the imaging element 24, as necessary. For example, a variety of image processing such as sensor correction, demosaicing (synchronization), pixel interpolation, color correction (offset correction, white balancing, color matrix processing, gamma conversion, and the like), and RGB image processing (sharpening, tone correction, exposure correction, contour correction, and the like), RGB/YCrCb conversion, or image compression may be appropriately performed in the image processing unit 35.

Figure 3:
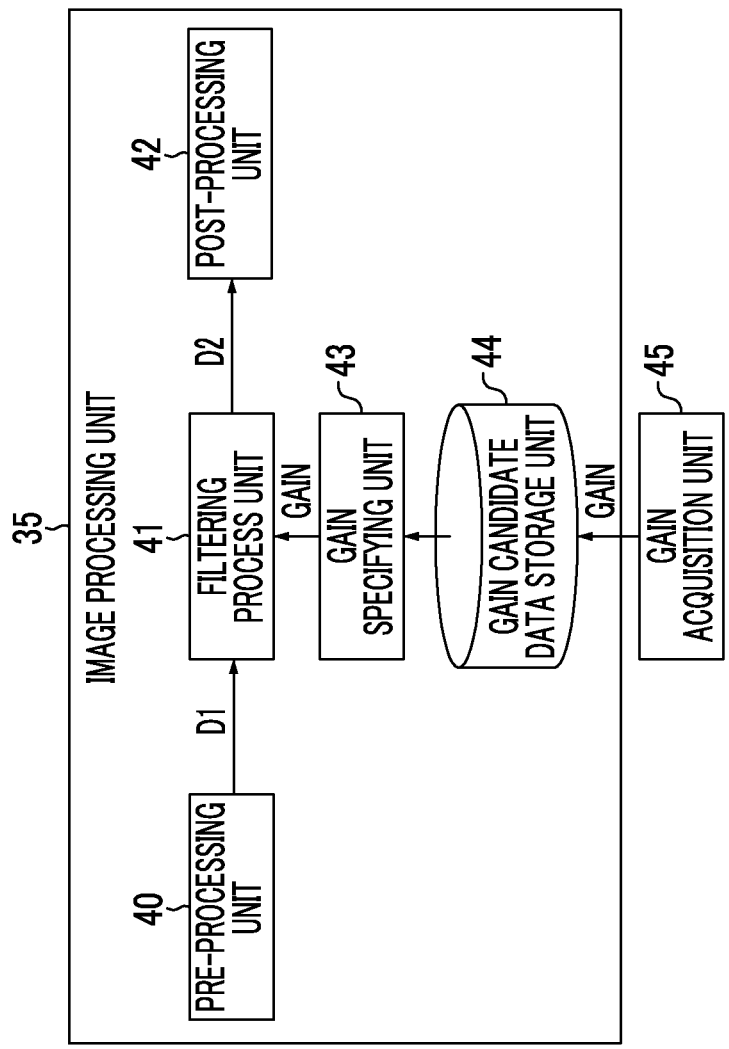
FIG. 3 is a block diagram showing an example of a functional configuration of an image processing unit.

FIG. 3 is a block diagram showing an example of a functional configuration of the image processing unit 35.

The image processing unit 35 includes a filtering process unit 41 that performs an image filtering process including a plurality of times of filtering processes with respect to original image data D1 to acquire processed image data D2. Further, the image processing unit 35 of this example further includes a gain specifying unit 43, a gain candidate data storage unit 44, a pre-processing unit 40, and a post-processing unit 42, in addition to the filtering process unit 41.

The filtering process unit 41 applies a filter to processing target data to acquire filter application process data in each of the plurality of times of filtering processes, applies a gain to the filter application process data to acquire gain application process data, and acquires filtering process data from the gain application process data.

The gain candidate data storage unit 44 stores "gain table information" obtained by associating candidate data of a gain applied to filter application process data in each of the plurality of times of filtering processes in the filtering process unit 41 with a pixel position (position of an optical system). The gain table information in this example is configured so that the candidate data of the gain is associated with the type of the optical system and the pixel position (position of the optical system). The gain table information including the candidate data of the gain is acquired in advance by the gain acquisition unit 45 according to the type of the optical system and the pixel position (position of the optical system), and is stored in the gain candidate data storage unit 44. A specific example of a gain (candidate data) acquisition method based on the type of the optical system and the pixel position will be described later.

The gain specifying unit 43 specifies, with reference to the gain table information stored in the gain candidate data storage unit 44, candidate data associated with a pixel position (position of the optical system) according to a target frequency characteristic as a gain to be applied to the filter application process data in each of the plurality of times of filtering processes, and transmits the result to the filtering process unit 41. The gain specifying unit 43 in this example acquires information about the type of an optical system used when the original image data D1 which is a target of the image filtering process P is acquired and a pixel position of processing target data (position of the optical system), reads out the candidate data of the gain associated with the type of the optical system and the pixel position (position of the optical system) from the gain candidate data storage unit 44, and transmits the result to the filtering process unit 41 as a gain to be applied to the filter application process data. A method for acquiring information about the type of the optical system and the pixel position in the gain specifying unit 43 is not particularly limited, and the gain specifying unit 43 may acquire information about the type of the optical system and the pixel position (position of the optical system) from information about the lens unit 11 and imaging condition information retained in a memory (not shown) of the main body controller 25.

The filtering process unit 41 applies the gain specified by the gain specifying unit 43 in each of the plurality of times of filtering processes to the filter application process data to acquire the gain application process data.

The image processing unit 35 also performs image processing other than the above-described image filtering process. A variety of image processing other than the image filtering process may be performed in the pre-processing unit 40 provided at a pre-stage of the filtering process unit 41, or may be performed in the post-processing unit 42 provided at a post-stage of the filtering process unit 41. That is, the image filtering process in the filtering process unit 41 may be performed using data received through the variety of image processing performed in the pre-processing unit 40 as the original image data D1, or the variety of image processing may be performed in the post-processing unit 42 with respect to the processed image data D2 received through the image filtering process in the filtering process unit 41.

In this example, image data input to the filtering process unit 41 from the pre-processing unit 40 is referred to as the "original image data D1", and image data output from the post-processing unit 42 from the filtering process unit 41 is referred to as the "processed image data D2".

Figure 4:
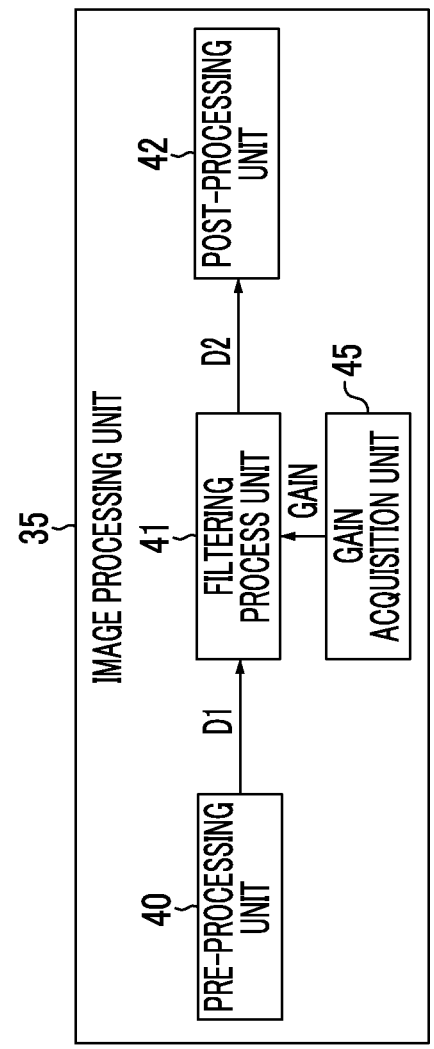
FIG. 4 is a block diagram showing another example of the functional configuration of the image processing unit.

FIG. 4 is a block diagram showing another example of the functional configuration of the image processing unit 35.

In the example shown in FIG. 3, a gain to be used in the filtering process is acquired with reference to the gain table information stored in advance in the gain candidate data storage unit 44, but in the example shown in FIG. 4, the gain table information (gain candidate data) is not acquired and stored in advance, and instead, a gain is acquired together with execution of the filtering process. That is, in the example shown in FIG. 4, the gain acquisition unit 45 is connected to the filtering process unit 41, and a gain to be used in the plurality of times of filtering processes performed in the filtering process unit 41 is directly supplied to the filtering process unit 41 from the gain acquisition unit 45. The gain acquisition unit 45 acquires data indicating the optical characteristic of the optical system used when the original image data D1 is acquired, that is, the optical characteristic according to the pixel position (position of the optical system) which is processing target data, specifies a target frequency characteristic of the image filtering process based on the data indicating the optical characteristic, acquires a gain to be applied to the filter application process data in each of the plurality of times of filtering processes, based on the specified "target frequency characteristic of the image filtering process", and supplies the acquired gain to the filtering process unit 41.

Here, as the data indicating "the optical characteristic of the optical system used when the original image data D1 is acquired", for example, data (for example, a model number or the like) indicating the type of the lens unit 11 (an example of the optical system) used when the original image data D1 is acquired through imaging is may be used. Further, "the data indicating the optical characteristic according to the pixel position of the processing target data (position of the optical system)" may be optical characteristic data determined in an individual pixel unit, for example, or may be optical characteristic data determined in the unit of a block configured by a plurality of pixels. A method for acquiring the data based on the gain acquisition unit 45 is not particularly limited, and the gain acquisition unit 45 may acquire information about the type of the optical system and the pixel position (position of the optical system) from the information about the lens unit 11 and the imaging condition information retained in a memory (not shown) of the main body controller 25.

Figure 5:
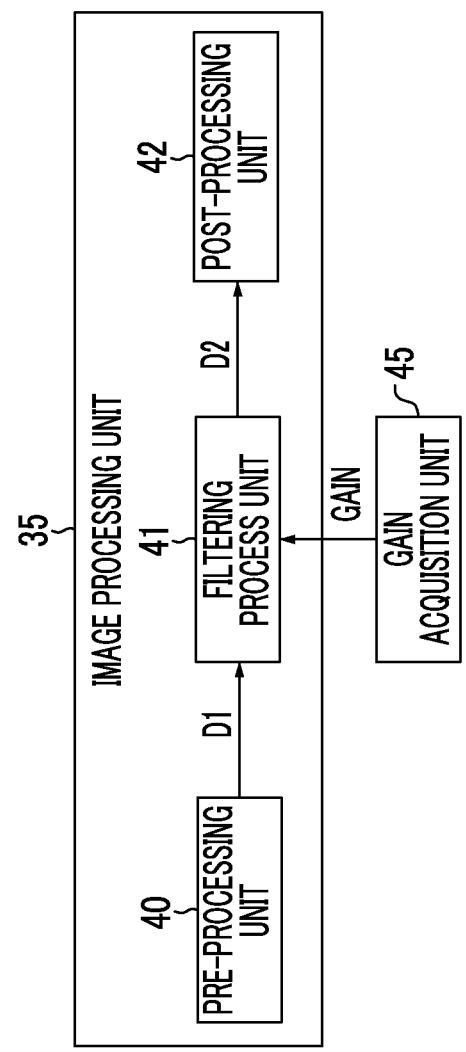
FIG. 5 is a block diagram showing another example of the functional configuration of the image processing unit.

The gain acquisition unit 45 may be provided as a part of the image processing unit 35, as shown in FIG. 4, or may be provided as another processing unit which is different from the image processing unit 35, as shown in FIG. 5.

In the examples shown in FIGS. 4 and 5, similarly, image processing other than the above-described image filtering process may be performed in the pre-processing unit 40 provided at the pre-stage of the filtering process unit 41, or may be performed in the post-processing unit 42 provided at the post-stage of the filtering process unit 41.

Next, a specific example of the image filtering process (the plurality of times of filtering processes) performed in the filtering process unit 41 will be described.

If an optical characteristic of an optical system (lens or the like) is uniform without being dependent on positions, a common filter derived from the optical characteristic may be used with respect to all pixel positions which are processing target image data. However, an actual optical system has an optical characteristic that varies according to positions, and for example, there is a tendency that aberration becomes larger in a peripheral portion compared with a central portion. Accordingly, ideally, it is preferable to perform a filtering process optimized for each pixel using a filter optimized for an optical characteristic at each position of the optical system. In order to perform such an ideal filtering process, it is necessary to prepare the filter (tap coefficient) optimized for each position of the optical system (for each pixel position), but in a case where there is a plurality of factors that affects the optical characteristic of the optical system, the number of filters to be prepared and a data amount thereof become enormous. For example, in a case where a filtering process based on a point spread function is performed, since the point spread function may be changed by imaging conditions such as an F-number, a zoom value, a subject distance, a focal position, an optical system type, a sensor SN ratio of the imaging element 24, an image height (an in-image position), or an individual optical system difference, ideally, it is necessary to prepare filters (tap coefficients) corresponding to all combinations of the imaging conditions.

In order to prevent such an increase in the amount of data necessary for the image filtering process, in the following embodiment, instead of retaining filters corresponding to all pixel positions, by applying a plurality of times of filtering processes and adjusting a gain used in each filtering process according to the pixel positions, an image filtering process suitable for each pixel position in original image data which is a processing target is realized. Thus, it is possible to averagely perform an excellent image filtering process for each pixel position in the original image data. In addition, in a case where the related art interpolation technique disclosed in JP2010-147926A is used, it is necessary to devise an interpolation interval and an interpolation method in order to improve the accuracy of the image filtering process, but in a case where an image filtering process to be described below is used, it is possible to easily improve the accuracy of the image filtering process simply by increasing the number of filters to be used (the number of filter application processes).

Figure 6:
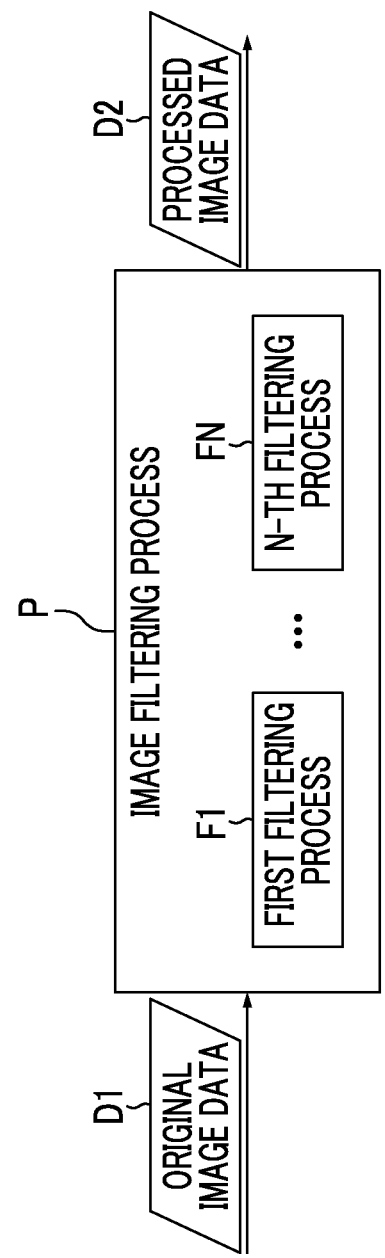
FIG. 6 is a conceptual diagram of an image filtering process.

FIG. 6 is a conceptual diagram of an image filtering process P. The image filtering process P of this example includes a plurality of times of filtering processes (a first filtering process F1 to an N-th filtering process FN (here, "N" is an integer which is equal to or greater than 2)). The processed image data D2 is generated from the original image data D1 using the "image filtering process P including the plurality of times of filtering processes".

Figure 7:
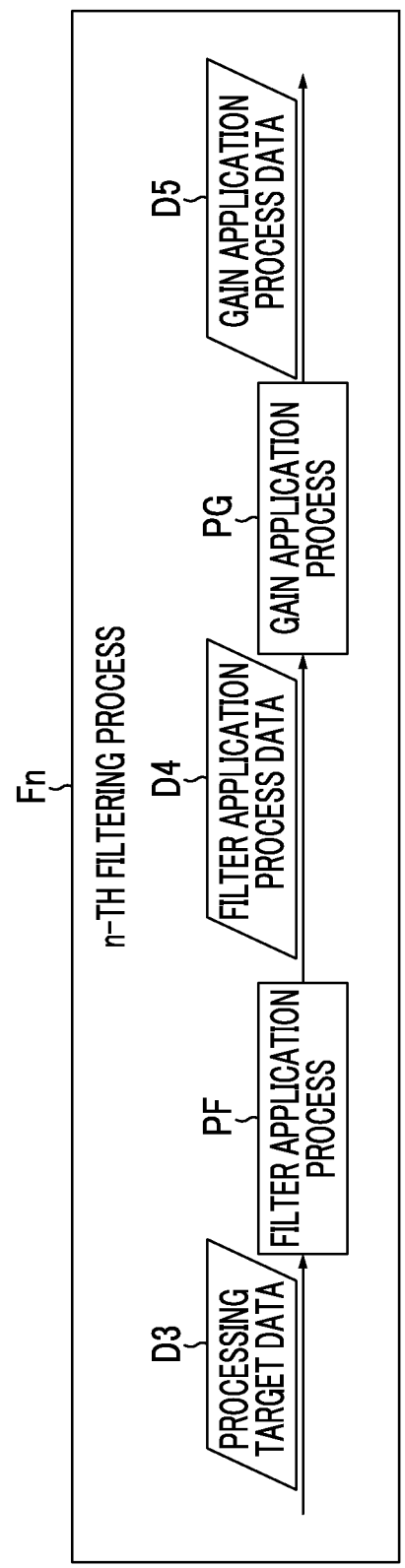
FIG. 7 is a conceptual diagram of an n-th filtering process (here, "n" is an integer which is equal to or greater than 1 and is equal to or smaller than N).

FIG. 7 is a conceptual diagram of an n-th filtering process Fn (here, "n" is an integer which is equal to or greater than 1 and is equal to or smaller than N). Each filtering process (the n-th filtering process Fn) of the image filtering process P includes a filter application processed PF and a gain application process PG. The filter application process PF is a process of applying a filter to processing target data D3 to acquire filter application process data D4, and the gain application process PG is a process of applying a gain to the filter application process data D4 to acquire gain application process data D5.

In each of the plurality of times of filtering processes (the first filtering process F1 to the N-th filtering process FN) included in the image filtering process P performed by the filtering process unit 41, a filter applied to the processing target data D3 in the filter application process PF is not particularly limited.

For example, the filter used in the filter application process PF may be determined according to an optical characteristic of an optical system, and a "point spread function" of the optical system may be suitably used as the "optical characteristic of the optical system" used as the basis of the filter. By determining the filter according to the optical characteristic of the optical system, it is possible to accurately perform the image filtering process P (filtering processes) of the original image data D1 influenced by the optical characteristic of the optical system. For example, by using a filter designed based on the point spread function, it is possible to perform the image filtering process P (filtering processes) for reducing the influence of the point spread phenomenon.

The "filter determined according to the optical characteristic of the optical system" is not limited to the filter determined based on the point spread function, and a contour emphasis filter or another filter may be used as the "filter determined according to the optical characteristic of the optical system". Even in the case of the filter (contour emphasis filter or the like) other than the filter based on the point spread function, the filter (contour emphasis filter or the like) may be adjusted according to various conditions (for example, the above-described various factors such as a diaphragm value (F-number)), and a filter such as a contour emphasis filter having a filter coefficient (tap coefficient) adjusted based on optical characteristics that changes according to the various conditions (for example, the above-described various factors such as a diaphragm value (F-number)) may be used in each filter application process PF.

Accordingly, in at least any one filtering process among the plurality of times of filtering processes (the first filtering process F1 to the N-th filtering process FN), the filtering process unit 41 may acquire filter application process data D4 using a filter determined according to a characteristic (an optical characteristic (point spread function)) of the optical system (lens 14, diaphragm 15, and the like).

Further, in a case where a filter is determined according to an optical characteristic of an optical system, in a case where the optical characteristic of the optical system varies according to imaging conditions, the filter may be determined according to the optical characteristic of the optical system under a representative imaging condition. For example, in a case where a filter is determined according to a point spread function of an optical system, it is possible to design the filter based on the point spread function under a representative condition with respect to one or a plurality of imaging conditions among imaging conditions such as an F-number, a zoom value, a subject distance, a focal position, an optical system type, a sensor SN ratio of the imaging element 24 which can influence the point spread function, an image height (in-image position) or an optical system individual difference. For example, "the representative imaging condition" may be determined based on a predicted "employed frequency when the original image data D1 is acquired", or the filter may be designed using an imaging condition having a high predicted employed frequency as the "representative imaging condition".

Accordingly, the filtering process unit 41 may use a plurality of filters based on the point spread function of the optical system (the lens 14, the diaphragm 15, and the like), which is a plurality of filters obtained by changing factors affecting a characteristic of the point spread function, in the plurality of times of filtering processes (the first filtering process F1 to the N-th filtering process FN). As the factors that affect the characteristic of the point spread function, for example, imaging conditions such as a diaphragm value (F-number), a zoom value (focal length), a subject distance, a focal position, an optical system type, a sensor SN ratio of the imaging element 24, an image height (in-image position (pixel position and position of the optical system)), or an individual optical system difference may be used. Filters derived based on point spread functions having different characteristic data in one or a plurality of factors among these factors may be used in each filter application process PF.

Further, the filtering process unit 41 may acquire the filter application process data D4 using a filter determined irrespective of the characteristics of the optical system (the lens 14, the diaphragm 15, and the like) used when the original image data D1 is acquired by imaging, in at least any one filtering process among the plurality of times of filtering processes (the first filtering process F1 to the N-th filtering process FN). As the "filter determined irrespective of the characteristics of the optical system", a contour emphasis filter may be used, for example.

On the other hand, in each of the plurality of times of filtering processes (the first filtering process F1 to the N-th filtering process FN) in the image filtering process P, a gain applied to the filter application process data D4 in the gain application process PG is acquired based on the "target frequency characteristic of the image filtering process P determined according to the pixel position in the original image data".

The "target frequency characteristic of the image filtering process P" may be experimentally or theoretically obtained in advance according to the type of the optical system, and the "gain used in the gain application process PG" acquired based on the "target frequency characteristic of the image filtering process P" may also be obtained in advance.

For example, in a case where the "point spread function" is assumed as the optical characteristic, imaging conditions (F-number or the like) capable of being employed when the original image data D1 is acquired through imaging may be assumed in advance, and a point spread function corresponding to each type of the optical system and each pixel position (for each position of the optical system) may be derived in advance with respect to each of the "imaging conditions capable of being employed". The target frequency characteristic of the image filtering process P may be represented by a frequency characteristic based on the point spread function (optical transfer function) of the optical system, and an inverse filter design method using an arbitrary design standard such as a Wiener filter may be used.

In addition, in a case where the filter used in the filter application process PF is fixed, the frequency characteristics of the filter may be obtained in advance. Accordingly, in a case where the filter is fixedly used in the filter application process PF, it is possible to derive in advance the "gain according to the target frequency characteristic of the image filtering process P determined according to the pixel position in the original image data" based on the frequency characteristic of the filter and the point spread function which is derived in advance. The gain derived in this way is supplied to the filtering process unit 41 (see a "gain application unit 49" which will be described later) by the gain specifying unit 43 shown in FIG. 3 or the gain acquisition unit 45 shown in FIGS. 4 and 5.

A specific example of a gain calculation method will be described later, but it is preferable that the "target frequency characteristic of the image filtering process P" or the "gain according to the target frequency characteristic of the image filtering process P" is obtained in advance on a maker side of the digital camera 10 (lens unit 11 and/or the camera main body 12) and is stored in a memory, and it is preferable that the data stored in the memory can be appropriately used when the image filtering process P of the original image data D1 is performed.

The target frequency characteristic of the image filtering process P is not limited to the frequency characteristic based on the optical characteristic such as the point spread function (optical transfer function) of the optical system (the lens 14, the diaphragm 15, and the like), and various frequency characteristics derived based on the imaging conditions (the above-described various factors of the diaphragm value (F-number) or the like) of the optical system (the lens 14, the diaphragm 15, and the like) may be used as the "target frequency characteristic of the image filtering process P". Accordingly, for example, a "frequency characteristic having different peaks according to the diaphragm value (F-number)" may be set as the "target frequency characteristic of the image filtering process P".

Next, a circuit configuration example in which the image filtering process P (the plurality of times of filtering processes) is performed will be described.

It is preferable that the number N of filtering processes (the first filtering process F1 to the N-th filtering process FN) that form the image filtering process P is smaller than the number M of filters in a case where the filters are designed according to factors in the method according to the related art. The number N of filtering processes that form the image filtering process P is set so that N is preferably equal to or lower than 50% of M, more preferably, is equal to or lower than 30% of M, and still more preferably, is equal to or lower than 10% of M. Here, an upper limit of the number N of filtering processes that form the image filtering process P is the number of taps (maximum tap number) of a filter having the maximum tap number among filters used in the plurality of times of filtering processes. This is because the types of filters do not increase to exceed the number of taps of the filter.

The number N of filtering processes that form the image filtering process P is preferably equal to or smaller than 10, more preferably, is equal to or smaller than 6, and still more preferably, is equal to or smaller than 4, but a specific numerical value example of the number N of filtering processes is not limited thereto. Further, the number of taps of a plurality of filters used in the plurality of times of filtering processes (filtering process unit 41) that form the image filtering process P may be the same between filters, or may be different from each other.

In the following description relating to FIGS. 8 to 12, for ease of description, a case where plurality of times of filtering processes performed by the filtering process unit 41 are configured by the first filtering process F1 and the second filtering process F2 assuming that "N=2" will be described. Here, in a case where "N" is an integer which is equal to or greater than 3 and three or more times of filtering processes are performed by the filtering process unit 41, it is similarly possible to realize the filtering process unit 41 using the same design method.

Further, in the following description relating to FIGS. 8 to 12, for ease of description, a case where the image processing unit 35 has the configuration shown in FIG. 3 is described, but in a case where the image filtering the image processing unit 35 has another configuration (for example, see FIGS. 4 and 5), similarly, it is possible to perform a plurality of times of filtering processes.

Figure 8:
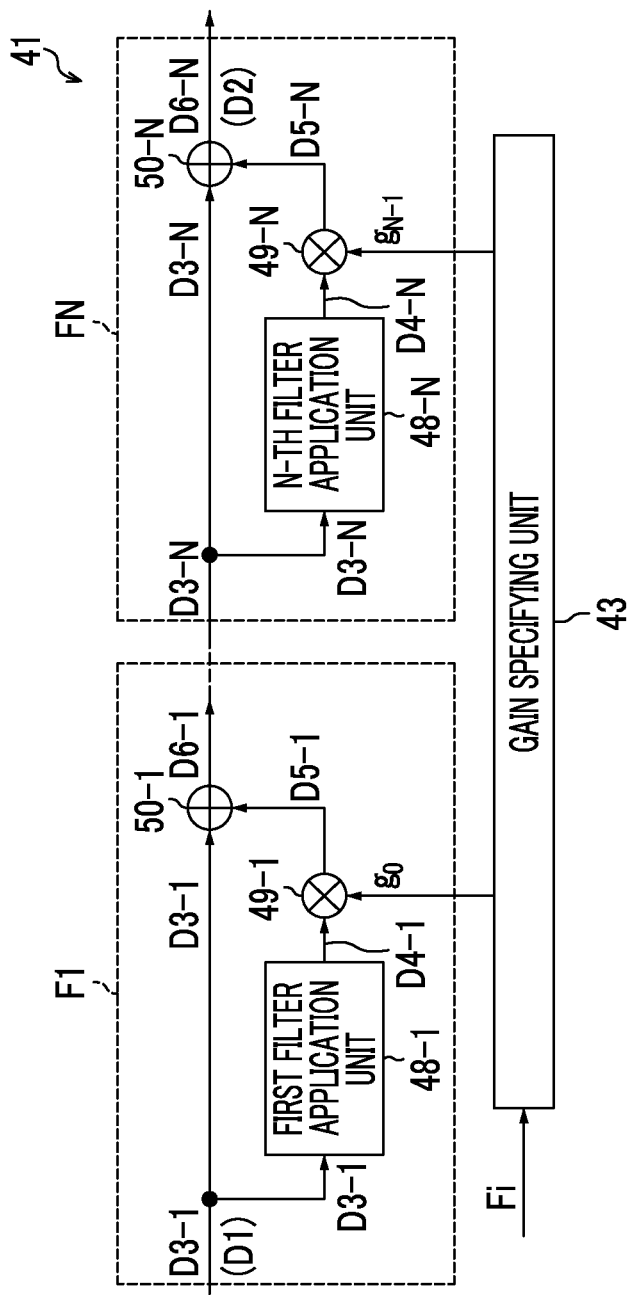
FIG. 8 is a diagram showing an example of a circuit configuration of a filtering process unit.

FIG. 8 is a diagram showing an example of a circuit configuration of the filtering process unit 41. FIG. 8 shows an example of a case where circuits that respectively perform the first filtering process F1 to the N-th filtering process FN (here, in this example, "N=2") are connected in series.

The filtering process unit 41 in this example uses filtering process data D6-1 acquired in the first filtering process F1 as processing target data D3-2 in the second filtering process F2. That is, the filtering process unit 41 includes a first filter application unit 48-1, a first gain application unit 49-1, and a first process data calculation unit 50-1, and accordingly, the first filtering process F1 is performed. Further, the filtering process unit 41 includes a second filter application unit 48-2, a second gain application unit 49-2, and a second process data calculation unit 50-2, and accordingly, the second filtering process F2 is performed.

The first filter application unit 48-1 applies a filter for the first filtering process to processing target data D3-1 of the first filtering process F1 to acquire filter application process data D4-1. The first gain application unit 49-1 applies a gain $g_0$ for the first filtering process to the filter application process data D4-1 output from the first filter application unit 48-1 to acquire gain application process data D5-1. Similarly, the second filter application unit 48-2 applies a filter for the second filtering process to processing target data D3-2 of the second filtering process F2 to acquire filter application process data D4-2. The second gain application unit 49-2 applies a gain $g_1$ for the second filtering process to the filter application process data D4-2 output from the second filter application unit 48-2 to acquire gain application process data D5-2.

Further, the filtering process unit 41 in this example further includes a first process data calculation unit 50-1 and a second process data calculation unit 50-2 that add the processing target data D3 and the gain application process data D5 and output filtering process data D6. That is, the first process data calculation unit 50-1 adds the processing target data D3-1 to the gain application process data D5-1 output from the first gain application unit 49-1 and outputs the result to the filtering process data D6-1. Similarly, the second process data calculation unit 50-2 adds the processing target data D3-2 to the gain application process data D5-2 output from the second gain application unit 49-2 and outputs the result to the filtering process data D6-2.

In this example in which the image filtering process P is configured by the first filtering process F1 and the second filtering process F2, the processing target data D3-1 in the first filtering process F1 corresponds to the original image data D1, and the filtering process data D6-2 in the second filtering process F2 corresponds to the processed image data D2.

The filter used in each filtering process may be retained by each filter application unit 48 (the first filter application unit 48-1 and the second filter application unit 48-2), or may be stored in a memory (not shown) to be appropriately read by each filter application unit 48.

Further, the gain used in each filtering process may be supplied to each gain application unit 49 (the first gain application unit 49-1 and the second gain application unit 49-2) by the gain specifying unit 43.

The filtering process unit 41 in this example performs a plurality of times of filtering processes (the first filtering process F1 and the second filtering process F2) for each pixel of the original image data D1. The gain specifying unit 43 acquires processed pixel information Fi indicating a pixel position of the original image data D1 which is a target of a plurality of times of filtering processes, specifies candidate data associated with the pixel position indicated by the processed pixel information Fi as a gain applied to filter application process data D4-1 and D4-2 in each of the plurality of times of filtering processes, and supplies the result to the first gain application unit 49-1 and the second gain application unit 49-2.

For example, in a case where the first filtering process F1 and the second filtering process F2 are performed with respect to certain pixel data that forms the original image data D1, the processed pixel information Fi indicating a pixel position (position of the optical system) of pixel data (processing target data D3) which is a processing target thereof is input to the gain specifying unit 43. The processed pixel information Fi may be information directly or indirectly indicating the pixel position of the pixel data which is the processing target thereof, and is input to the gain specifying unit 43 from another portion (not shown) of the image processing unit 35 at an appropriate timing. The gain specifying unit 43 acquires candidate data of a gain associated with the pixel position of the pixel data which is the processing target from the gain candidate data storage unit 44 (gain table information) shown in FIG. 3, based on the input processed pixel information Fi, specifies the candidate data as the gain applied to the filter application process data in each of a plurality of times of filtering processes, and transmits the result to the filtering process unit 41. By repeating the series of gain supply processes for each pixel data of the original image data D1, the image filtering process P (the first filtering process F1 and the second filtering process F2) of the original image data D1 in the filtering process unit 41 is performed.

Figure 9:
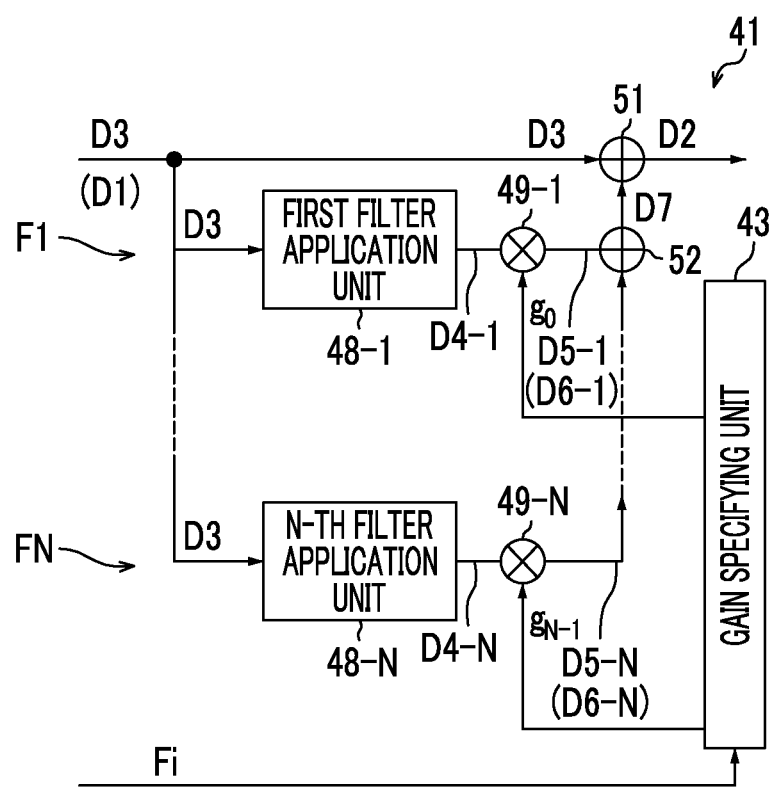
FIG. 9 is a diagram showing another example of the circuit configuration of the filtering process unit.

FIG. 9 is a diagram showing another example of the circuit configuration of the filtering process unit 41. FIG. 9 shows an example of a case where circuits that respectively perform the first filtering process F1 to the N-th filtering process FN (here, in this example, "N=2") are connected in parallel.

In this example, the first filter application unit 48-1 and the first gain application unit 49-1 relating to the first filtering process F1 are connected in series, and the second filter application unit 48-2 and the second gain application unit 49-2 relating to the second filtering process F2 are connected in series. Further, "the first filter application unit 48-1 and the first gain application unit 49-1 relating to the first filtering process F1" and "the second filter application unit 48-2 and the second gain application unit 49-2 relating to the second filtering process F2" are connected in parallel. In addition, the filtering process unit 41 includes an adder unit 52 that adds the gain application process data D5-1 output from the first gain application unit 49-1 and the gain application process data D5-2 output from the second gain application unit 49-2. Furthermore, the filtering process unit 41 includes a processed data acquisition unit 51 that acquires processed image data D2 by adding up addition data D7 obtained by adding up the gain application process data D5 (filtering process data D6) acquired in all the filtering processes (in this example, the first filtering process F1 and the second filtering process F2) and the processing target data D3.

The filtering process unit 41 in this example having the circuit configuration shown in FIG. 9 uses the same data (that is, the original image data D1) as the processing target data D3 in the first filtering process F1 and the second filtering process F2. Further, the filtering process unit 41 acquires the processed image data D2 based on the filtering process data D6-1 acquired in the first filtering process F1 and the filtering process data D6-2 acquired in the second filtering process F2. In this example, the gain application process data D5 output from the gain application unit 49 of each filtering process becomes the filtering process data D6 obtained in each filtering process.

The filtering process unit 41 in this example shown in FIG. 9 performs a plurality of times of filtering processes (the first filtering process F1 and the second filtering process F2) for each pixel of the original image data D1, in a similar way to the above-described filtering process unit 41 shown in the in FIG. 8. In addition, the gain specifying unit 43 acquires the processed pixel information Fi indicating the pixel position in the original image data D1 which is a target of the plurality of times of filtering processes, specifies the candidate data associated with the pixel position indicated by the processed pixel information Fi as the gain applied to the filter application process data D4-1 and D4-2 in each of the plurality of times of filtering processes, and supplies the result to the first gain application unit 49-1 and the second gain application unit 49-2.

Figure 10:
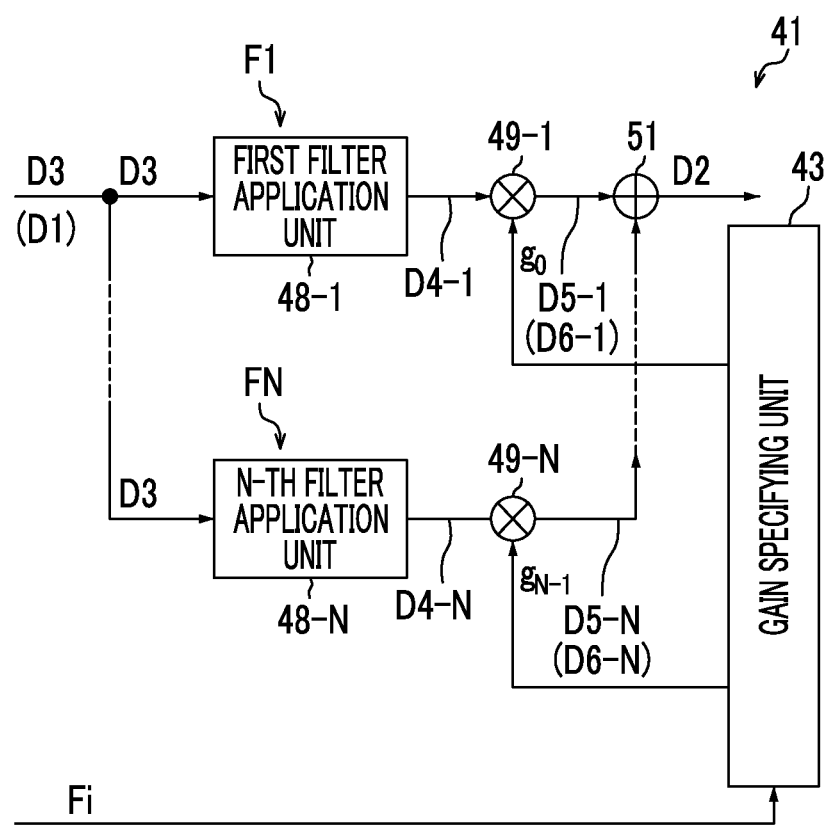
FIG. 10 is a diagram showing another example of the circuit configuration of the filtering process unit.

FIG. 10 is a diagram showing another example of the circuit configuration of the filtering process unit 41. FIG. 10 shows another example in which circuits that perform each of the first filtering process F1 to the N-th filtering process FN (here, in this example, "N=2") are connected in parallel.

Even in this example, similar to the example shown in FIG. 9, the first filter application unit 48-1 and the first gain application unit 49-1 relating to the first filtering process F1 are connected in series, and the second filter application unit 48-2 and the second gain application unit 49-2 relating to the second filtering process F2 are connected in series. Further, "the first filter application unit 48-1 and the first gain application unit 49-1 relating to the first filtering process F1" and "the second filter application unit 48-2 and the second gain application unit 49-2 relating to the second filtering process F2" are connected in parallel. Accordingly, the filtering process unit 41 in this example also uses the same data (that is, the original image data D1) as the processing target data D3 in the first filtering process F1 and the second filtering process F2.

Here, in this example, the gain application process data D5 (the filtering process data D6) acquired in all the filtering processes (in this example, the first filtering process F1 and the second filtering process F2) is added up by the processed data acquisition unit 51 to acquire the processed image data D2. That is, the filtering process unit 41 adds the filtering process data D6-1 acquired in the first filtering process F1 and the filtering process data D6-2 acquired in the second filtering process F2 in the processed data acquisition unit 51 to acquire the processed image data D2. In this example, the gain application process data D5 output from the gain application unit 49 in each filtering process becomes the filtering process data D6 obtained in each filtering process.

The filtering process unit 41 in this example shown in FIG. 10 performs a plurality of times of filtering processes (the first filtering process F1 and the second filtering process F2) for each pixel of the original image data D1, in a similar way to the above-described filtering process unit 41 shown in the in FIGS. 8 and 9. In addition, the gain specifying unit 43 acquires the processed pixel information Fi indicating the pixel position in the original image data D1 which is a target of the plurality of times of filtering processes, specifies the candidate data associated with the pixel position indicated by the processed pixel information Fi as the gain applied to the filter application process data D4-1 and D4-2 in each of the plurality of times of filtering processes, and supplies the result to the first gain application unit 49-1 and the second gain application unit 49-2.

Further, it is preferable that the image filtering process P (the first filtering process F1 to the N-th filtering process FN) in this example shown in FIG. 10 is set so that a filter response in a case where a frequency ($\omega$) is 0 is set to 1 ($\phi_n(0)=1$) and a brightness relating to an arbitrary gain is uniformly adjusted in order to prevent change in brightness (direct current (DC) component) of a processing target image.

In the above-described examples shown in FIGS. 9 to 10, "the filter application unit 48 and the gain application unit 49" are individually provided with respect to each of the plurality of times of filtering processes, but the plurality of times of filtering processes may be performed by "the filter application unit 48 and the gain application unit 49" which are commonly provided.

Figure 11:
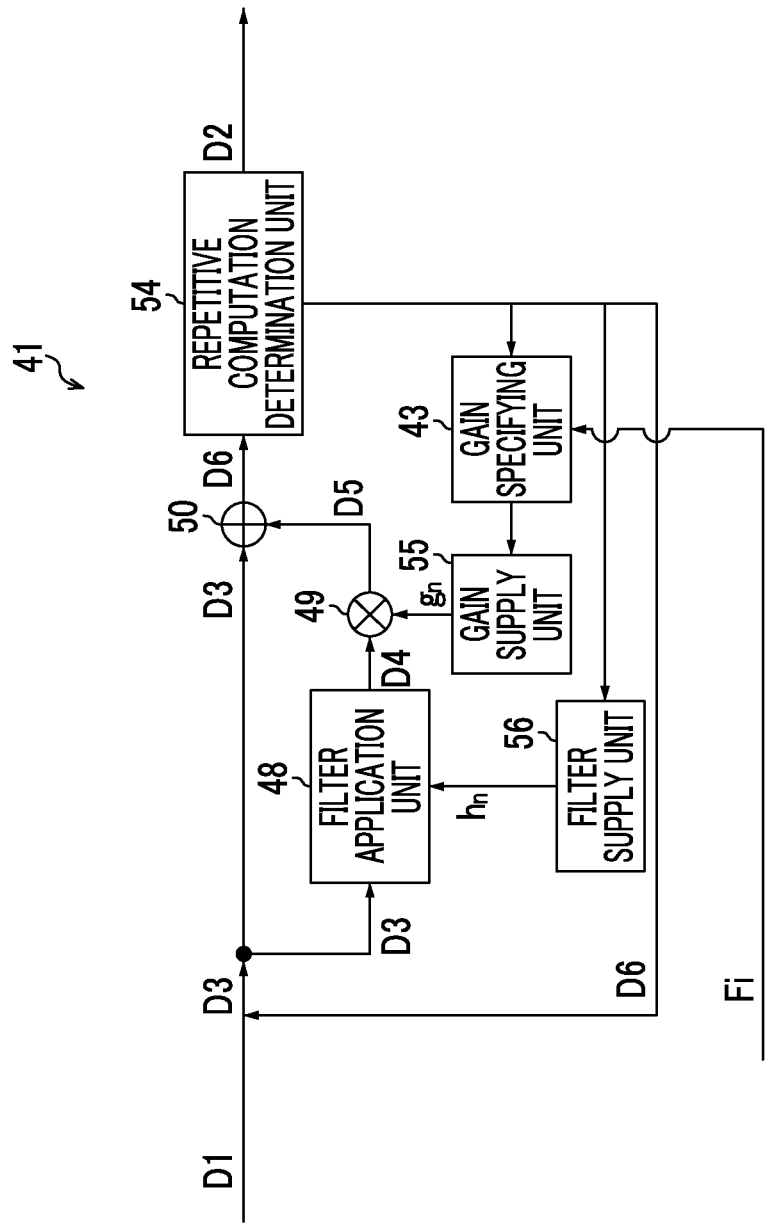
FIG. 11 is a diagram showing another example of the circuit configuration of the filtering process unit.

FIG. 11 is a diagram showing another example of the circuit configuration of the filtering process unit 41. FIG. 11 shows an example of a configuration of a circuit that performs a plurality of times of filtering processes by "the single filter application unit 48 and the single gain application unit 49". The circuit configuration example shown in FIG. 11 shows a function which is equivalent to the circuit configuration function of the above-described serial connection type shown in FIG. 9 with respect to the filter application process PF and the gain application process PG, but is different from the circuit configuration shown in FIG. 9 in that the plurality of times of filtering processes are performed by the single "filter application unit 48 and gain application unit 49".

That is, the filtering process unit 41 in this example includes the filter application unit 48 that applies a filter to the processing target data D3 to acquire the filter application process data D4, and the gain application unit 49 that applies a gain to the filter application process data D4 to acquire the gain application process data D5. Further, the filtering process unit 41 includes the process data calculation unit 50 that adds the gain application process data D5 and the processing target data D3 to acquire the filtering process data D6, and a repetitive computation determination unit 54 that determines whether repetition of computation processes in the filter application unit 48, the gain application unit 49, and the process data calculation unit 50 is necessary.

The repetitive computation determination unit 54 determines whether the number of times of filtering processes in the filter application unit 48, the gain application unit 49, and the process data calculation unit 50 reaches a predetermined number N (in this example, "N=2"). In a case where the number of times of filtering processes in the filter application unit 48, the gain application unit 49, and the process data calculation unit 50 does not reach N, the repetitive computation determination unit 54 feeds back the filtering process data D6 output from the process data calculation unit 50. If the filtering process data D6 is fed back, the filter application unit 48, the gain application unit 49, and the process data calculation unit 50 repeat the series of processes using the fed-back filtering process data D6 as new processing target data D3. In a case where the number of times of filtering processes by the filter application unit 48, the gain application unit 49, and the process data calculation unit 50 reaches N, the repetitive computation determination unit 54 outputs the filtering process data D6 which is finally output from the process data calculation unit 50 as the processed image data D2.

In this example, a filter $h_n$ used in the filter application unit 48 is supplied to the filter application unit 48 from a filter supply unit 56, a gain $g_n$ used in the gain application unit 49 is supplied to the gain application unit 49 from a gain supply unit 55. That is, "information about a filter $h_{n-1}$ and a gain $g_{n-1}$ used in an n-th filtering process (here, "$1 \leq n \leq N$") is retained in the filter supply unit 56 and the gain supply unit 55, or is retained in a memory (not shown). The filter supply unit 56 and the gain supply unit 55 receives information indicating that "a filtering process performed in the filter application unit 48, the gain application unit 49, and the process data calculation unit 50 is an n-th filtering process" from the repetitive computation determination unit 54, and supplies the filter $h_{n-1}$ and the gain $g_{n-1}$ to the filter application unit 48 and the gain application unit 49 based on the information from the repetitive computation determination unit 54.

Accordingly, the filter application unit 48 shown in FIG. 11 acquires the filter application process data D4 using a filter $h_0$ for the first filtering process in the first filtering process F1, and acquires the filter application process data D4 using a filter $h_1$ for the second filtering process in the second filtering process F2. Further, the gain application unit 49 acquires the gain application process data D5 using a gain $g_0$ for the first filtering process in the first filtering process F1, and acquires the gain application process data D5 using a gain $g_1$ for the second filtering process in the second filtering process F2.

The filtering process unit 41 in this example shown in FIG. 11 performs a plurality of times of filtering processes (the first filtering process F1 and the second filtering process F2) for each pixel of the original image data D1, in a similar way to the above-described filtering process unit 41 shown in the in FIGS. 8 to 10. In addition, the gain specifying unit 43 acquires the processed pixel information Fi indicating the pixel position in the original image data D1 which is a target of the plurality of times of filtering processes, specifies candidate data associated with the pixel position indicated by the processed pixel information Fi as the gain applied to the filter application process data D4 in each of the plurality of times of filtering processes, and supplies the result to the first gain application unit 49 through the gain supply unit 55. The gain supply unit 55 that supplies the gain to the gain application unit 49 may be integrally provided with the gain specifying unit 43.

The above-described circuit configurations shown in FIGS. 8 to 11 are only examples, and the filtering process unit 41 that performs the plurality of times of filtering processes may be realized by various circuit configurations, and a specific circuit configuration thereof is not particularly limited.

For example, in FIG. 11, an example of a circuit configuration in which a filtering process (image filtering process P) which is equivalent to the serial connection type shown in FIG. 9 by the single "filter application unit 48 and gain application unit 49" is shown, but similarly, a filtering process (image filtering process P) which is equivalent to the juxtaposition connection type shown in FIG. 9 or 10 may be performed by the circuit configuration having the single "filter application unit 48 and gain application unit 49".

Further, in the circuit configuration of the serial connection type shown in FIG. 8, the first process data calculation unit 50-1 and the second process data calculation unit 50-2 may not be provided. That is, the gain application process data D5-1 output from the first gain application unit 49-1 may be used as the filtering process data D6-1 of the first filtering process F1 and the processing target data D3-2 of the second filtering process F2, and the gain application process data D5-2 output from the second gain application unit 49-2 may be used as the filtering process data D6-2 of the second filtering process F2 and the processed image data D2. Similarly, in the circuit configuration shown in FIG. 11, the process data calculation unit 50 may not be provided, and in this case, the gain application process data D5 output from the gain application unit 49 may be used as the filtering process data D6.

In addition, strictly speaking, since an image deterioration characteristic varies according to a position of an optical system, it is preferable that the gain applied to the filter application process data D4 is optimized for each position of the optical system (for each pixel position) from a viewpoint of performing the image filtering process with high accuracy. Here, from a view point of reducing the amount of data necessary for the image filtering process, the gain applied to the filter application process data D4 may be prepared and stored only with respect to a plurality of specific positions (a plurality of representative pixel positions) of the optical system, instead of preparing and storing gains (candidate data) with respect to all the positions of the optical system (all pixel positions).

That is, there is a concern that a large amount of storage capacity is consumed in order to retain a gain relating to each of all the positions of the optical system (all pixel positions). In order to prevent the large amount of consumption of the storage capacity, the original image data D1 may be divided into a plurality of areas, a gain may be prepared and stored only with respect to representative positions (representative pixels) of each area, and with respect to positions (pixels) other than the representative positions (representative pixels), the gain may be acquired by an arbitrary adjacent interpolation process (for example, a bilinear method, a spline method, or the like).

Further, as in an example of a circuit configuration shown in FIG. 12, by using representative position coordinates (hereinafter, may be referred to as "large-area coordinates") and relative position coordinates in each area (hereinafter, may be referred to as "local coordinates") of the plurality of areas obtained by dividing the original image data D1, the "securing the excellent accuracy of the image filtering process (filtering process)" and the "reduction of the necessary storage capacity" may be compatibly achieved.

Figure 12:
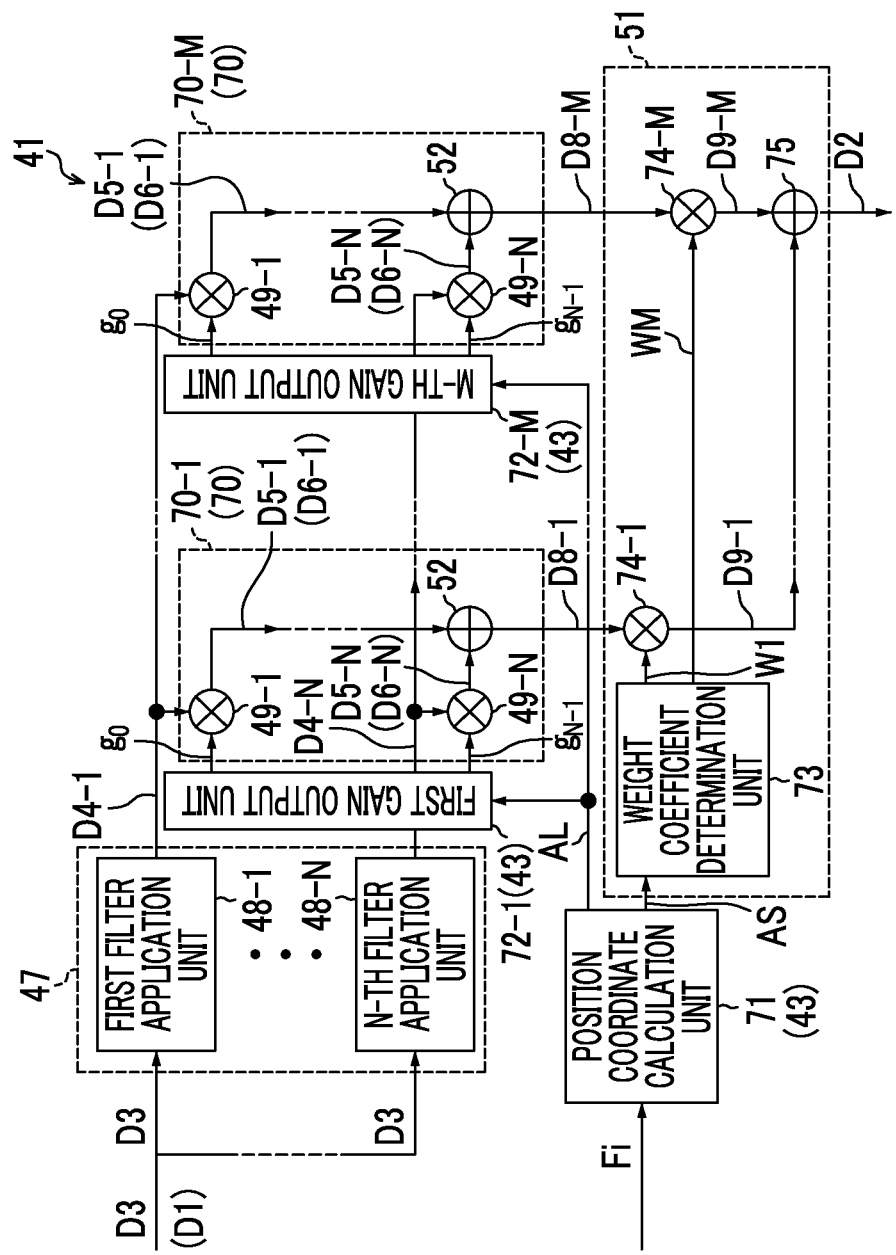
FIG. 12 is a diagram showing another example of the circuit configuration of the filtering process unit.

FIG. 12 is a diagram showing another example of the circuit configuration of the filtering process unit 41.

The filtering process unit 41 in this example includes a filter application block 47, a gain application block 70, and a processed data acquisition unit 51.

The filter application block 47 of the filtering process unit 41 includes a plurality of filter application units (a first filter application unit 48-1 to an N-th filter application unit 48-N (here, "N" is an integer which is equal to or greater than 2")), and applies a plurality of types of filters to the processing target data D3 to acquire a plurality of piece of filter application process data D4-1 to D4-N. In this example, the processing target data D3 is common in the plurality of filter application units, and the original image data D1 is input to each of the first filter application unit 48-1 to the N-th filter application unit 48-N as the processing target data D3.

The plurality of types of filters used in the filter application block 47 (the first filter application unit 48-1 to the N-th filter application unit 48-N) are not particularly limited, but preferably, include a reference filter determined according to an average of a plurality of target frequency characteristics determined according to the "plurality of representative pixel positions (hereinafter, may be referred to as "representative pixel positions")" and a variance filter determined according to a variance of the plurality of target frequency characteristics. Details about the reference filter and the variance filter will be described later.

The gain application block 70 applies a gain to the plurality of filter application process data D4-1 to D4-N generated by the filter application block 47 (the first filter application unit 48-1 to the N-th filter application unit 48-N) to acquire gain application process data D5-1 to D5-N. More specifically, the gain application block 70 includes a plurality of gain blocks (a first gain block 70-1 to an M-th gain block 70-M (here, "M" is an integer which is equal to or greater than 2)). Each of the plurality of gain blocks includes a first gain application unit 49-1 to an N-th gain application unit 49-N, and an adder unit 52, and applies a gain to the plurality of filter application process data D4-1 to D4-N by the first gain application unit 49-1 to the N-th gain application unit 49-N to acquire the plurality of gain application process data D5-1 to D5-N. Accordingly, the number of gain application units (the first gain application unit 49-1 to the N-th gain application units 49-N) included in each gain block is equal to the number of filter application units (the first filter application unit 48-1 to the N-th filter application unit 48-N) that form the filter application block 47.

In addition, each of the plurality of gain blocks acquires filtering process data D6-1 to D6-N from the plurality of gain application process data D5-1 to D5-N, and acquires block process data D8 from the plurality of filtering process data D6-1 to D6-N by the adder unit 52. In this example, the gain application process data D5-1 to D5-N and the filtering process data D6-1 to D6-N are configured by the same data, and the block process data D8 is derived by the sum of the filtering process data D6-1 to D6-N.

In this way, in this example, a plurality of filtering processes (a first filtering process F1 to an M-th filtering process FM) is performed by each of the filter application block 47 and the plurality of times of gain blocks (the first gain block 70-1 to the M-th gain block 70-M), and each filtering process is performed according to a combination of the filter application block 47 and each gain block.

The processed data acquisition unit 51 acquires the processed image data D2 by performing a weighting computation with respect to the block process data, based on the block process data (first block process data D8-1 to M-th block process data D8-M) acquired in the plurality of gain blocks (the first gain block 70-1 to the M-th gain block 70-M). More specifically, the processed data acquisition unit 51 includes a weight coefficient determination unit 73, a first weight adjustment unit 74-1 to an M-th weight adjustment unit 74-M, and a weight adder unit 75.

The weight coefficient determination unit 73 of the processed data acquisition unit 51 determines a weight coefficient (a first weight coefficient W1 to an M-th weight coefficient WM) allocated to each of block process data (first block process data D8-1 to M-th block process data D8-M) acquired by the plurality of gain blocks (the first gain block 70-1 to the M-th gain block 70-M) based on a pixel position of the processing target data. More specifically, the weight coefficient determination unit 73 determines the first weight coefficient W1 to the M-th weight coefficient WM to be supplied to the first weight adjustment unit 74-1 and the M-th weight adjustment unit 74-M based on local coordinate data AS supplied from a position coordinate calculation unit 71.

The first weight adjustment unit 74-1 and the M-th weight adjustment unit 74-M and the weight adder unit 75 of the processed data acquisition unit 51 perform a weighting computation for applying the weight coefficients (the first weight coefficient W1 to the M-th weight coefficient WM) to the block process data (the first block process data D8-1 to the M-th block process data D8-M) to acquire the processed image data D2. That is, the first weight adjustment unit 74-1 to the M-th weight adjustment unit 74-M are respectively supplied with the weight coefficients (the first weight coefficient W1 to the M-th weight coefficient WM) from the weight coefficient determination unit 73, and apply the weigh coefficients (the first weight coefficient W1 to the M-th weight coefficient WM) to the first block process data D8-1 to the M-th block process data D8-M output from the first gain block 70-1 to the M-th gain block 70-M. The weight adder unit 75 adds up first weighted data D9-1 and M-th weighted data D9-M after application of the weight coefficients, respectively output from the first weight adjustment unit 74-1 to the M-th weight adjustment unit 74-M, to acquire the processed image data D2, and outputs the result.

The position coordinate calculation unit 71 functions as the first gain output unit 72-1 to the M-th gain output unit 72-M in cooperation with the gain specifying unit 43. That is, the position coordinate calculation unit 71 acquires the processed pixel information Fi indicating a pixel position of the processing target data D3 (in this example, the original image data D1) which is a target of the plurality of times of filtering processes. The position coordinate calculation unit 71 transmits large-area coordinate data AL that directly or indirectly indicates a corresponding position on the large-area coordinate at the pixel position indicated by the processed pixel information Fi to the first gain output unit 72-1 to the M-th gain output unit 72-M, and transmits local coordinate data AS that directly or indirectly indicates a corresponding position on the local coordinate of the pixel position indicated by the processed pixel information Fi to the weight coefficient determination unit 73.

The first gain output unit 72-1 to the M-th gain output unit 72-M correspond to the first gain block 70-1 to the M-th gain block 70-M, respectively, and supply gains g0 to gN−1 to the first gain application unit 49-1 to the N-th gain application unit 49-N included in the corresponding gain blocks based on large-area coordinate data AL.

In the filtering process unit 41 and the gain specifying unit 43 (the position coordinate calculation unit 71, and the first gain output unit 72-1 to the M-th gain output unit 72-M) shown in FIG. 12 having the above-described circuit configuration, with respect to pixel data of representative pixel positions (representative pixel positions) among a plurality of pieces of pixel data that forms the processing target data D3 (original image data D1), a gain acquired based on the "target frequency characteristic" determined according to the representative pixel positions is used to perform the image filtering process P (filtering process). On the other hand, with respect to pixel data of pixel positions (hereinafter, may be referred to as "non-representative pixel positions") other than the representative pixel positions among the plurality of pieces of pixel data that forms the processing target data D3 (original image data D1), a gain acquired with respect to the plurality of representative pixel positions is used, but since adjustment is performed through the weighting computation, the image filtering process P (filtering processes) suitable for the non-representative pixel positions is performed.

That is, in this example, the gain table information stored in the gain candidate data storage unit 44 (see FIG. 3) is configured so that specific candidate data relating to gains is associated with the plurality of representative pixel positions (representative pixel positions) specific candidate data relating to gains associated with one or more pixel positions among the plurality of representative pixel positions (representative pixel positions) is associated with the pixel positions (non-representative pixel positions) other than the plurality of representative pixel positions. The number of representative pixel positions associated with the non-representative pixel positions corresponds to the number of gain blocks included in the gain application block 70 shown in FIG. 12. Accordingly, in the example shown in FIG. 12 in which the gain application block 70 is configured by the first gain block 70-1 to the M-th gain block 70-M, the number of representative pixel positions associated with the non-representative pixel positions becomes "M".

Further, the gain table information in this example is configured so that a plurality of pieces of candidate data relating to gains is respectively associated with the above-described "plurality of representative pixel positions (representative pixel positions)". The plurality of pieces of candidate data respectively associated with the plurality of pieces of representative pixel positions is specified as gains applied to the plurality of pieces of filter application process data D4-1 to D4-N, by the position coordinate calculation unit 71 and the first gain output unit 72-1 to the M-th gain output unit 72-M that function as the gain specifying unit 43. Thus, the number of "the plurality of pieces of candidate data relating to the gains" respectively associated with the representative pixel positions corresponds to the number of the gain application units 49 included in each gain block. Accordingly, in the example shown in FIG. 12 in which each gain block includes the first gain application unit 49-1 to the N-th gain application unit 49-N, the number of "the plurality of pieces of candidate data relating to the gains" respectively associated with the representative pixel positions becomes "N".

For example, in a case where the number of gain blocks included in the gain application block 70 is "2" (that is, in a case where it is assumed that "M=2"), the plurality of gain blocks that forms the gain application block 70 includes the first gain block 70-1 and the second gain block 70-2, and the number of representative pixel positions associated with the non-representative pixel positions becomes "2". In this case, the first gain block 70-1 and the second gain block 70-2 respectively applies gains specified by the position coordinate calculation unit 71, and the first gain output unit 72-1 and the second gain output unit 72-2, to each of the plurality of filter application process data D4-1 to D4-N. Further, the processed data acquisition unit 51 acquires the processed image data D2 based on the first block process data D8-1 acquired by the first gain block 70-1 and the second block process data D8-2 acquired by the second gain block.

Particularly, in a case where the filtering process unit 41 performs a plurality of times of filtering processes with respect to the pixel positions (non-representative pixel positions) other than the above-described plurality of representative pixel positions, the position coordinate calculation unit 71, the first gain output unit 72-1 and the second gain output unit 72-2 (gain specifying unit 43) specify candidate data of a gain associated with "a first representative pixel position", among candidate data of gains associated with the pixel positions (non-representative pixel positions) other than the plurality of representative pixel positions, as a gain used in the first gain block 70-1, and specify candidate data of a gain associated with "a second representative pixel position" as a gain used in the second gain block 70-2. The "first representative pixel position" and the "second representative pixel position" correspond to the plurality of representative pixel positions associated with the non-representative pixel positions.

Accordingly, in a case where the processing target data D3 (pixel data) of the pixel positions (non-representative pixel positions) which are processing targets is associated with a pixel position A (the first representative pixel position) and a pixel position B (the second representative pixel position), it is preferable that "the gains g0 to gN−1 supplied to the first gain application unit 49-1 to the N-th gain application unit 49-N of the first gain block 70-1 from the first gain output unit 72-1" are determines so that a combination process of "the filter application block 47 and the first gain block 70-1" is optimized for "the pixel position A". Further, it is preferable that "the gains g0 to gN−1 supplied to the first gain application unit 49-1 to the N-th gain application unit 49-N of the second gain block 70-2 from the second gain output unit 72-2" are determines so that a combination process of "the filter application block 47 and the second gain block 70-2" is optimized for "the pixel position B". In this case, by performing a weighting computation of "the first block process data D8-1 optimized for the pixel position A" and "the second block process data D8-2 optimized for the pixel position B" in the processed data acquisition unit 51 based on the local coordinate data AS indicating "relative positional relationships with respect to the pixel position A and the pixel position B" of the process target data D3 (pixel data) of the pixel positions (non-representative pixel positions) which are processing targets, it is possible to acquire the processed image data D2 relating to the non-representative pixel positions.

In a case where the processing target data D3 (pixel data) corresponds to the non-representative pixel positions as described above, each of the plurality of gain blocks (the first gain block 70-1 to the M-th gain block 70-M) included in the gain application block 70 is optimized for each of the plurality of representative pixel positions associated with the non-representative pixel positions. Further, by adjusting block process data (the first block process data D8-1 to the M-th block process data D8-M) output from the plurality of gain blocks optimized for the plurality of representative pixel positions associated with the non-representative pixel positions by a weighting computation with the processed data acquisition unit 51, the processed image data D2 relating to the non-representative pixel positions is acquired.

Accordingly, the large-area coordinate data AL supplied to the respective gain output units (the first gain output unit 72-1 to the M-th gain output unit 72-M) from the position coordinate calculation unit 71 directly or indirectly represents the plurality of representative pixel positions associated with the pixel positions of the processing target data D3. The respective gain output units (the first gain output unit 72-1 to the M-th gain output unit 72-M) supply gains optimized for the "plurality of representative pixel positions associated with the pixel positions of the processing target data D3" to corresponding gain blocks (the first gain block 70-1 to the M-th gain block 70-M) based on the received large-area coordinate data AL. For example, the first gain output unit 72-1 supplies a gain corresponding to "the first representative pixel position" associated with the pixel position of the processing target data D3 to the first gain block 70-1. Similarly, the M-th gain output unit 72-M supplies a gain corresponding to "the M-th representative pixel position" associated with the pixel position of the processing target data D3 to the M-th gain block 70-M.

On the other hand, the local coordinate data AS supplied to the weight coefficient determination unit 73 from the position coordinate calculation unit 71 directly or indirectly represents relative positions of the pixel positions of the processing target data D3 with respect to "the plurality of representative pixel positions associated with the pixel positions of the processing target data D3". The weight coefficient determination unit 73 determines weight coefficients (the first weight coefficient W1 to the M-th weight coefficient WM) for adjusting the block process data (the first block process data D8-1 to the M-th block process data D8-M) output from the respective gain blocks (the first gain block 70-1 to the M-th gain block 70-M), based on the received local coordinate data AS, and supplies the result to the corresponding weight adjustment units (the first weight adjustment unit 74-1 to the M-th weight adjustment unit 74-M).

In a case where the processing target data D3 (pixel data) corresponds to a representative pixel position, it is preferable that a gain optimized for the representative pixel position is supplied to the gain application unit (the first gain application unit 49-1 to the N-th gain application unit 49-N) of any gain block (for example, the first gain block 70-1) included in the gain application block 70 from the gain output unit (for example, the first gain output unit 72-1). In this case, a weight coefficient for block process data (for example, the first block process data D8-1) output from the gain block (for example, the first gain block 70-1) from which the gain optimized for the representative pixel position is supplied may be set to "1 (100%)", and a weight coefficient for block process data (for example, the second block process data D8-2 to the M-th block process data D8-M) output from another gain block may be set to "0 (0%)".

FIG. 13 is a conceptual diagram showing a relationship between representative pixel positions and candidate data relating to gains output from the first gain output unit 72-1 and the M-th gain output unit 72-M. Each gain output unit (the first gain output unit 72-1 to the M-th gain output unit 72-M) specifies "corresponding representative pixel positions" from the large-area coordinate data AL, and supplies candidate data relating to "N" gains associated with the specified "corresponding representative pixel positions" to "corresponding gain blocks (the first gain application unit 49-1 to the N-th gain application unit 49-N)". The "candidate data relating to the N gains associated with the respective representative pixel positions" is a set of gains optimized for realization of image filtering processes according to an optical characteristic of an optical system at the respective representative pixel positions. Accordingly, each gain output unit (the first gain output unit 72-1 to the M-th gain output unit 72-M) may retain table information indicating the relationship shown in FIG. 13, and may specify the gains with reference to the table information.

FIG. 14 is a conceptual diagram showing a relationship between the large-area coordinate data AL and the local coordinates data AS output from the position coordinate calculation unit 71 and pixel position data. The position coordinate calculation unit 71 acquires processed pixel information Fi, outputs the large-area coordinate data AL indicating data (see "first representative pixel position data" and "M-th representative pixel position data" in FIG. 14) indicating representative pixel positions associated with pixel positions (see "processing target pixel positions" in FIG. 14) which are processing targets indicated by the processed pixel information Fi to each gain output unit, and outputs the local coordinate data AS indicating data (see "relative position data" in FIG. 14) indicating relative positions with reference to the "associated representative pixel positions" of the pixel positions which are the processing targets indicated by the processed pixel information Fi to the weight coefficient determination unit 73. Accordingly, the position coordinate calculation unit 71 may retain table information indicating the relationship shown in FIG. 14, and may output the large-area coordinate data AL and the local coordinate data AS with reference to the table information.

FIG. 15 is a conceptual diagram showing a relationship between the local coordinate data AS input to the weight coefficient determination unit 73 and weight coefficients output from the weight coefficient determination unit 73. The weight coefficient determination unit 73 outputs weight coefficients (the first weight coefficient W1 to the M-th weight coefficient WM) associated with the local coordinate data AS input from the position coordinate calculation unit 71 to the weight adjustment units (the first weight adjustment unit 74-1 to the M-th weight adjustment unit 74-M). Accordingly, the weight coefficient determination unit 73 may retain table information shown in FIG. 15, and may output the weight coefficients (the first weight coefficient W1 to the M-th weight coefficient WM) with reference to the table information.

According to the filtering process unit 41 having the above-described circuit configuration shown in FIG. 12, it is possible to effectively and compatibly perform a high-accuracy filtering process and reduction of a necessary storage capacity. In the circuit configuration shown in FIGS. 8 to 11, basically, it is necessary to retain gain vectors relating to all pixels (that is, all positions of an optical system) of the processing target data D3 (original image data D1), and since an image deterioration characteristic varies in the unit of pixels of the processing target data D3, it is necessary to secure a corresponding storage capacity so as to retain the gain vectors. However, according to the circuit configuration shown in FIG. 12, it is sufficient if a vector table relating to the number of gains corresponding to the number of gain blocks (M) is retained, and it is possible to calculate the processed image data D2 with high accuracy by an interpolation process based on a weighting computation of the processed data acquisition unit 51 with respect to the processing target data D3 at the non-representative pixel positions.

<Gain Determination Method>

Next, a gain determination method used in the gain application unit 49 (a first gain application unit 49-1 to an N-th gain application unit 49-N) will be described.

FIG. 16 is a block diagram showing an example of a functional configuration of the gain acquisition unit 45, and shows the gain acquisition unit 45 which is suitably combined with the image processing unit 35 shown in FIG. 3. The gain acquisition unit 45 in this example includes a reference image acquisition unit 60, a reference image analysis unit 61, a target frequency characteristic acquisition unit 62, and an application gain calculation unit 63.

The reference image acquisition unit 60 acquires reference image data in which the optical characteristic of the optical system used when the original image data D1 is acquired, that is, an optical characteristic according to an imaging condition (pixel position (position of the optical system)) when the original image data D1 is acquired is reflected. It is preferable that the reference image data is acquired with respect to various lens units 11 (optical systems) that may be mounted on the camera main body 12 when the original image data D1 is acquired, and that the reference image data is acquired with respect to an imaging condition capable of being employed when the original image data D1 is acquired.

A method for acquiring the reference image data by the reference image acquisition unit 60 is not particularly limited. For example, a method for performing imaging while guiding a user in a state where the lens unit 11 including the optical system which is a measurement target is mounted in a camera main body 12 to input reference image data to the reference image acquisition unit 60 from the imaging element 24 may be used. Further, in a case where reference image data acquired by performing imaging in advance using the lens unit 11 including the optical system which is a measurement target is stored in a memory (the main body storage unit 29 or the like shown in FIG. 1), the reference image acquisition unit 60 may read the reference image data relating to the optical system which is the measurement target from the memory.

A subject for reference image data is not particularly limited, and the reference image data may be acquired by imaging a subject having a specific shape, pattern, and color, or may be acquired by imaging a subject having an unspecified shape, pattern, and color. In a case where reference image data is acquired by imaging a subject having a specific shape, pattern, and color, it is preferable that the reference image acquisition unit 60 controls a display or the like on the display unit 27 in cooperation with the device controller 34 (display controller 36 or the like) and performs induction of imaging of the subject. Further, in a case where reference image data is acquired by imaging a subject having an unspecific shape, pattern, and color, the reference image acquisition unit 60 may analyze previously captured image data stored in the main body storage unit 29, may select data for each imaging condition acquired using the lens unit 11 including the optical system which is the measurement target, which is data having a preferable image characteristic as reference image data, from the previously captured image data, and may specify the result as reference image data.

The reference image analysis unit 61 performs analysis of the reference image data acquired by the reference image acquisition unit 60, and acquires the optical characteristic according to the imaging condition when the original image data D1 is acquired. Specifically, the reference image analysis unit 61 may perform frequency analysis of the reference image data, for example, to acquire a point spread function (optical transfer function, or the like) for each position of the optical system which is the measurement target (for each pixel position).

The target frequency characteristic acquisition unit 62 specifies a target frequency characteristic in the image filtering process P, of the original image data D1 which is acquired through imaging using the optical system, based on "the optical characteristic according to the position of the optical system (for each pixel position)" acquired by the reference image analysis unit 61, for each position of the optical system (for each pixel position). For example, in a case where the image filtering process P is a process for canceling a point spread phenomenon of the optical system, the target frequency characteristic acquisition unit 62 may build a filter using an arbitrary design standard such as a Wiener filter, based on a point spread function (optical transfer function, or the like) for each position of the optical system (for each pixel position) acquired by the reference image analysis unit 61, to acquire the target frequency characteristic of the image filtering process P.

The application gain calculation unit 63 acquires a gain (candidate data) to be applied to filter application process data in each of a plurality of times of filtering processes, based on the "target frequency characteristic of the image filtering process P" specified by the target frequency characteristic acquisition unit 62. A gain acquisition method in the application gain calculation unit 63 is not particularly limited, and for example, a method for calculating a gain using a least squares method may be used, for example. That is, the application gain calculation unit 63 may fit the frequency characteristic of the image filtering process P using the least squares method based on the frequency characteristic of each of the plurality of times of filtering processes, with respect to the "target frequency characteristic of the image filtering process P" specified by the target frequency characteristic acquisition unit 62, to acquire a gain to be applied to the filter application process data in each of the plurality of times of filtering processes.

The application gain calculation unit 63 stores the acquired gain in the gain candidate data storage unit 44 as "gain candidate data". It is preferable that the gain candidate data is stored in the gain candidate data storage unit 44 in association with gain selection conditions relating to the target frequency characteristic of the image filtering process P. As the gain selection conditions, characteristic data indicating various factors capable of affecting the target frequency characteristic of the image filtering process P may be preferably used, and particularly, in this example, "the position of the optical system (pixel position)" is included in the gain selection conditions. Accordingly, in a case where the target frequency characteristic of the image filtering process P is "the frequency characteristic based on the point spread function (optical transfer function) of the optical system (lens 14, diaphragm 15, and the like) used when the original image data D1 is acquired by imaging", characteristic data relating to various factors that affect the point spread function (for example, imaging conditions such as a diaphragm value (F-number), a zoom value (focal length), a subject distance, a focal position, an optical system type, a sensor SN ratio of the imaging element 24, an image height (pixel position (position of the optical system)), or an individual optical system difference, in imaging for acquiring the original image data D1) may be associated with the gain candidate data as the "gain selection conditions".

In this way, in a case where the gain candidate data is stored in the gain candidate data storage unit 44 in association with the gain selection condition, it is preferable that the reference image acquisition unit 60 acquires a plurality of pieces of reference image data which are acquired through imaging under a plurality of imaging conditions (gain selection conditions), and it is preferable that the reference image analysis unit 61 analyzes a plurality of pieces of reference image data which are acquired through imaging under the plurality of imaging conditions to acquire optical characteristics. Further, it is preferable that the target frequency characteristic acquisition unit 62 acquires the target frequency characteristic of the image filtering process P relating to the plurality of imaging conditions from optical characteristics under the plurality of imaging conditions, and it is preferable that the application gain calculation unit 63 acquires gains associated with the plurality of imaging conditions, and stores the gains associated with the corresponding imaging conditions (gain selection conditions) in the gain candidate data storage unit 44.

Figure 17:
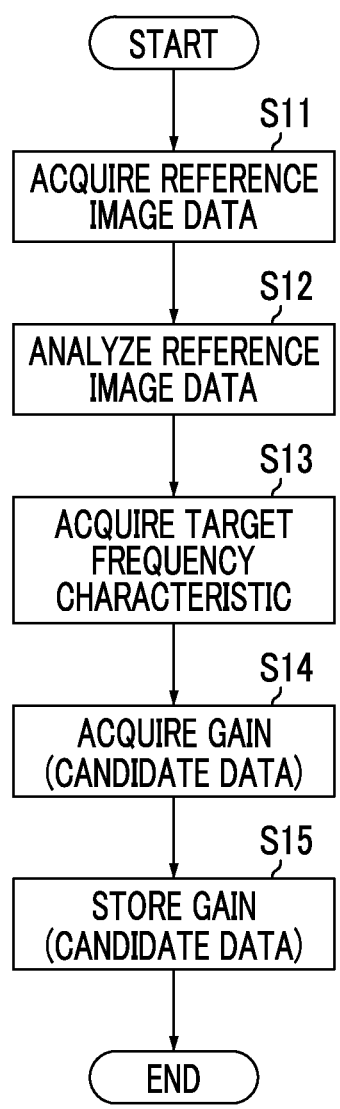
FIG. 17 is a flowchart showing a gain acquisition flow of the gain acquisition unit shown in FIG. 16.

FIG. 17 is a flowchart showing a gain acquisition flow of the gain acquisition unit 45 shown in FIG. 16. In this example, as described above, first, reference image data which is acquired through imaging using the optical system which is a measurement target is acquired by the reference image acquisition unit 60 (S11 in FIG. 17), and analysis of the reference image data is performed by the reference image analysis unit 61 to acquire an optical characteristic for each position of the optical system which is the measurement target (for each pixel position) (S12). Further, the target frequency characteristic of the image filtering process P is acquired by the target frequency characteristic acquisition unit 62 from an optical characteristic for each imaging condition of the optical system which is the measurement target is acquired (S13), and gain candidate data for each position of the optical system (for each pixel position) is acquired from the target frequency characteristic by the application gain calculation unit 63 (S14).

The candidate data of the gain acquired in this way is stored in the gain candidate data storage unit 44 by the application gain calculation unit 63 as "gain table information" associated with the optical characteristic for each position of the optical system which is the measurement target (for each pixel position) (S15). Thus, the gain specifying unit 43 may specify a gain to be applied to the filter application process data in each of the plurality of times of filtering processes from the gain candidate data stored in the gain candidate data storage unit 44, and may transmit the specified gain to the filtering process unit 41.

Figure 18:
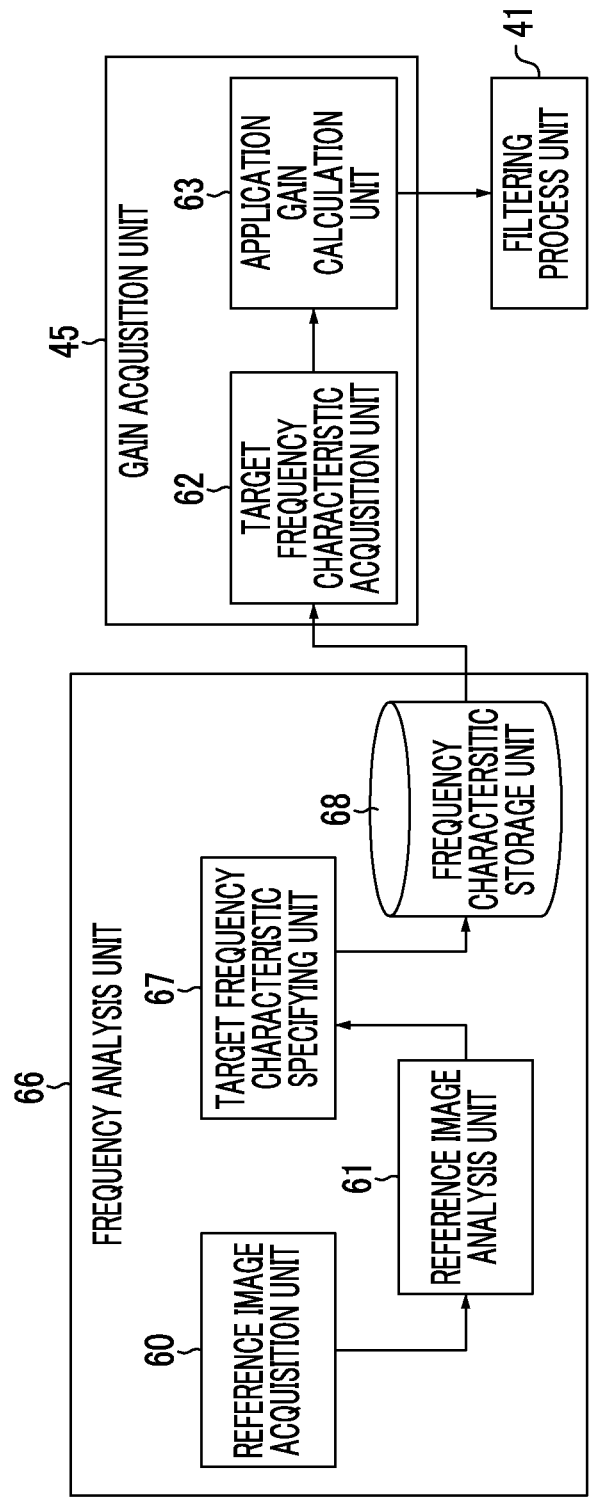
FIG. 18 is a block diagram showing another example of the functional configuration of the gain acquisition unit, and shows a gain acquisition unit which is suitably combined with the image processing unit shown in FIGS. 4 and 5.

FIG. 18 is a block diagram showing another example of the functional configuration of the gain acquisition unit 45, and shows the gain acquisition unit 45 which is suitably combined with the image processing unit 35 shown in FIGS. 4 and 5. The gain acquisition unit 45 in this example includes the target frequency characteristic acquisition unit 62 and the application gain calculation unit 63, in which the target frequency characteristic acquisition unit 62 acquires a target frequency characteristic of the image filtering process P from the frequency characteristic storage unit 68 of the frequency analysis unit 66.

The frequency analysis unit 66 includes the reference image acquisition unit 60, the reference image analysis unit 61, a target frequency characteristic specifying unit 67, and a frequency characteristic storage unit 68. The reference image acquisition unit 60 and the reference image analysis unit 61 in this example acquire reference image data, similar to the above-described reference image acquisition unit 60 and the reference image analysis unit 61 as shown in FIG. 16, and acquires the optical characteristic for each position of the optical system used when the original image data D1 is acquired (for each pixel position). Further, the target frequency characteristic specifying unit 67 in this example specifies a target frequency characteristic for each position of the optical system (for each pixel position), in the image filtering process P, of the original image data D1 which is acquired through imaging using the optical system, based on the optical characteristic for each position of the optical system (for each pixel position) acquired by the reference image analysis unit 61, similar to the above-described target frequency characteristic acquisition unit 62 shown in FIG. 16.

Here, the target frequency characteristic specifying unit 67 in this example stores data relating to the target frequency characteristic of the specified image filtering process P in the frequency characteristic storage unit 68 in association with data on a corresponding optical system and the position of the optical system (pixel position). Here, the "data on the corresponding optical system and the position of the optical system (pixel position)" may be arbitrary data capable of individually specifying an optical system which is a measurement target and the position of the optical system (pixel position), and for example, may be represented as a combination of type information (for example, a model number, or the like) and the position information of the optical system (for example, pixel position information, or the like) allocated to the individual optical system (lens unit 11), or the like.

The target frequency characteristic acquisition unit 62 in this example acquires type information of an optical system (data on a corresponding optical system) used in imaging of the original image data D1 which is a target of the image filtering process P in the filtering process unit 41 and position information of the processing target data D3 (information indicating the position of the optical system (pixel position)), and acquires data relating to a target frequency characteristic of the image filtering process P associated with the optical system used in imaging of the original image data D1 and the position information of the processing target data D3 from the frequency characteristic storage unit 68 based on the type information and the position information. The application gain calculation unit 63 acquires the gain to be applied to the filter application process data in each of the plurality of times of filtering processes based on the "target frequency characteristic of the image filtering process P" specified by the target frequency characteristic acquisition unit 62, and supplies the result to the filtering process unit 41.

In this way, the gain acquisition unit 45 in this example reads out the "target frequency characteristic of the image filtering process P" relating to the optical system used in imaging of the original image data D1" and the position of the processing target data D3 (position of the optical system (pixel position)) from the frequency characteristic storage unit 68 to acquire the gain. Accordingly, it is possible to separate the "process for acquiring the target frequency characteristic of the image filtering process P" in the frequency analysis unit 66 and the "process for acquiring the gain which is actually used in the filtering process unit 41" in the gain acquisition unit 45.

Figure 19:
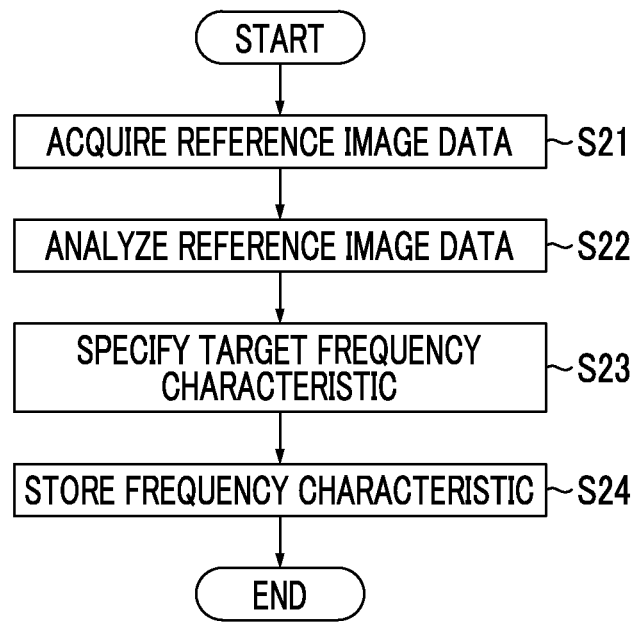
FIG. 19 is a flowchart showing a frequency characteristic acquisition flow of a frequency analysis unit shown in FIG. 18.

FIG. 19 is a flowchart showing a frequency characteristic acquisition flow of the frequency analysis unit 66 shown in FIG. 18. In this example, as described above, first, reference image data which is acquired through imaging using the optical system which is a measurement target is acquired by the reference image acquisition unit 60 (S21 in FIG. 19), and analysis of the reference image data is performed by the reference image analysis unit 61, and an optical characteristic for each position of the optical system which is the measurement target (for each pixel position) is acquired (S22). Further, the target frequency characteristic of the image filtering process P is specified from the optical characteristic for each position of the optical system which is the measurement target (for each pixel position) by the target frequency characteristic specifying unit 67 (S23) for each position of the optical system (for each pixel position), and is stored in the frequency characteristic storage unit 68 (S24).

Figure 20:
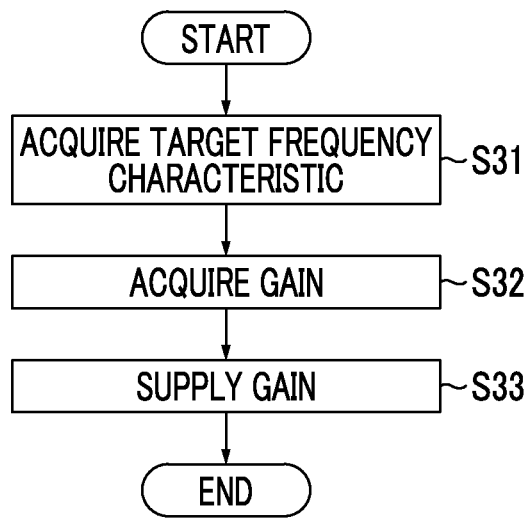
FIG. 20 is a flowchart showing a gain acquisition flow of the gain acquisition unit shown in FIG. 18.

FIG. 20 is a flowchart showing a gain acquisition flow of the gain acquisition unit 45 shown in FIG. 18. In this example, as described above, first, data relating to a target frequency characteristic of the image filtering process P associated with an optical system used in imaging of the original image data D1 which is a target of the image filtering process P in the filtering process unit 41 and a position of the processing target data D3 (position of the optical system (pixel position)) is acquired from the frequency characteristic storage unit 68 by the target frequency characteristic acquisition unit 62 (S31 in FIG. 20). Further, a gain to be used in the filtering process is acquired from the target frequency characteristic by the application gain calculation unit 63 (S32), and is supplied to the filtering process unit 41 (S33).

<Gain Coefficient (Gain Value Vector) Calculation Method>

Hereinafter, a specific flow of a computation process in the above-described gain acquisition unit 45 (particularly, the application gain calculation unit 63) will be described. An example, a case in which the filtering process unit 41 has the circuit configuration shown in FIG. 10 will be mainly described, but in a case where the filtering process unit 41 has another circuit configuration (see FIGS. 8 and 9, and FIGS. 11 and 12), it is similarly possible to calculate a gain by the same computation process.

A method described below employs a least squares standard in which weighting is performed based on a frequency, and calculates a gain so that a frequency characteristic of the entirety of the image filtering process P performed by the filtering process unit 41 is close to a desired target frequency characteristic.

In the circuit configuration shown in FIG. 10, when a frequency characteristic of a filter used in a filter application unit 48-$n$ that performs an n-th filtering process Fn (here, "$1 \leq n \leq N$") is represented as "$\phi_{n-1}(\omega)$" and a gain used in a gain application unit 49-$n$ is represented as "$g_{n-1}$", the frequency characteristic of the n-th filtering process Fn is represented as "$g_{n-1}\phi_{n-1}(\omega)$". Accordingly, when the frequency characteristic of the entirety of the image filtering process P (first filtering process F1 to N-th filtering process FN) performed by the filtering process unit 41 is represented as "$f(\omega)$", "$f(\omega)=g_0\phi_0(\omega) \ldots +g_{N-1}\phi_{N-1}(\omega)$" (here, "N" is an integer which is equal to or greater than 2) is established.

In the circuit configuration shown in FIGS. 8 and 11, when the frequency characteristic of the entirety of the n-th filtering process Fn is represented as "$1+g_{n-1}(\psi_{n-1}(\omega)-1)$", the frequency characteristic $\phi_{n-1}(\omega)$ of the filter used in each filter application unit 48 is represented as "$\phi_{n-1}(\omega)=\psi_{n-1}(\omega)-1$", and the frequency characteristic $f(\omega)$ of the entirety of the image filtering process P is represented as "$f(\omega)=(1+g_0\phi_0(\omega)) \ldots \times(1+g_{N-1}\phi_{N-1}(\omega))$". Further, in the circuit configuration shown in FIG. 9, the frequency characteristic $f(\omega)$ of the entirety of the image filtering process P is represented as "$f(\omega)=1+g_0\phi_0(\omega) \ldots +g_{N-1}\phi_{N-1}(\omega)$".

Accordingly, the following description relating to the circuit configuration shown in FIG. 10 may be applied to the circuit configuration shown in FIG. 9 by applying the frequency characteristic "$f(\omega)=g_0\phi_0(\omega) \ldots +g_{N-1}\phi_{N-1}(\omega)$" of the circuit configuration shown in FIG. 10 to the frequency characteristic "$f(\omega)=1+g_0\phi_0(\omega) \ldots +g_{N-1}\phi_{N-1}(\omega)$". For example, by considering "$1+g_0\phi_0(\omega)$" in the frequency characteristic $f(\omega)$ of the circuit configuration shown in FIG. 9 as "$g_0\phi_0(\omega)$" in the frequency characteristic $f(\omega)$ of the circuit configuration shown in FIG. 10, the following description relating to the circuit configuration shown in FIG. 10 may be suitably applied to the circuit configuration shown in FIG. 10. Similarly, the following description relating to the circuit configuration shown in FIG. 10 may be applied to the circuit configuration shown in FIGS. 8 and 11 by applying the frequency characteristic "$f(\omega)=g_0\phi_0(\omega) \ldots +g_{N-1}\phi_{N-1}(\omega)$" of the circuit configuration shown in FIG. 10 to "$f(\omega)=(1+g_0\phi_0(\omega)) \ldots \times (1+g_{N-1}\phi_{N-1}(\omega))$". In this case, a product computing expression of the frequency characteristic f(ω) of the circuit configuration shown in FIGS. 8 and 11 is converted into a sum computing expression using logarithmic processing, and the following description relating to the circuit configuration of FIG. 10 is easily applied to the circuit configuration shown in FIGS. 8 and 11.

Here, it is assumed that the filter used in the filter application unit 48-*n* of the n-th filtering process Fn is a filter for image restoration based on the point spread function of the optical system (the lens 14, the diaphragm 15, and the like) used when the original image data D1 is acquired through imaging. As described later, since the filter for image restoration based on the point spread function has a two-dimensional degree of freedom with respect to the frequency ω, a frequency characteristic having total "two degrees of freedom" is obtained.

$$\omega \in R^2$$

$R^2$: two-dimensional real number column vector space

If the frequency vector ω is used, the frequency characteristic of the filter used in the filter application unit 48-*n* of the n-th filtering process Fn may be represented as "$\phi_{n-1}(\psi)$". By performing discretization of the frequency characteristic $\phi_{n-1}(\omega)$ of the filter with respect to $N_\omega$ sampling points relating to the frequency, the following vector $\phi_n$ is obtained.

$$\phi_n \in C^{N_\omega}$$

$$\phi_n = \sum_{j=1}^{N_\omega} e_j \otimes \phi_n(\omega_j)$$

$C^N$: N-dimensional complex column vector space
⊗: Kronecker product
$e_j$: standard base of $N_\omega$-dimensional column vector The frequency "$\psi_j$" may be represented as the following expressions, in which "$\omega_j$" represents $N_\omega$ sampling points relating to the frequency.

$$\{\omega_j\}_{j=1}^{N_\omega}$$

A frequency characteristic of image deterioration continuously varies according to an in-image position (pixel position (position of an optical system)). Thus, it is necessary to determine a gain value for each in-image position. By discretizing the in-image positions using Nr sampling points, an index indicating the in-image position is represented by "k" (here, "1≤k≤Nr").

With respect to the index k indicating the in-image position, a gain vector (gain group) gk configured by gains used in the plurality of times of filtering processes (the first filtering process F1 to the N-th filtering process FN) is represented as the following expression.

$$g_k = [g_0^{(k)} g_1^{(k)} \ldots g_{N-1}^{(k)}]^T$$

T: transpose

The frequency characteristic "$f(\omega|g_k)$" of the entirety (entirety of the filtering process unit 41) of the image filtering process P in which the gains represented as the above expression are set is represented as the following expression in the circuit configuration shown in FIG. 10.

$$f(\omega | g_k) = \sum_{i=0}^{N-1} g_i^{(k)} \phi_i(\omega)$$

On the other hand, a "target frequency characteristic "$d_k(\omega, r)$" of the image filtering process P" to be realized may be determined by an arbitrary method, and the determination method is not particularly limited. Generally, a restoration filter based on a point spread function may be suitably realized by a convolution-type filter. As a method for determining a frequency characteristic of the filter based on the point spread function, various methods may be used, and for example, a Wiener filter is widely used in consideration of an SN ratio of an imaging optical system. In the Wiener filter, a frequency characteristic of the filter may be represented based on an optical transfer function (OTF) of the point spread function and information about the SN ratio, like the following expression. Accordingly, the target frequency characteristic "$d_k(\omega)$" of the image filtering process P to be realized may be determined based on the Wiener filter.

The frequency characteristic of the entirety of the image filtering process P is represented as "$f(\omega|g_k)$", the target frequency characteristic of the image filtering process P to be realized is represented as "$d_k(\omega)$", and an approximation weight function is represented as "$w_k(\omega)$". In this case, a gain vector that minimizes a generic function "$J_{LMS}[g]$" based on a weighted least squares standard represented as the following expression may be used as a gain vector indicating an optimal frequency characteristic in the image filtering process P.

$$J_{LMS}[g_k] = \int w_k(\omega) \|f(\omega|g_k) - d_k(\omega)\|^2 d\omega$$

If the above expression is discretized by the frequency and the sampling points of the in-image position, the following expression is obtained.

$$J'_{LMS}[g_k] = \|W^{1/2}(Ag-d)\|^2$$

where
W=diag[w]
A=[$\phi_0$ $\phi_1$ ... $\phi_{N-1}$]

In the above expression, "diag" represents a diagonal matrix in which an argument vector is a diagonal element, and "w" and "d" in the above expression are obtained by respectively vectoring "$w(w_k(\omega)$" and "$d_k(\omega)$", in a similar way to the above-described method relating to "vector $\phi_n$".

An optimal solution $g^{(k)}_{OPT}$ of the gain vector relating to the index k indicating the in-image position is represented as the following expression, based on the above expression.

$$g^{(k)}_{OPT} = \arg\min_g J'_{LMS}[g_k] = (A^H WA)^{-1} A^H W d$$

H: Hermitian Transpose

If the approximation weight function and the frequency characteristic (filter coefficient) of each filter are determined, a portion of "$(A^H WA)^{-1} A^H W$" in the above expression is represented as a matrix capable of being calculated in advance. The optimal solution $g^{(k)}{}_{OPT}$ of the gain vector relating to the index k indicating the in-image position (pixel position (position of the optical system)) may be calculated by a computation for applying a matrix to a filter characteristic acquired based on a point spread function indicating an individual image deterioration characteristic.

In a case where the filtering process unit 41 employs the circuit configuration shown in FIG. 10, in order to prevent change in a DC component (brightness) of an image, it is preferable that a constraint condition that an amplification factor (gain) of the DC component is set to 1.0 times is applied, in addition to the above-described condition. Specifically, acquisition of the optimal solution $g^{(k)}{}_{OPT}$ of the gain vector according to the following expression corresponds to "the setting of the amplification factor of the DC component to 1.0 time in order to prevent change in the brightness of the entire image".

$$\phi_i(0, r) = \phi_i(0) \quad 0 \le i < N, \forall r$$

$$g^{(k)}_{OPT} = \underset{g}{\operatorname{argmin}} J'_{LMS}[g_k]$$

$$\text{subject to: } \sum_{i=0}^{N-1} g_i^{(k)} \times \phi_i(0) = 1$$

The above expression may be considered as a quadratic programming (QP) problem, and may be solved by a small amount of calculation when "N" is small. Further, as an example, by setting a limit to an amplification factor of a DC component of each filter as represented as the following expression, it is possible to exclude the limit (constraint condition) to the amplification factor of the DC component.

$$\phi_1(0)=1, \phi_1(0)=0 (1 \le i < N)$$

<Review of Weighting>

In the above-described least squares method, the approximation accuracy of the frequency characteristic is given a weight based on the frequency represented as "$w_k(\omega)$". For example, in a case where the approximation of the frequency characteristic based on the least squares method is performed based on the approximation error evaluation function $J_{LMS}[g]$, the approximation error evaluation function $J_{LMS}[g]$ is given a weight based on the frequency. By adjusting the weight, it is possible to control image quality. That is, when approximating to the target frequency characteristic of the image filtering process P using the least squares method, by adjusting a weight with respect to a specific frequency, it is possible to enhance approximation accuracy relating to the specific frequency or the specific pixel position in the least squares method, and to control image quality.

For example, in the above-described least squares method, a weight in a low-frequency band may be set to be larger than a weight in a high-frequency band. Generally, since a low-frequency component is easily perceived compared with a high-frequency component in view of human visual properties, it is possible to process the low-frequency component with high accuracy by prioritizing the low-frequency component with respect to the high-frequency component as the accuracy of the "approximation to the target frequency characteristic of the image filtering process P".

Here, "the low-frequency band (low-frequency component)" and "the high-frequency band (high-frequency component)" represent relative frequency ranges (frequency bands). For example, a range where a sampling frequency is equal to or smaller than ¼ (=0.25 fs) may be considered as "the low-frequency band (low-frequency component)", and a range where the sampling frequency is larger than 0.25 fs and is equal to or smaller than 0.5 fs may be considered as "the high-frequency band (high-frequency component)".

Further, in the above-described least squares method, a weight in the high-frequency band may be set to be larger than a weight in the low-frequency band according to an imaging condition when the original image data D1 is acquired. Generally, if a high-frequency characteristic of a filter is bad in a case where noise is large, the noise is amplified. Accordingly, in the image filtering process P of the original image data D1 acquired under an imaging condition that it is predicted that noise is large, it may be preferable to prioritize the high-frequency component with respect to the low-frequency component as the accuracy of "the approximation to the target frequency characteristic of the image filtering process P".

Here, "the imaging conditions when the original image data D1 is acquired" are not particularly limited. Arbitrary factors capable of affecting the amount of noise may be used as imaging conditions, and for example, a diaphragm value (F-number) and an imaging sensitivity of the imaging element 24 may be used as "the imaging condition when the original image data D1 is acquired" capable of affecting the amount of noise.

Further, the above-described weighting in the least squares method may be determined according to pixel positions in the original image data D1. For example, in a case where the original image data D1 is acquired through imaging using a normal digital camera used by a general user, since a main subject is disposed at a central portion of an image in many cases, there is a tendency that high-frequency components of pixel positions at the central portion of the image are is emphasized. On the other hand, in a case where the importance of an image in the vicinity of a boundary of an imaging range is relatively high in a monitoring camera or the like, there is a tendency that high-frequency components of pixel positions in a peripheral portion of an image is emphasized. In this way, there is a case where the importance is changed according to pixel positions in the original image data D1, and in this case, pixel positions with high weights (prioritized pixel positions) may be determined according to the type of an imaging device or a usage (product) of a captured image.

For example, in an optical system provided in the digital camera 10 used by a general user, there is a tendency that a central portion generally has a high resolution and thus has an excellent resolution characteristic regardless of frequencies and resolution performance in a peripheral portion becomes low. Accordingly, in the image filtering process P of the original image data D1 acquired by imaging using the digital camera 10 shown in FIG. 1, by increasing a weight in a high-frequency band at a central portion of an image and increasing a weight in a low-frequency band at a peripheral portion of the image, it is possible to enhance image quality according to optical characteristics. That is, in the above-described least squares method, at pixel positions (pixel positions with a low image height) which are equal to or shorter than a first distance from the center of an image in the original image data D1, weights in a high-frequency band may be set to be larger than those at pixel positions (pixel positions with a high image height) which is longer than the first distance from the center of the image in the original image data D1. Further, in the above-described least squares method, at pixel positions (pixel positions with a high image height) which is longer than a second distance from the center of the image in the original image data D1, weights in a low-frequency band may be set to be larger than those at pixel positions (pixel positions with a low image height) which is equal to or shorter than the second distance from the center of the image in the original image data D1.

Here, it is preferable that "the high-frequency band" is included in a range which is larger than 0.25 fs and is equal to or smaller than 0.5 fs, and it is preferable that "the low-frequency band" is included in a range which is equal to or smaller than 0.25 fs. Further, "the first distance" and "the second distance" may be the same or may be different from each other.

<Review in a Case where Filter Frequency Characteristic does not Include Frequency Attenuation>

In a case where a plurality of times of filtering processes is performed by the filtering process unit 41 having the circuit configuration of the serial connection type shown in FIG. 8, it is preferable that a control method is devised according to whether a filter frequency characteristic applied to the processing target data D3 has frequency attenuation in each filter application unit 48. The frequency attenuation acts effectively particularly in a case where "the level of spread (blurring) of a point image represented by a point spread function of an optical system is large" and "an SN ratio is low", and shows an effect of reducing a noise component in a high-frequency band.

For example, in a case where it is not necessary to give an effect of frequency attenuation to a filter used in each filter application unit 48, a frequency characteristic $\phi_n(\omega)$ of the filter used in each filter application unit 48 of the filtering process unit 41 shown in FIG. 10 may be set based on the following expression.

$$\phi_n(\omega) = \begin{cases} \phi_n(\omega) & (|\phi_n(\omega)| > 1) \\ 1 & \text{otherwise} \end{cases}$$

The above expression means that a filter having the original frequency characteristic $\phi_n(\omega)$ is used in a case where the frequency characteristic $\phi_n(\omega)$ of the filter used in each filter application unit 48 satisfies "$|\phi_n(\omega)|>1$" and a filter in which "frequency characteristic (response) is 1" is used in a case where "$|\omega_n(\omega)|\leq 1$" is satisfied.

In a case where it is not necessary to give the effect of frequency attenuation to the filter used in each filter application unit 48, the frequency characteristic $\omega_n(\omega)$ of the filter used in each filter application unit 48 of the filtering process unit 41 shown in FIGS. 8, 9, and 11 may be set based on the following expression, for example.

$$\phi_n(\omega) = \begin{cases} \phi_n(\omega) & (|\varphi_n|(=|1+\phi_n(\omega)|) > 1) \\ 0 & \text{otherwise} \end{cases}$$

Further, in a case where the circuit configuration that forms the filtering process unit 41 is the serial connection type shown in FIG. 8, a frequency characteristic of the entirety of the image filtering process P is represented based on the product of frequency characteristics of filters used in each filter application unit 48. In order to similarly handle "the frequency characteristic of the entirety of the image filtering process P of the serial connection type" and "the frequency characteristic of the entirety of the image filtering process P of the juxtaposition connection type", it is preferable to convert a matter of "the product" into a matter of "the sum" by performing logarithmic processing with respect to the frequency characteristics of all the filters used in the image filtering process P of the serial connection type. In this case, using the same arithmetic process as the calculation method of the optimal solution $g^{(k)}_{OPT}$ of the gain vector relating to the filtering process unit 41 having the circuit configuration of the juxtaposition connection type, it is possible to calculate the optimal solution $g^{(k)}_{OPT}$ of the gain vector relating to the filtering process unit 41 having the circuit configuration of the serial connection type. In a case where the frequency characteristic of the filter does not include the attenuation characteristic, the frequency characteristic of the filter does not becomes a large negative value by the above-described logarithmic-processing, and logarithmic processing of a complex number may be performed using the following expression.

$$\log z = \log|z| + j(\angle z + 2n\pi)$$

z: complex number ($=x+jy=r_c e^{j\theta}$)
j: imaginary unit
$r_c$: absolute value ($=\sqrt{(x^2+y^2)}$)
$x=r_c \cos\theta$
$y=r_c \sin\theta$
$\theta$: argument ($=\angle z$)

<Review in a Case where Frequency Characteristic of Filter Includes Frequency Attenuation>

For example, in the filtering process unit 41 having the circuit configuration of the serial connection type as shown in FIG. 8, a frequency characteristic of a filter used in each filter application unit 48 includes frequency attenuation, it is preferable to note the following points. That is, in a case where a frequency amplification factor is close to 0, a value after logarithmic processing becomes a large negative value, and thus, in a case where fitting of the frequency characteristic is performed using a least squares standard after the logarithmic processing is performed, for example, there is a concern that the large negative value greatly affects a frequency characteristic approximation standard. Thus, in the logarithmic processing, it is preferable to perform a countermeasure such as clipping using a predetermined negative minimum value or adjustment of reducing a weight in a frequency band where frequency attenuation easily occurs.

For example, in the case of clipping, it is preferable that the filtering process unit 41 uses a filter that makes the filtering process data D6 equal to the filter application process data D4 in each of the plurality of times of filtering processes at a frequency where the ratio of the processed image data D2 to the original image data D1 in a target frequency characteristic of the image filtering process P is smaller than 1.

By determining and adjusting a gain used in each filtering process as described above, for example, it is possible to greatly reduce the number of parameters to be retained, compared with a case where a filter (filter coefficient) is retained based on a point spread function with respect to all combinations of imaging conditions, for example. Further, in a general method, if an image deterioration characteristic such as a point spread function is not known, it is difficult to appropriately perform filter design (filter coefficient design), but according to this embodiment, even before perceiving respective image deterioration characteristics, it is possible to complete design of an FIR filter of a finite tap length for which a large amount of calculation is necessary.

In this case, it is possible to calculate an optimal gain vector by a simple calculation after a specific image deterioration characteristic is acquired.

<Filter Design Method>

Next, a specific example of a filter design method used in each filter application unit 48 of the filtering process unit 41 will be described.

Figure 21:
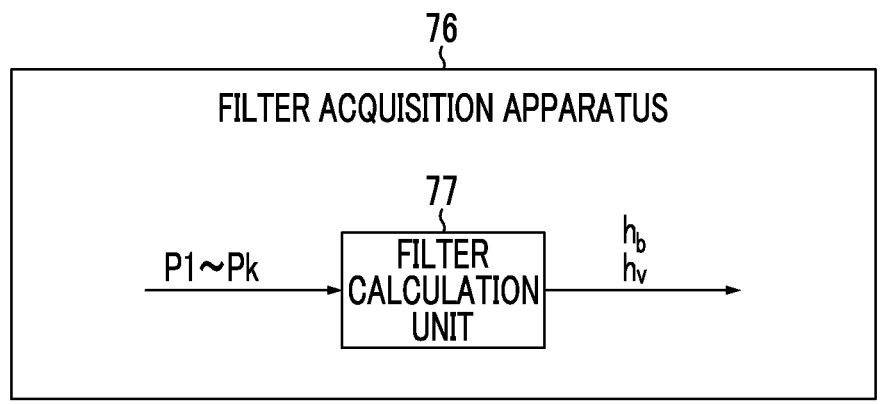
FIG. 21 is a block diagram showing an example of a functional configuration of a filter acquisition apparatus.

FIG. 21 is a block diagram showing an example of a functional configuration of a filter acquisition apparatus 76.

The filter acquisition apparatus 76 that performs design and acquisition of a filter used in each filter application unit 48 includes a filter calculation unit 77. The filter calculation unit 77 in this example acquires frequency characteristic data of a plurality of types of image filtering processes (a first image filtering process P1 to a k-th image filtering process Pk (here, "k" is an integer which is equal to or greater than 2)) determined according to a plurality of pixel positions (a plurality of positions of an optical system) in the original image data D1, and outputs a plurality of filters including a reference filter $h_b$ and a variance filter $h_v$. That is, the filter calculation unit 77 acquires the reference filter $h_b$ determined according to an average of frequency characteristics of the plurality of types of image filtering processes P1 to Pk, based on the frequency characteristics of the plurality of types of image filtering processes P1 to Pk determined according to the plurality of pixel positions (the plurality of positions of the optical system) in the original image data D1. Further, the filter calculation unit 77 acquires at least one variance filter determined according to a variance of the frequency characteristics of the plurality of types of image filtering processes P1 to Pk, based on the frequency characteristics of the plurality of types of image filtering processes P1 to Pk.

Figure 22:
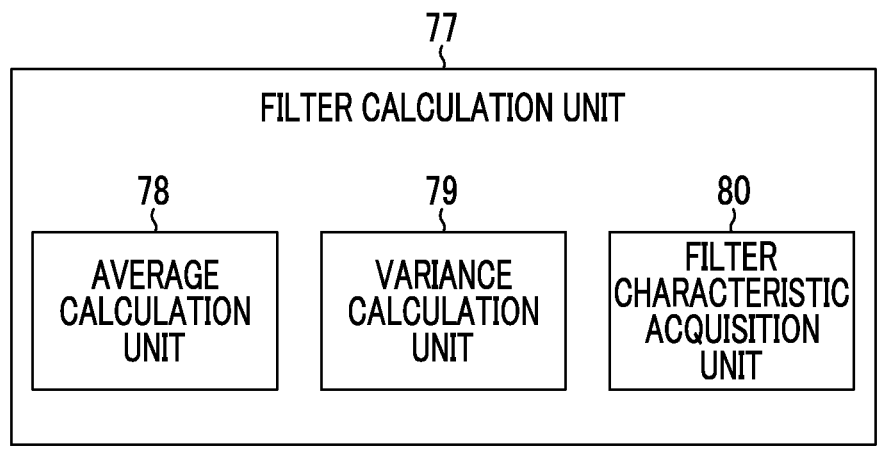
FIG. 22 is a block diagram showing an example of a functional configuration of a filter calculation unit.

FIG. 22 is a block diagram showing an example of a functional configuration of the filter calculation unit 77.

The filter calculation unit 77 in this example includes an average calculation unit 78, a variance calculation unit 79, and a filter characteristic acquisition unit 80. The average calculation unit 78 calculates the average of the frequency characteristics of the plurality of types of image filtering processes P1 to Pk from the frequency characteristics data of the plurality of types of image filtering processes P1 to Pk. The variance calculation unit 79 calculates a variance of frequency characteristics of the plurality of types of image filtering processes P1 to Pk, from the frequency characteristics data of the plurality of types off image filtering processes P1 to Pk. The filter characteristic acquisition unit 80 calculates the reference filter $h_b$ based on the average of the frequency characteristics of the plurality of types of image filtering processes P1 to Pk calculated in the average calculation unit 78. Further, the filter characteristic acquisition unit 80 calculates the variance filter based on the average of the frequency characteristics of the plurality of types of image filtering processes P1 to Pk calculated in the average calculation unit 78 and the variance of the frequency characteristic of the plurality of types of image filtering processes P1 to Pk calculated in the variance calculation unit 79.

The frequency characteristic data of the plurality of types of image filtering processes P1 to Pk used in the filter calculation unit 77 (the average calculation unit 78, the variance calculation unit 79, and the filter characteristic acquisition unit 80) in this example is specified based on optical characteristics of an optical system according to a plurality of pixel positions (positions of the optical system). In this way, by determining the "frequency characteristic data of the plurality of types of image filtering processes P1 to Pk" which are bases of calculation of the filters (the reference filter $h_b$ and the variance filter $h_v$) with reference to the plurality of pixel positions (positions of the optical system), it is possible to calculate the filters (the reference filter $h_b$ and the variance filter $h_v$) suitable for such a plurality of pixel positions (positions of the optical system). Accordingly, by assuming "representative pixel positions (positions of the optical system)" when the original image data D1 is acquired as the "plurality of pixel positions (positions of the optical system)", it is possible to realize the "target frequency characteristic of the image filtering process" with high accuracy by the filtering process unit 41.

<Frequency Characteristic of Plurality of Types of Image Filtering Processes>

Here, a frequency characteristic of each of "the plurality of types of image filtering processes P1 to Pk" forms "the target frequency characteristic of the image filtering process", and in this example, is determined by a frequency characteristic based on an optical characteristic of an optical system for each imaging condition (for example, for each pixel position (for each position of an optical system)) capable of being employed in imaging.

For example, in a case where "the frequency characteristics of the plurality of types of image filtering processes P1 to Pk" are frequency characteristics based on a point spread function of an optical system, it is possible to determine "the frequency characteristics of the plurality of types of image filtering processes P1 to Pk" according to frequency characteristics of a plurality of types of point spread functions obtained by changing imaging conditions (for example, pixel positions (positions of the optical system)) that may affect the point spread functions. That is, it is possible to determine "the frequency characteristics of the plurality of types of image filtering processes P1 to Pk" according to frequency characteristics of a plurality of types of point spread functions under different imaging conditions. "The plurality of types of point spread functions" may be acquired by an arbitrary method. For example, the plurality of types of point spread functions may be acquired based on actual measurement values, or may be acquired based on estimation values. "The frequency characteristics of the plurality of types of image filtering processes P1 to Pk" may be calculated based on an arbitrary design standard such as a Wiener filter using the plurality of types of acquired point spread functions.

"The frequency characteristics of the plurality of types of image filtering processes P1 to Pk" may be acquired by an arbitrary device. For example, the frequency characteristics of the plurality of types of image filtering processes P1 to Pk may be acquired by the filter acquisition apparatus 76, may be acquired by another device, or may be read and acquired from a memory (not shown) by the filter calculation unit 77 of the filter acquisition apparatus 76.

<Variation in Frequency Characteristics of Plurality of Types of Image Filtering Processes>

Variation in frequency characteristics of a plurality of types of image filtering processes may be represented based on a unimodal distribution, or may be represented based on a multimodal distribution.

Figure 23:
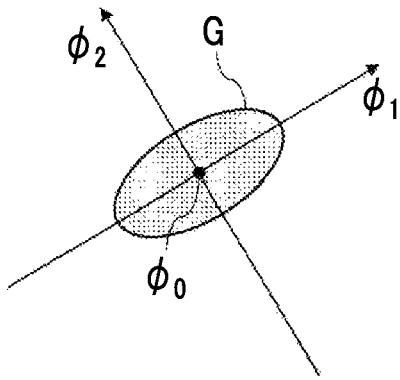
FIG. 23 is a conceptual diagram representing variation in frequency characteristics of a plurality of types of image filtering processes as a unimodal distribution.
Figure 24:
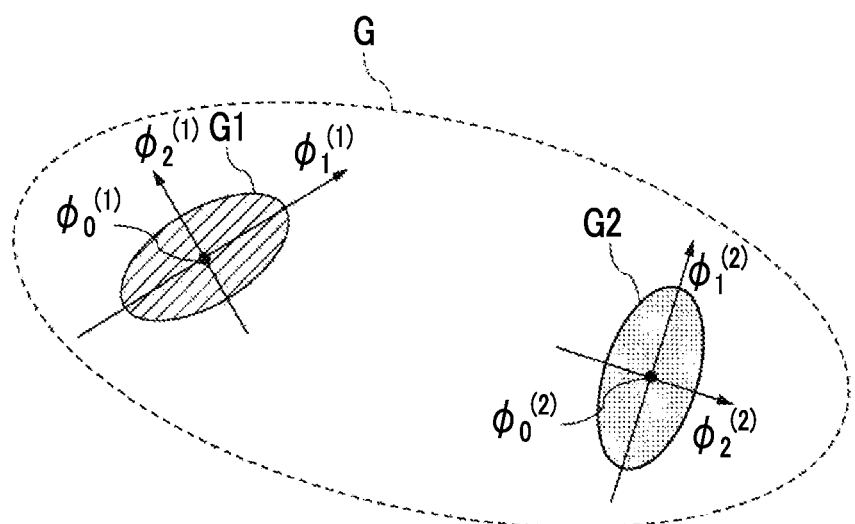
FIG. 24 is a conceptual diagram representing variation in frequency characteristics of a plurality of types of image filtering processes as a multimodal distribution.

FIG. 23 is a conceptual diagram showing variation in frequency characteristics of a plurality of types of image filtering processes as a unimodal distribution. FIG. 24 is a conceptual diagram showing variation in frequency characteristics of a plurality of types of image filtering processes as a multimodal distribution.

A variation representation method based on the unimodal distribution shown in FIG. 23 is a method for representing variation in frequency characteristics of a plurality of types of image filtering processes by one multi-dimensional complex normal distribution (see "variation distribution G" in FIG. 23). On the other hand, a representation method based on the multimodal distribution is a method for representing variation in frequency characteristics of a plurality of types of image filtering processes by a plurality of multi-dimensional complex normal distributions (see "a first variation distribution G1" and "a second variation distribution G2" in FIG. 24).

FIG. 23 shows a case where a variation distribution G of frequency characteristics of a plurality of types of image filtering processes is represented by a frequency characteristic $\phi_0$ of a filter of a first filtering process F1, a frequency characteristic $\phi_1$ of a filter of a second filtering process F2, and a frequency characteristic $\phi_2$ of a filter of a third filtering process F3. Further, FIG. 24 shows a case where a first variation distribution G1 and a second variation distribution G2 that form a variation distribution G of frequency characteristics of a plurality of types of image filtering processes are respectively represented by a frequency characteristic ($\phi_0^{(1)}$, $\omega_0^{(2)}$) of a filter of a first filtering process F1, a frequency characteristic ($\phi_1^{(1)}$, $\omega_1^{(2)}$) of a filter of a second filtering process F2, and a frequency characteristic ($\phi_2^{(1)}$, $\phi_2^{(2)}$) of a filter of a third filtering process F3. FIGS. 23 and 24 show the frequency characteristics $\phi_0$ to $\phi_2$ of the filters under the premise that the filtering process unit 41 has the circuit configuration shown in FIG. 10 as an example.

In a case where variation in frequency characteristics of a plurality of types of image filtering processes has the variation distribution G of an oval shape as shown in FIG. 23, for example, in order to realize the respective image filtering processes by a plurality of filtering processes (the first filtering process F1 to the third filtering process F3 in the example shown in FIG. 23) with high accuracy, it is preferable to determine the frequency characteristics $\phi_0$, $\phi_1$, and $\phi_2$ of the respective filtering processes based on the center, the long axis, and the short axis of the variation distribution G. Similarly, in a case where variation of frequency characteristics of a plurality of types of image filtering processes has the first variation distribution G1 and the second variation distribution G2 which are formed in oval shapes as shown in FIG. 24, for example, in order to represent the image filtering processes included in the first variation distribution G1 and the second variation distribution G2 by a plurality of filtering processes (in the example shown in FIG. 24, the first filtering process F1 to the third filtering process F3) with high accuracy, it is preferable to determine the frequency characteristics $\phi_0^{(1)}$, $\phi_1^{(1)}$, $\phi_2^{(1)}$, $\phi_0^{(2)}$, $\phi_1^{(2)}$, and $\phi_2^{(2)}$ in the respective filtering processes based on the center, the long axis, and the short axis of each of the respective first variation distribution G1 and second variation distribution G2.

<Unimodal Distribution>

Next, an example of a method for designing a filter and a gain in a case where variation of frequency characteristics of a plurality of types of image filtering processes is considered as a unimodal distribution (see FIG. 23) will be described.

The following method relates to a method for obtaining, in a case where a variation sample of frequency characteristics of a plurality of types of image filtering processes of an arbitrary number is actually acquired, frequency characteristics of a desired number of base filters (FIR filters) capable of compensating variation of the frequency characteristics of the image filtering processes with high accuracy. Further, a case where modeling is performed using a uni-modal distribution as a multi-dimensional complex normal distribution to perform estimation of a maximum likelihood (ML) will be described.

A variation distribution G of a unimodal distribution can be represented based on a multi-dimensional complex normal distribution, and the multi-dimensional complex normal distribution is characterized by a covariance matrix, and is obtained by the following expression.

$$\psi_o = \frac{1}{N_r} \sum_{i=1}^{N_r} \beta_i$$

$$R_0 = \frac{1}{N_r} \sum_{i=1}^{N_r} (\beta_i - \psi_o)(\beta_i - \psi_o)^H$$

In the above expression, "$\beta_i$" represents a vector obtained by discretizing a frequency characteristic $\beta(\omega)$ which is individually acquired with respect to each of a plurality of types of image filtering processes based on a frequency ($\omega$), and "$N_r$" represents the number of the plurality of types of image filtering processes. Accordingly, "$\psi_0$" in the above expression represents an average (average matrix) of frequency characteristics of the plurality of types of image filtering processes, and "$R_0$" in the above expression represents a variance (covariance matrix) of the frequency characteristics of the plurality of types of image filtering processes.

By performing individual value decomposition of the covariance matrix represented as the above expression according to the following expression, it is possible to obtain a characteristic vector $\psi_i$ (here, "i" is an integer which is equal to or greater than 1 and is equal to or smaller than $N_r$).

$$R_0 = \sum_{i=1}^{N_r} \lambda_i \psi_i \psi_i^H, (\lambda_1 \geq \lambda_2 \geq \ldots \geq \lambda_{N_r})$$

$$\{\psi_i\}_{i=1}^{N_r}$$

According to Karhunen-Loeve expansion, in order to averagely approximate a variation distribution by an m-dimensional linear partial space, it is most preferable to use a partial space spread by m corresponding characteristic vectors $\psi_i$ (here, "i" is an integer which is equal or greater than 1 and is equal to or smaller than m) in a descending order of characteristic values.

Accordingly, optimal frequency characteristics $\phi_0$ to $\phi_{N-1}$ of filters for filtering processes for reproducing the respective frequency characteristics of the plurality of types of image filtering processes having the unimodal variation distribution G with high accuracy can be acquired based on the following expression.

$$\phi_0 = \psi_0$$
$$\phi_1 = \psi_1$$
$$\vdots$$
$$\phi_{N-1} = \psi_{N-1}$$

As described above, since the frequency characteristic $\phi_0$ of the filter of the first filtering process F1 corresponds to the center of the distribution of the frequency characteristics of the plurality of types of image filtering processes, it is preferable that a gain in the first filtering process F1 is fixed to "1.0" from a viewpoint of fixing the center of the distribution to stabilize the process. With respect to gains in the other filtering processes, it is possible to calculate optimal values by the above-described weighted least squares standard, for example.

Figure 25:
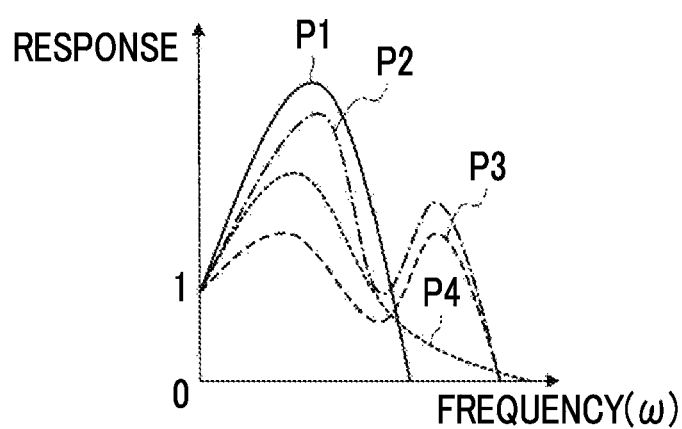
FIG. 25 is a diagram schematically showing an example of frequency characteristics of a plurality of types of image filtering processes capable of being classified as a unimodal distribution, in which a lateral axis represents a frequency and a longitudinal axis represents a response.

FIG. 25 is a diagram schematically showing an example of frequency characteristics of a plurality of types of image filtering processes capable of being classified as a unimodal distribution, in which a lateral axis represents a frequency ($\omega$) and a longitudinal axis represents a response. Here, the response refers to the ratio of frequency component amounts before and after each image filtering process (that is, frequency component amount after process/frequency component amount of data before process), and "response=1" means that data before and after the image filtering process is the same.

FIG. 25 shows frequency characteristics of four types of image filtering processes (a first image filtering process P1, a second image filtering process P2, a third image filtering process P3, and a fourth image filtering process P4). The four types of image filtering processes P1 to P4 have different frequency characteristics, but in any case, a response in a case where a frequency ($\omega$) is "0" shows "1".

Figure 26:
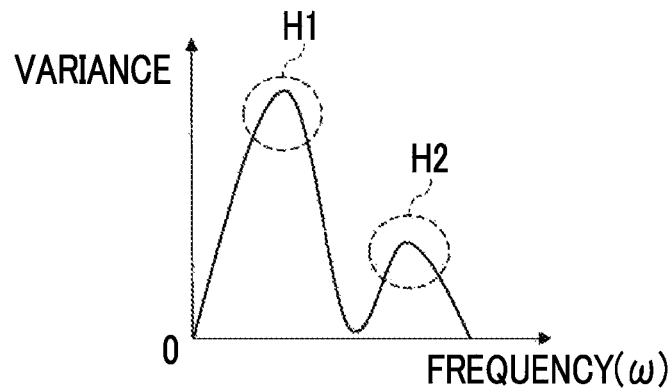
FIG. 26 is a diagram schematically showing an example of a variance of frequency characteristics of the plurality of types of image filtering processes shown in FIG. 25, in which a lateral axis represents a frequency and a longitudinal axis represents a variance.

FIG. 26 is a diagram schematically showing an example of a variance of the frequency characteristics of the plurality of types of image filtering processes shown in FIG. 25, in which a lateral axis represents a frequency ($\omega$) and a longitudinal axis represents a variance. FIG. 26 does not strictly show the variance of the frequency characteristics of the plurality of types of image filtering processes P1 to P4 shown in FIG. 25, for ease of description.

Since the response in a case where the frequency ($\omega$) is "0" shows "1" in any case of the four types of image filtering processes P1 to P4 shown in FIG. 25, the variance in a case where the frequency ($\omega$) is "0" becomes "0". In the example shown in FIG. 26, with respect to the frequency characteristics of the plurality of types of image filtering processes P1 to P4, "a component indicating a largest variation (see reference numeral "H1" in FIG. 26)" and "a component indicating a second largest variation (see reference numeral "H2" in FIG. 26)" are shown.

Figure 27A:
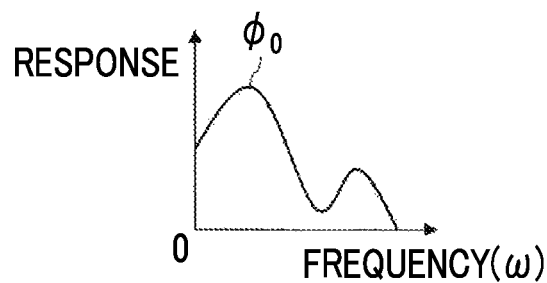
Figure 27B:
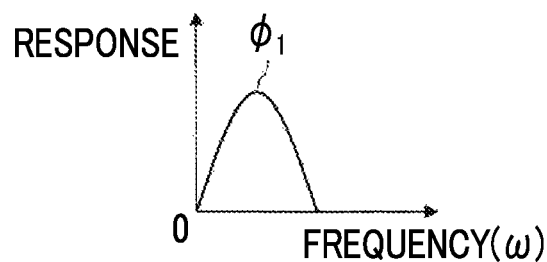
Figure 27C:
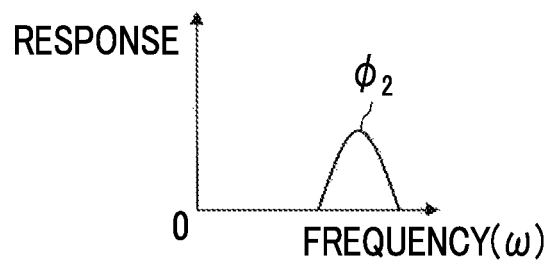

FIGS. 27A to 27C are diagrams schematically showing examples of base filters (characteristic vectors) acquired from an average and a variance of the frequency characteristics of the plurality of types of image filtering processes shown in FIG. 25, in which FIG. 27A shows "$\phi_0$", FIG. 27B shows "$\phi_1$", and FIG. 27C shows "$\phi_2$".

As described above, it is preferable that the frequency characteristic $\phi_0$ of the filter used in the first filtering process F1 is determined based on the center (average) of the distribution of the frequency characteristics of the plurality of types of image filtering processes P1 to P4.

Further, it is preferable that the frequency characteristics of the filters used in the other filtering processes P1 to P4 are determined sequentially from a large component in variation (variance) of the frequency characteristics of the plurality of types of image filtering processes shown in FIG. 26. Accordingly, it is preferable that the frequency characteristic $\phi_1$ of the filter used in the second filtering process F2 is determined based on the largest component (see "H1" in FIG. 26) in the variation of the frequency characteristics of the plurality of types of image filtering processes P1 to P4. Similarly, it is preferable that the frequency characteristic $\phi_2$ of the filter used in the third filtering process F3 is determined based on the second largest component (see "H2" in FIG. 26) in the variation of the frequency characteristics of the plurality of types of image filtering processes.

The above-described example relates to a case where the image filtering process P includes the first filtering process F1 to the third filtering process F3, but the image filtering process P may be configured by two filtering processes, or may be configured by four or more filtering processes. For example, in a case where the image filtering process P is configured by the first filtering process F1 and the second filtering process F2, the frequency characteristic of the filter used in the first filtering process F1 may be determined based on the above-described "$\phi_0$" (see FIG. 27A), and the frequency characteristic of the filter used in the second filtering process F2 may be determined based on the above-described "$\phi_1$" (see FIG. 27B).

FIGS. 28A and 28B show a frequency characteristic f($\omega$) (see FIG. 28A) and a gain example (see FIG. 28B) relating to the image filtering process P (first filtering process F1 to third filtering process F3) performed by the filtering process unit 41 having the circuit configuration shown in FIG. 10.

As described above, it is preferable that a gain $g_0$ in the first filtering process F1 is fixed to "1.0" from a viewpoint of fixing the center of a distribution of frequency characteristics of a plurality of types of image filtering processes to stabilize the process. Accordingly, FIG. 28B shows gains $g_0$ to $g_2$ for realizing the respective frequency characteristics of the image filtering processes P1 to P4 shown in FIG. 25 by a frequency characteristic of the entire system shown in FIG. 28A with high accuracy in a case where a filter used in each filter application unit 48 of the filtering process unit 41 having the circuit configuration shown in FIG. 10 is fixed and the gain $g_0$ in the first filtering process F1 is fixed to "1.0", for example.

As shown in FIG. 28B, according to the above-described example, it is possible to compress data on the frequency characteristics of the plurality of types of image filtering processes P1 to P4 into frequency characteristics $\phi_0$ to $\phi_2$ (tap coefficients) of three filters and 12 gains (8 gains in a case where $g_0$ is fixed to "1.0").

In this way, the filtering process unit 41 in this example acquires the filter application process data D4-1 using the frequency characteristic of the reference filter $h_b$ determined according to the average of the plurality of types of frequency characteristics of the image filtering processes P1 to P4 as the "filter frequency characteristic $\phi_0$" in the first filtering process F1, and acquires the filter application process data D4-2 and D4-3 using the frequency characteristics of two variance filters determined according to the variance of the plurality of types of frequency characteristics of the image filtering processes P1 to P4 as the "filter frequency characteristic $\phi_1$" and the "filter frequency characteristic $\phi_2$" in the second filtering process F2 and the third filtering process F3.

Particularly, it is preferable that the filtering process unit 41 acquires the filter application process data D4-1 using "the reference filter $h_b$ determined according to the average of the frequency characteristics of the plurality of types of image filtering processes determined according to the pixel positions in the original image data D1" in the first filtering process F1, and that the filtering process unit 41 acquires the filter application process data D4-2 and D4-3 using "the variance filter $h_v$ determined according to the variance of the frequency characteristics of the plurality of types of image filtering processes determined according to the pixel positions in the original image data D1" in the second filtering process F2 and the third filtering process F3. In this case, it is preferable that a gain applied to the filter application process data D4 in each of the plurality of times of filtering processes is determined according to the pixel positions in the original image data D1.

Figure 29:
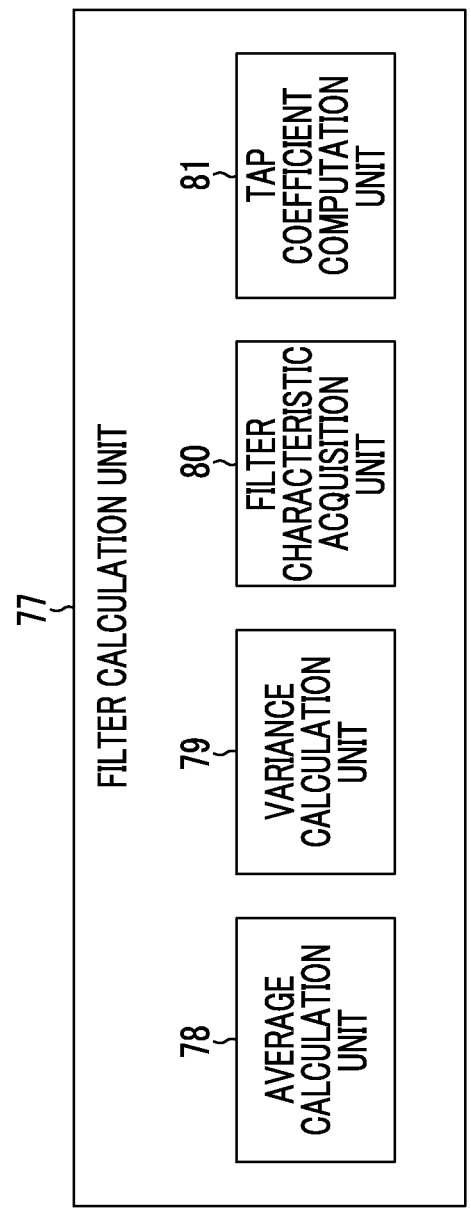
FIG. 29 is a block diagram showing an example of a functional configuration of a filter calculation unit that calculates a filter coefficient based on a unimodal distribution.

FIG. 29 is a block diagram showing an example of a functional configuration of the filter calculation unit 77 that calculates a filter coefficient based on a unimodal distribution. In order to calculate a filter coefficient represented in an actual space from a filter characteristic represented in a frequency space, the filter calculation unit 77 in this example further includes a tap coefficient computation unit 81, in addition to the above-described average calculation unit 78, the variance calculation unit 79, and the filter characteristic acquisition unit 80 (see FIG. 22).

The tap coefficient computation unit 81 of the filter calculation unit 77 acquires the reference filter $h_b$ which has a plurality of taps, to which a coefficient is allocated to each tap, and acquires at least one variance filter which has a plurality of taps, to which a coefficient is allocated to each tap. A "method for allocating the coefficient to each respective tap" is not particularly limited, but the tap coefficient computation unit 81 (filter calculation unit 77) may calculate the coefficient allocated to each tap of each of the reference filter $h_b$ and the at least one variance filter $h_v$, based on a SAGE algorithm or an OMP algorithm (which will be described later), for example.

<Multimodal Distribution>

Next, an example of a method for designing a filter and gain in a case where variation of frequency characteristics of a plurality of types of image filtering processes is considered as a multimodal distribution (see FIG. 24) will be described.

In the example shown in FIG. 24, in a case where the entire distribution is considered as one distribution (unimodal distribution), the variation distribution of the frequency characteristics of the plurality of types of image filtering processes can be represented by the "variation distribution G" shown in FIG. 24, but approximation accuracy becomes low. On the other hand, by separating the variation distribution of the frequency characteristics of the plurality of types of image filtering processes into "the first variation distribution G1" and "the second variation distribution G2" in FIG. 24 and considering "the first variation distribution G1" and "the second variation distribution G2" as individual multi-dimensional complex normal distributions (multimodal distribution), it is possible to enhance the approximation accuracy. As a parameter estimation algorithm of ML estimation in the multimodal distribution, for example, estimation of a mixed normal distribution based on an expectation maximization (EM) algorithm may be suitably used, to thereby perform efficient parameter estimation.

The filter determination method based on the multimodal distribution may be basically performed by the same method as the filter determination method based on the above-described unimodal distribution. That is, it is possible to classify frequency characteristics of a plurality of types of image filtering processes into a plurality of distributions that forms the multimodal distribution (the first variation distribution G1 and the second variation distribution G2 in the example shown in FIG. 24), to obtain a filter in the same procedure as that of "the variation distribution G" of the above-described unimodal distribution with respect to each distribution.

Figure 30:
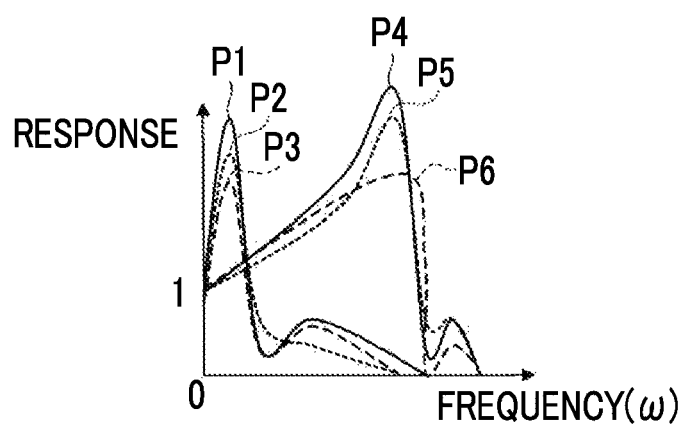
FIG. 30 is a diagram schematically showing an example of frequency characteristic of image filtering processes capable of being classified as a multimodal distribution, in which a lateral axis represents a frequency and a longitudinal axis represents a response.

FIG. 30 is a diagram schematically showing an example of frequency characteristics of image filtering processes capable of being classified as a multimodal distribution, in which a lateral axis represents a frequency ($\omega$) and a longitudinal axis represents a response.

FIG. 30 shows frequency characteristics of six types of image filtering processes (a first image filtering process P1, a second image filtering process P2, a third image filtering process P3, a fourth image filtering process P4, a fifth image filtering process P5, and a sixth image filtering process P6). The six types of image filtering processes P1 to P6 show different frequency characteristics, but in any case, a response in a case where the frequency ($\omega$) is "0" shows "1".

In the example shown in FIG. 30, for example, it is possible to classify "frequency characteristic data of the first image filtering process P1, frequency characteristic data of the second image filtering process P2, and frequency characteristic data of the third image filtering process P3" into the first variation distribution G1, and to classify "frequency characteristic data of the fourth image filtering process P4, frequency characteristic data of the fifth image filtering process P5, and frequency characteristic data of the sixth image filtering process P6" into the second variation distribution G2, for example.

Figure 31A:
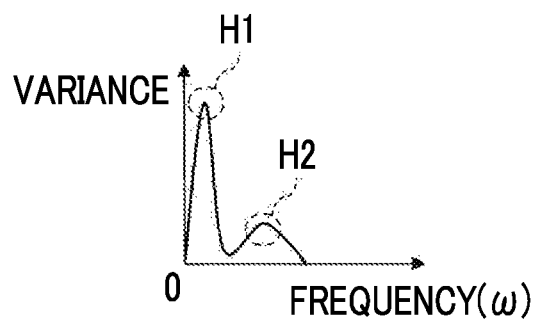
Figure 31B:
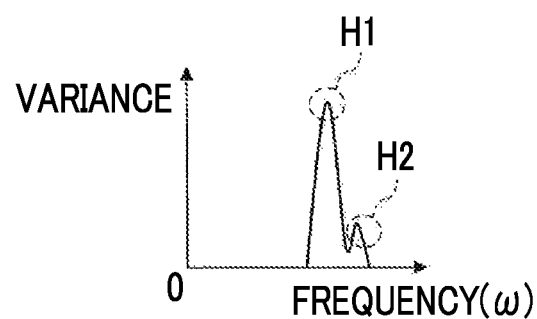

FIGS. 31A and 31B are diagrams schematically showing an example of a variance of the frequency characteristics of the plurality of types of image filtering processes shown in FIG. 30, in which FIG. 31A shows a variance of the frequency characteristic data of the first image filtering process P1 to the third image filtering process P3 classified as the first variation distribution G1, and FIG. 31B shows a variance of the frequency characteristic data of the fourth image filtering process P4 to the sixth image filtering process P6 classified as the second variation distribution G2. A lateral axis in each of FIGS. 31A and 31B represents a frequency ($\omega$), and a longitudinal axis represents a variance. FIGS. 31A and 31B do not strictly represent the variances of the frequency characteristics of the plurality of types of image filtering processes P1 to P6 shown in FIG. 30, for ease of description.

In any case of the frequency characteristics of the six image filtering processes P1 to P6 shown in FIG. 30, since the response in a case where the frequency ($\omega$) is "0" is "1", a variance in a case where the frequency ($\omega$) is "0" becomes "0". As shown in FIGS. 31A and 31B, with respect to "the variances of the frequency characteristics of the plurality of types of image filtering processes" of the first variation distribution G1 and the second variation distribution G2, respectively, "a component indicating the largest variation (see "H1" in FIGS. 31A and 31B)" and "a component indicating the second largest variation "see "H2" in FIGS. 31A and 31B)" are shown.

Figure 32A:
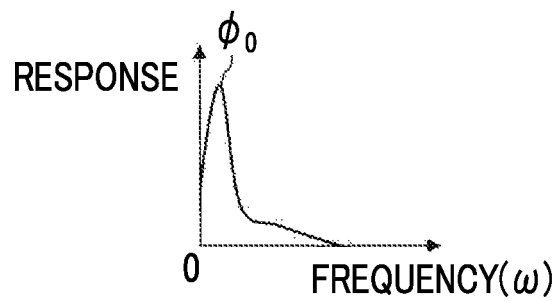
Figure 32B:
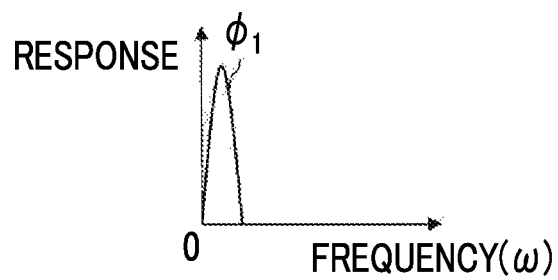
Figure 32C:
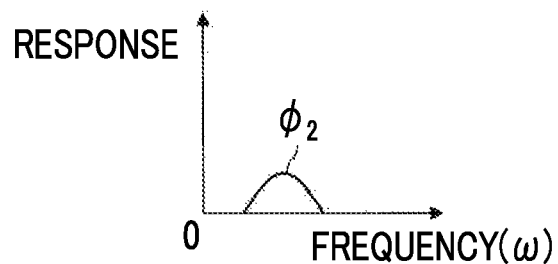
Figure 33A:
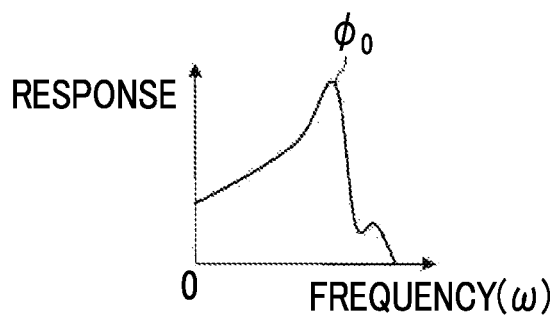
Figure 33B:
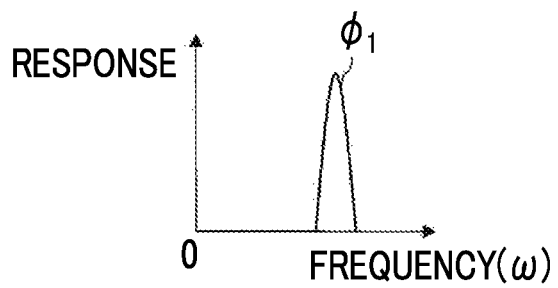
Figure 33C:
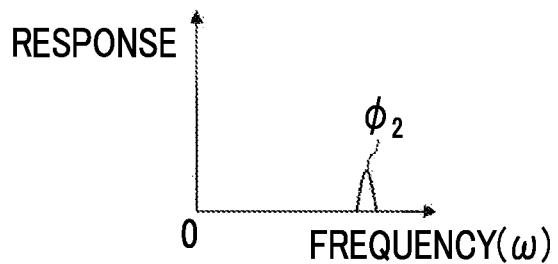

FIGS. 32A to 32C are diagrams schematically showing examples of base filters (characteristic vectors) acquired from an average and the variance of the frequency characteristics of the first image filtering process P1 to the third image filtering process P3 classified as the first variation distribution G1, in which FIG. 32A shows "$\phi_0$", FIG. 32B shows "$\phi_1$", and FIG. 32C shows "$\phi_2$". FIGS. 33A to 33C are diagrams schematically showing examples of base filters (characteristic vectors) acquired from an average and the variance of the frequency characteristics of the fourth image filtering process P4 to the sixth image filtering process P6 classified as the second variation distribution G2, in which FIG. 33A shows "$\phi_1$", FIG. 33B shows "$\phi_1$", and FIG. 33C shows "$\phi_2$".

As described above, it is preferable that the frequency characteristic $\phi_0$ of the filter used in the first filtering process F1 is determined based on the center (average) of a distribution of the frequency characteristics of the plurality of types of image filtering processes.

Further, it is preferable that the frequency characteristics of the filters used in the other filtering processes are determined according to components of which the variations (variances) of the frequency characteristics of the plurality of types of image filtering processes shown in each of FIGS. 31A and 31B are large. Accordingly, it is preferable that the frequency characteristic $\phi_1$ of the filter used in the second filtering process F2 is determined based on the component having the largest variation of the frequency characteristics of the plurality of types of image filtering processes (see "H4" in FIGS. 31A and 31B). Similarly, it is preferable that the frequency characteristic $\phi_2$ of the filter used in the third filtering process F3 is determined based on the component having the second largest variation of the frequency characteristics of the plurality of types of image filtering processes (see "H2" in FIGS. 31A and 31B).

FIGS. 34A and 34B show a frequency characteristic f(ω) (see FIG. 34A) and a gain example (see FIG. 34B) relating to the image filtering process P (first filtering process F1 to third filtering process F3) performed by the filtering process unit 41 having the circuit configuration shown in FIG. 10. In the frequency characteristic f(ω) relating to a multimodal distribution shown in FIG. 34A, "$\phi_0^{(i)}(\omega)$" represents a frequency characteristic of a filter used in a first filter application unit 48-1 of the first filtering process F1, and "$g_0$" represents a gain used in a first gainr application unit 49-1 of the first filtering process F1. Further, "$\phi_1^{(i)}(\omega)$" represents a frequency characteristic of a filter used in a second filter application unit 48-2 of the second filtering process F2, and "$g_1$" represents a gain used in a second gain application unit 49-2 of the second filtering process F2. Furthermore, "$\phi_2^{(i)}(\omega)$" represents a frequency characteristic of a filter used in a third filter application unit 48-3 of the third filtering process F3, and "$g_2$" represents a gain used in a third gain application unit 49-3 of the third filtering process F3.

The sign "i" in the frequency characteristics $\phi_1^{(i)}(\omega)$ to $\phi_3^{(i)}(\omega)$ of the respective filters represents a cluster index indicating a group classified according to the multimodal distribution. For example, in the first image filtering process P1 to the third image filtering process P3 classified as the first variation distribution G1, "1" may be allocated as the cluster index i as shown in FIG. 34B. On the other hand, in the fourth image filtering process P4 to the sixth image filtering process P6 classified as the second variation distribution G2, "2" may be allocated as the cluster index i as shown in FIG. 34B.

FIG. 34B shows gains $g_0$ to $g_2$ for realizing respective frequency characteristics of the image filtering processes P1 to P6 shown in FIG. 30 by a frequency characteristic of the entire system shown in FIG. 34A with high accuracy in a case where a filter used in each filter application unit 48 of the filtering process unit 41 having the circuit configuration shown in FIG. 10 is fixed and the gain $g_0$ used in the first filtering process F1 is fixed to "1.0", for example.

As shown in FIG. 34B, according to the above-described example, it is possible to compress data on the frequency characteristics of the plurality of types of image filtering processes P1 to P6 into six filter frequency characteristics $\phi_0^{(1)}$ to $\phi_2^{(1)}$, $\phi_0^{(2)}$ to $\phi_2^{(2)}$ (tap coefficients) and 18 gains (12 gains in a case where $g_0$ is fixed to "1.0").

In this way, according to the filter determination method based on the multimodal distribution, filter setting according to the number of groups that form the multimodal distribution (the first variation distribution G1 and the second variation distribution G2 in the example shown in FIG. 24) is necessary. Accordingly, in a case where the multimodal distribution is used, compared with a case where a unimodal distribution is used, the number of filters that needs to be stored in a memory in advance increases, and a necessary storage capacity also increases. Further, in order to associate each filter with a group to be classified, it is necessary to store association information such as the above-described cluster index in a memory in advance.

FIG. 35 is a block diagram showing an example of a functional configuration of the filter calculation unit 77 that calculates a filter coefficient based on a multimodal distribution. The filter calculation unit 77 in this example further includes a filter group classification unit 82, in addition to the average calculation unit 78, the variance calculation unit 79, the filter characteristic acquisition unit 80 and the tap coefficient computation unit 81 described above (see FIG. 29), in order to classify a plurality of types of frequency characteristics of image filtering processes into a plurality of groups that form a multimodal distribution.

The filter group classification unit 82 in this example classifies frequency characteristics of a plurality of types of image filtering processes (in the example shown in FIG. 30, the first image filtering process P1 to the sixth image filtering process P6) into a plurality of filter groups (the first variation distribution G1 and the second variation distribution G2 in the example shown in FIG. 24) with reference to a mixed normal distribution.

Figure 36:
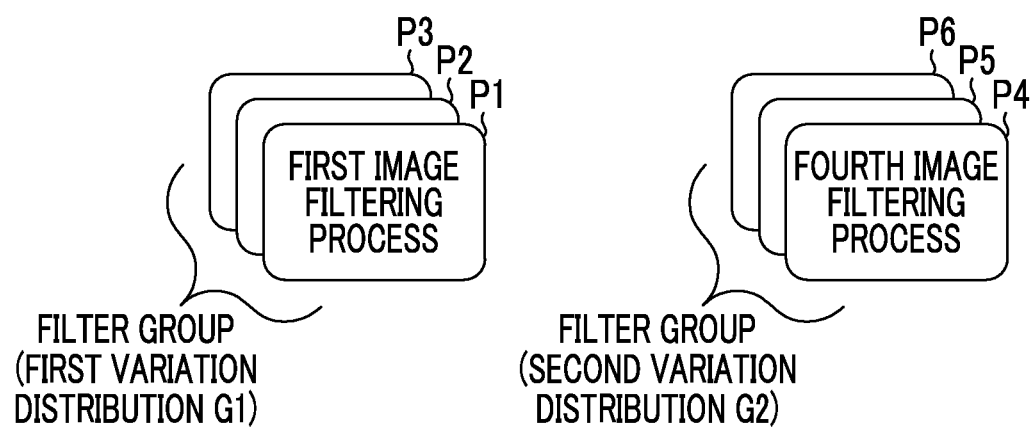
FIG. 36 is a conceptual diagram of a plurality of types of image filtering processes (frequency characteristics) classified as plural filter groups by a filter group classification unit.

FIG. 36 is a conceptual diagram of a plurality of types of image filtering processes (frequency characteristics) classified into a plurality of filter groups by the filter group classification unit 82. The filter group classification unit 82 analyzes similarity of frequency characteristic data of the plurality of types of image filtering processes, and classifies the frequency characteristics of the respective image filtering processes into corresponding filter groups. In the above-described example, the first image filtering process P1 to the third image filtering process P3 are classified into a filter group of the first variation distribution G1, and the fourth image filtering process P4 to the sixth image filtering process P6 are classified into a filter group of the second variation distribution G2, by the filter group classification unit 82.

The average calculation unit 78, the variance calculation unit 79, the filter characteristic acquisition unit 80, and the tap coefficient computation unit 81 that form the filter calculation unit 77 acquire a reference filter $h_b$ and at least one variance filter $h_v$ relating to each of the plurality of filter groups, based on frequency characteristics of a plurality of types of image filtering processes included in each of the plurality of filter groups among the frequency characteristics of the plurality of types of image filtering processes which are classified into the plurality of filter groups.

According to the above-described example, in a case where a variation distribution of frequency characteristics of a plurality of types of image filtering processes is already known, it is possible to design an optimal filter for covering the variation with high accuracy. Particularly, by selecting an appropriate distribution type among a unimodal distribution and a multimodal distribution according to the variation distribution of the frequency characteristics of the plurality of types of image filtering processes, it is possible to acquire a filter (filter coefficient) and a gain capable of reproducing a frequency characteristic of a desired image filtering process with high accuracy.

As described above, according to this embodiment, it is possible to reduce the number of filters (data amount), to prevent retention of FIR filters (filter coefficients (tap coefficients)) relating to all conditions, and to perform an image filtering process using an averagely excellent filter.

<Design of FIR Filter>

Next, a method for designing an FIR filter for which there is a limit in the number of taps will be described.

By flexibly adjusting a frequency characteristic of a filter by the above-described method, it is possible to design an optimal filter for effectively covering variation of frequency characteristics of a plurality of types of image filtering processes. However, in a case where a filter to be actually used is realized by an FIR filter for which there is a limit in the number of taps, it is difficult to ideally obtain a desired frequency characteristic.

Generally, it is extremely difficult to realize a rapid frequency characteristic with a small number of taps. Particularly, a characteristic vector corresponding to a small characteristic value tends to have a rapid zigzag shape. Accordingly, even if an ideal frequency characteristic of a filter is acquired by the above-described method, in a case where a sufficient number of taps of a filter to be actually used is not prepared, it is difficult to sufficiently cover variation of frequency characteristics of a plurality of types of image filtering processes.

This problem relates to a parametric function of which a base is non-linear, and is similar to a problem that a base parameter is determined to approximate a certain vector by a linear sum of as a small number of bases as possible. Various methods for solving such a problem have been proposed. For example, a SAGE algorithm is an algorithm used in incoming wave analysis in radio wave transmission, for example, and is a method for obtaining bases one by one to minimize a residual based on a point of view of an EM algorithm. Further, an OMP algorithm is an algorithm used in a case where a sparse coefficient vector using an overcomplete dictionary is obtained in a compressed sensing filed. The OMP method itself is not a method for obtaining a parametric base, but it is possible to apply the OMP method in design of an FIR filter by changing a situation setting for selection from a dictionary in OMP to a situation setting for selection of a parametric base close to a parametric base function.

An example of a specific computation method of the SAGE algorithm and the OMP algorithm will be described later, but the tap coefficient computation unit 81 (see FIGS. 29 and 35) of the filter calculation unit 77 may calculate a coefficient allocated to each tap of at least one variance filter from a variation distribution function (see a covariance matrix "$R_i$" which will be described later) determined based on a coefficient allocated to each tap of the reference filter $h_b$, which is a variation distribution function indicating a variance of frequency characteristics of a plurality of types of image filtering processes, based on the algorithms.

According to the SAGE algorithm and the OMP algorithm (which will be described later), the tap coefficient computation unit 81 of the filter calculation unit 77 acquires, in a case where "I" is set to an integer which is equal to or greater than 2, a first to an I-th variance filters $h_v$, and calculates a coefficient allocated to each tap of the first variance filter $h_v$ from a variation distribution function determined based on a coefficient allocated to each tap of the reference filter $h_b$. Further, the tap coefficient computation unit 81 of the filter calculation unit 77 calculates, in a case where "J" is set to an integer which is equal to or greater than 2 and is equal to or smaller than I, a coefficient allocated to each tap of a J-th variance filter $h_v$, from the variation distribution function determined based on the coefficient allocated to each tap of the reference filter $h_b$ and a coefficient allocated to each tap of the variance filter $h_v$ which belongs to a first to a (J−1)-th variance filters $h_v$.

Further, in the SAGE algorithm, the tap coefficient computation unit 81 of the filter calculation unit 77 updates a coefficient allocated to each tap of at least one of the reference filter $h_b$ and the at least one variance filter $h_v$, based on a variation distribution function (see a covariance matrix "$Q_j$" (which will be described later)) indicating a residual component determined based on the coefficient allocated to each tap of the reference filter $h_b$ and at least one variance filter $h_v$, which is a variation distribution function indicating a variation of frequency characteristics of a plurality of types of image filtering processes.

The SAGE algorithm and the OMP algorithm are described in various literatures, and for example, may make reference to J. A. Fessler and A. O. Hero, "Space-Alternating Generalized Expectation-Maximization Algorithm," IEEE Transactions on Signal Processing, Vol. 17, No. 10, pp. 2664-2677, 1994; B. H. Fleury, M. Tschudin, R. Heddergott, D. Dahlhaus, and K. I. Pedersen, "Channel Parameter Estimation in Mobile Radio Environments Using the SAGE Algorithm," IEEE J. Selected Areas in Communications, Vol. 17, No. 3, pp. 434-449, March 1999; and Y Pati, R. Rezaiifar, P. Krishnaprasad, "Orthogonal Matching Pursuit: recursive function approximation with application to wavelet decomposition", in Asilomar Conf. on Signals, Systems and Comput., 1993. Here, since both the SAGE algorithm and the OMP algorithm are provided for the purpose of vector base decomposition and do not originally handle partial space approximation in filter design, it is necessary to perform appropriate modification with respect to a calculation expression.

<Calculation of Optimal Filter Group Based on Application of OMP Algorithm>

Hereinafter, an example of filter design based on the OMP algorithm will be described. Processes of respective steps described hereinbelow is basically performed by the filter calculation unit 77 (tap coefficient computation unit 81), but a part or all of the processes of the respective steps may be performed by another unit.

Hereinafter, a case where a unimodal distribution is premised will be described. With respect to a case where a multimodal distribution is premised, as described above, a case where the unimodal distribution is premised may be applied. That is, by handling each of a plurality of filter groups (in the example shown in FIG. 24, the first variation distribution G1 and the second variation distribution G2) as the variation distribution G of the unimodal distribution, it is possible to handle a case where the multimodal distribution is premised.

Step 1

First, a tap coefficient of an FIR filter that most closely approximates an average (a central value) of frequency characteristics of a plurality of types of image filtering processes represented by the above-described "$\psi_0$" is acquired by an arbitrary method, and a frequency characteristic of a filter which is actually realized by the tap coefficient is set as "a frequency characteristic $\phi_0$ of a filter used in a first filtering process F1.

Step 2

A covariance matrix $R_0$ in a case where "the frequency characteristic $\phi_0$ of the filter which is actually used in the first filtering process F1" is assumed as the average (central value) of the frequency characteristics of the plurality of types of image filtering processes is calculated based on the following expression.

$$R_0 = \frac{1}{N_r}\sum_{i=1}^{N_r}(\beta_i - \phi_0)(\beta_i - \phi_0)^H$$

Step 3

The covariance matrix $R_0$ is set as a covariance matrix $R_1$, and the parameter "i" is set to "1" as shown in the following expression.

$$R_iR_2$$

$$i \leftarrow 1$$

Step 4

A characteristic vector $\psi_i$ corresponding to a maximum characteristic value of the covariance matrix $R_i$ is obtained by the above-described method.

Step 5

A tap coefficient of an FIR filter that most closely approximates a frequency characteristic of the characteristic vector $\psi_i$ is acquired by an arbitrary method, and a frequency characteristic of a filter which is actually realized by the tap coefficient is set to "$\phi_i$". A filter having the frequency characteristic $\phi_i$ corresponds to a filter used in an "i+1"-th filtering process, and for example, if "i=1", a frequency characteristic $\phi_2$ of a filter used in the second filtering process F2 is obtained. The tap coefficient of the filter relating to "$\phi_{i+1}$" is stored in a memory (not shown).

Step 6

Using the already obtained "$\phi_1$ to $\phi_i$" as bases, a component capable of being represented by a partial space where the bases are spread is excluded from the covariance matrix, and a residual is calculated. For example, if "$\phi_i=[\phi_1 \; \phi_2 \; \ldots \; \phi_i]$" is defined by setting "i" to an integer which is equal to or greater than 3, when a Moore-Penrose generalized inverse of $\phi_i$ is represented using "$\phi_i^+$", an orthogonal projection matrix to a span $\{\phi_1, \phi_2, \ldots \phi_i\}$ is represented as "$\phi_i\omega_i^+$". If the orthogonal projection matrix $\phi_i\phi_i^+$ is used, the covariance matrix "$R_{i+1}$" is represented as the following expression.

$$R_{i+1}=(I-\Phi_i\Phi_i^+)R_0(I-\Phi_i\Phi_i^+)^H$$

I: unit matrix

Step 7

As represented by the following expression, "i" is newly set to "i=i+1", and then, "step 4" to "step 7" are repeated until "i=N-1" is satisfied. In this way, the filter frequency characteristics $\phi_1$ to $\phi_{N-1}$ are obtained.

$$i \leftarrow i+1$$

<Calculation of Optimal Filter Group Based on Application of SAGE Algorithm>

Next, an example of filter design based on the SAGE algorithm will be described. Hereinafter, a case where a unimodal distribution is premised will be described, this example may be applied to a case where a multimodal distribution is premised, which is the same as the above-described OMP algorithm.

The SAGE algorithm is different from the OMP algorithm in that updating of the residual of the covariance matrix in the above-described step 6 is simply based on subtraction of a selected base (FIR filter) and the updating is individually continued with respect to each base even after all bases are once obtained.

More specifically, step 1 to step 5 of the above-described OMP algorithm are similarly performed in the SAGE algorithm. Here, the covariance matrix "$R_{i+1}$" used in step 6 in the above-described OMP algorithm is obtained by the following expression in the SAGE algorithm.

$$R_{i+1}=(I-\phi_i\phi_i^H)R_i(I-\phi_i\phi_i^H)^H$$

In step 7 of the above-described OMP algorithm is similarly performed in the SAGE algorithm. Here, in the SAGE algorithm, step 8 to step 12 are performed after step 7.

Step 8

As represented by the following expression, a parameter "j" is set to an initial value "1".

$$j \leftarrow 1$$

Step 9

As represented by the following expression, a component capable of being expressed by a partial space where bases from which a j-th base is excluded are spread is excluded from the covariance matrix, and a residual is calculated.

$$\psi_j=[\phi_1\phi_2 \ldots \phi_{j-1}\phi_{j+1} \ldots \phi_{N-1}]$$

$$Q_j=(I-\psi_j\psi_j^+)R_0(I-\psi_j\psi_j^+)^H$$

Step 10

A characteristic vector $\psi_j$ corresponding to a maximum characteristic value of a covariance matrix $Q_j$ indicating the residual component represented by the above expression is obtained according to the above-described method.

Step 11

A tap coefficient of an FIR filter that most closely approximates a frequency characteristic of the characteristic vector $\psi_j$ is acquired by an arbitrary method, and a frequency characteristic of a filter that is actually realized by the tap coefficient is set to "$\phi_j$". Thus, the frequency characteristic $\phi_j$" (tap coefficient) of the filter used in a "j+1"-th filtering process is updated, and the result is stored in a memory (not shown).

Step 12

Until an overall approximation error "$J_{TOTAL}$" defined as the following expression is within a specific target range or the number of loops (calculation time) reaches a specific upper limit, "step 9" to "step 12" are repeated while changing the parameter "j" as represented by the following expression.

$$\Phi_{ALL}=[\phi_1\phi_2 \ldots \phi_{N-1}]$$

$$J_{TOTAL}=tr(I-\Phi_{ALL}\Phi^+_{ALL})R_0(I-\Phi_{ALL}\Phi^+_{ALL})^H$$

tr: trace (diagonal partial sum)

$$j \leftarrow \begin{cases} j+1 & j < N-1 \\ 1 & \text{otherwise} \end{cases}$$

By using the above-described SAGE algorithm or OMP algorithm, if variation (for example, average and variance) of frequency characteristics of a plurality of types of image filtering processes can be calculated, it is possible to design a tap coefficient of an FIR filter with high accuracy. Further, before calculation of a frequency characteristic of an individual specific image filtering process, it is possible to determine a tap coefficient of a filter that can be actually used in an image filtering process (a plurality of filtering processes).

Other Modification Examples

The above-described respective functional configurations may be realized by arbitrary hardware, software, or a combination of the hardware and software. For example, the invention may be applied to a program that causes a computer to execute the image processing method (image processing procedure and function), the gain acquisition method (gain acquisition processing procedure and function), and the filter acquisition method (filter acquisition processing procedure and function) in the above-described respective apparatuses and processing units, a computer readable recording medium (non-transitory recording medium) in which the program is recorded, or a computer in which the program can be installed.

Further, the purpose of the image filtering process (the plurality of times of filtering processes) is not particularly limited, and in each filtering process (each filter application unit 48), various filters such as a restoration filter or a contour emphasis filter based on a point spread function for the purpose of improving image quality, or an art filter or a diffusing filter for the purpose of providing a special effect, may be used.

<Application Example to EDoF System>

For example, the image filtering process according to the invention may be applied to a restoration process with respect to image data (original image data D1) which is acquired through imaging by an optical system (an imaging lens or the like) having an extended depth of field (focus) (EDof). By performing the restoration process with respect to image data of a blurred image which is acquired through imaging in a state where the EDof (focal depth) is extended by the EDof optical system, it is possible to restore and generate image data with a high resolution in a focused state in a wide range. In this case, a restoration process using a restoration filter which is based on an optical transfer function (PSF, OTF, MTF, PTF, or the like) of the EDoF optical system and has a filter coefficient set so that excellent image restoration can be performed in the range of the extended depth of field (focal depth), may be performed.

Hereinafter, an example of a system (EDoF system) relating to restoration of image data which is acquired through imaging using the EDoF optical system will be described. In the example shown hereinafter, an example in which a restoration process is performed with respect to a brightness signal (Y data) obtained from image data (RGB data) after demosaicing will be described, but a timing when the restoration process is performed is not particularly limited, and for example, the restoration process may be performed with respect to "image data (mosaic image data) before the demosaicing" or "image data (demosaiced image data) after the demosaicing and before brightness signal conversion".

Figure 37:
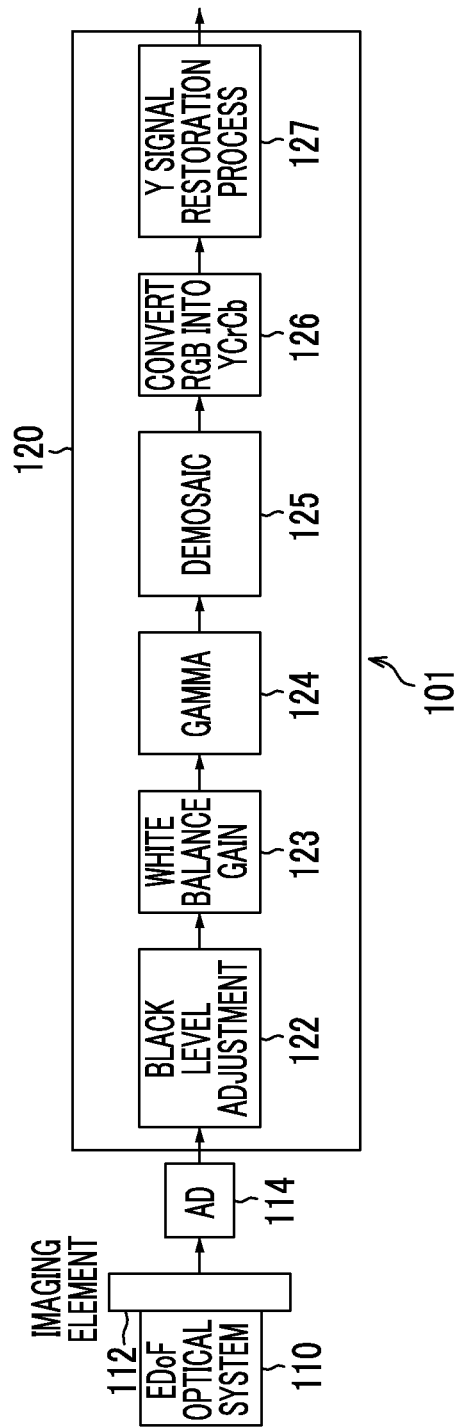
FIG. 37 is a block diagram showing a form of an imaging module that includes an EDoF optical system.

FIG. 37 is a block diagram showing a form of an imaging module 101 that includes an EDoF optical system. The imaging module 101 (a digital camera or the like) in this example includes an EDoF optical system (lens unit) 110, an imaging element 112, an AD converter 114, and a restoration process block (image processing unit 35) 120.

Figure 38:
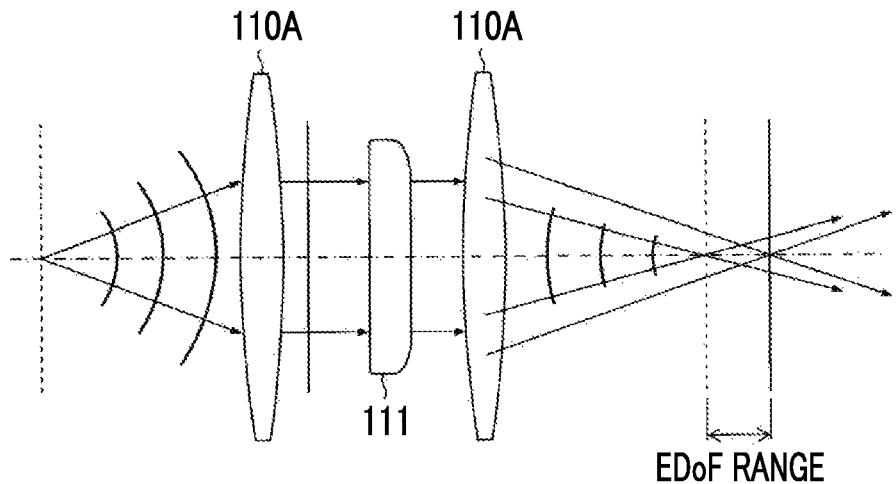
FIG. 38 is a diagram showing an example of the EDoF optical system.

FIG. 38 is a diagram showing an example of the EDoF optical system 110. The EDoF optical system 110 in this example includes fixed imaging lenses 110A having a single focus, and an optical filter 111 disposed at a pupil position. The optical filter 111 modulates a phase, and causes the EDoF optical system 110 (imaging lenses 110A) to have EDoF so that the extended depth of field (focal depth) (EDoF) is obtained. In this way, the imaging lenses 110A and the optical filter 111 form a lens unit that modulates a phase to extend the depth of field.

The EDoF optical system 110 includes another component as necessary, and for example, a diaphragm (not shown) is disposed in the vicinity of the optical filter 111. Further, a single optical filter 111 may be used, or a combination of a plurality of optical filter 111 may be used. Furthermore, the optical filter 111 is only an example of optical phase modulation means, and EDoF of the EDoF optical system 110 (imaging lens 110A) may be realized by another means. For example, instead of the optical filter 111, EDoF of the EDoF optical system 110 may be realized by the imaging lens 110A lens-designed to have the same function as that of the optical filter 111 in this example.

That is, EDoF of the EDoF optical system 110 may be realized by a variety of means for changing a wave front of image formation onto a light receiving surface of the imaging element 112. For example, "an optical element of which a thickness is changed", "an optical element of which a refractive index is changed (a refractive index distribution type wave front modulation lens, or the like)", "an optical element of which a thickness or a refractive index is changed due to coating on a lens surface or the like (a wave front modulation hybrid lens, an optical element formed on a lens surface as a phase surface, or the like)", or "a liquid crystal element capable of modulating a light phase distribution (a liquid crystal space phase modulation element, or the like)" may be employed as the EDoF means of the EDoF optical system 110. In this way, the invention is not only applied to a case where images which are regularly dispersed by a light wave front modulation element (optical filter 111 (phase plate)) can be formed, but may also be applied to a case where the same dispersed images as those formed using a light wave front modulation element can be formed by the imaging lens 110A itself without using the light wave front modulation element.

Since the EDoF optical system 110 shown in FIG. 38 may not be provided with a focus adjustment mechanism that mechanically performs focus adjustment, it is possible to reduce its size, and thus, the EDoF optical system 110 can be suitably mounted to a mobile phone or a personal digital assistant with a camera.

An optical image after passing through the EDoF optical system 110 having EDoF is formed on the imaging element 112 shown in FIG. 37, and is herein converted into an electric signal.

The imaging element 112 is configured by a plurality of pixels which are arranged in a matrix form using a predetermined pattern arrangement (Bayer arrangement, G-striped R/G full checker, X-Trans arrangement, or honeycomb arrangement, or the like), and each pixel is configured to include a microlens, a color filter (in this example, an RGB color filter), and a photodiode. An optical image incident onto the light receiving surface of the imaging element 112 through the EDoF optical system 110 is converted into an amount of signal electric charges corresponding to the quantity depending on the intensity of incident light by each photodiode arranged on the light receiving surface. Further, R, G, and B signal electric charges accumulated in each photodiode are sequentially output as a voltage signal (image signal) for each pixel.

The AD converter 114 converts analog R, G, and B image signals output from the imaging element 112 to each pixel into digital R, G, and B image signals. The digital image signals which are obtained by conversion into digital image signals in the AD converter 114 are applied to the restoration process block 120.

The restoration process block 120 includes a black level adjustment unit 122, a white balance gain unit 123, a gamma processing unit 124, a demosaicing unit 125, an RGB/YCrCb converter 126, and an Y signal restoration processing unit 127.

The black level adjustment unit 122 performs black level adjustment with respect to digital image signals output from the AD converter 114. A known method may be employed for the black level adjustment. For example, in a case where a certain effective photoelectric conversion element is focused on, by calculating an average of dark amperage acquisition signals respectively corresponding to a plurality of OB photoelectric conversion elements included in a photoelectric conversion element line including the effective photoelectric conversion element, and by subtracting the average from the dark amperage acquisition signals corresponding to the effective photoelectric conversion element, it is possible to perform the black level adjustment.

The white balance gain unit 123 performs gain adjustment based on a white balance gain of respective color signals of R, G, and B included in the digital image signals for which the black level data is adjusted.

The gamma processing unit 124 performs gamma correction for performing gradation correction such as a half tone so that the R, G, and B image signals for which the white balance is adjusted have desired gamma characteristics.

The demosaicing unit 125 performs demosaicing with respect to the R, G, and B image signals after gamma correction. Specifically, the demosaicing unit 125 generates a set of image signals (R signal, G signal, and B signal) output from each light receiving pixel of the imaging element 112 by performing a color interpolation process with respect to the R, G, and B image signals. That is, before demosaicing, a pixel signal from each light receiving pixel is any one of the R, G, and B image signals, but after color demosaicing, a set of three pixel signals of R, G, and B signals corresponding to each light receiving pixel is output.

The RGB/YCrCb converter 126 converts the R, G, and B signals for each pixel, subjected to the demosaicing, into a brightness signal Y, and a color difference signals Cr and Cb, and outputs the brightness signal Y and the color difference signals Cr and Cb for each pixel.

The Y signal restoration processing unit 127 performs a restoration process with respect to the brightness signal Y from the RGB/YCrCb converter 126 based on a restoration filter which is stored in advance. The restoration filter is configured by a deconvolution kernel (corresponding to a tap number of M=7 and N=7) having a kernel size of 7×7 and a computation coefficient (corresponding to restoration gain data and a filter coefficient) corresponding to the deconvolution kernel, and is used in a deconvolution process (deconvolution computation process) corresponding to phase modulation of the optical filter 111. The restoration filter corresponds to the optical filter 111, and is stored in a memory (not shown) (for example, a memory in which the Y signal restoration processing unit 127 is additionally provided). Further, the kernel size of the deconvolution kernel is not limited to 7×7. The Y signal restoration processing unit 127 has a function of a sharpening process in the above-described image processing unit 35.

Figure 39:
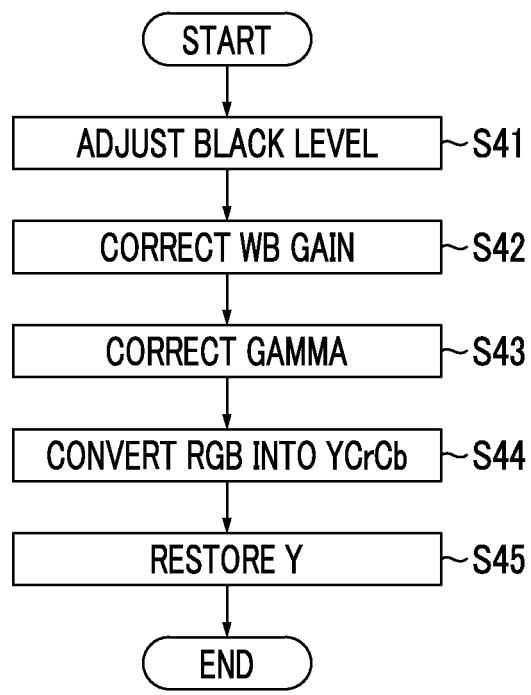
FIG. 39 is a diagram showing an example of a restoration processing flow in a restoration processing block shown in FIG. 37.

Next, a restoration process in the restoration process block 120 will be described. FIG. 39 is a diagram showing an example of a restoration process flow in the restoration process block 120 shown in FIG. 37.

Digital image signals from the AD converter 114 are applied to one input end of the black level adjustment unit 122, and black level data is applied to the other input end thereof. The black level adjustment unit 122 subtracts the black level data from the digital image signals, and outputs the digital image signals from which the black level data is subtracted to the white balance gain unit 123 (S41). Thus, a black level component is not included in the digital image signals, and thus, a digital image signal indicating the black level becomes 0.

The processes in the white balance gain unit 123 and the gamma processing unit 124 are sequentially performed with respect to image data after black level adjustment (S42 and S43).

The gamma-corrected R, G, and B signals are demosaiced in the demosaicing unit 125, and then, are converted into the brightness signal Y, and the color difference signals Cr and Cb in the RGB/YCrCb converter 126 (S44).

The Y signal restoration processing unit 127 performs a restoration process for applying a deconvolution process corresponding to phase modulation of the optical filter 111 of the EDoF optical system 110 to the brightness signal Y (S45). That is, the Y signal restoration processing unit 127 performs a deconvolution process (deconvolution operating process) of brightness signals (herein, brightness signals of 7×7 pixels) corresponding to a predetermined unit of pixel groups centering around a pixel which is an arbitrary processing target and restoration filters stored in advance in a memory or the like (7×7 deconvolution kernels and their computation coefficients). The Y signal restoration processing unit 127 performs a restoration process for removing image blurring of an entire image by repeating the convolution process for each of the predetermined unit of pixel groups to cover an entire area of an imaging surface. The restoration filter is determined according to the position of the center of the pixel groups for which the deconvolution process is performed. That is, a common restoration filter is applied to contiguous pixel groups. Further, in order to simplify the restoration process, it is preferable to apply a common restoration filter to all the pixel groups.

As shown in (a) of FIG. 40, a point image (optical image) of brightness signals after passing through the EDoF optical system 110 are formed on the imaging element 112 as a large point image (blurred image), but is restored as a small point image (high-resolution image) by the deconvolution process in the Y signal restoration processing unit 127, as shown in (b) of FIG. 40.

As described above, by applying a restoration process to brightness signals after demosaicing, it is not necessary to separately provide parameters of the restoration process for each of R, G, and B, and thus, it is possible to perform the restoration process at high speed. Further, since respective image signals of R, G, and B corresponding to pixels of R, G, and B disposed at scattered positions are not collected in individual units to perform the deconvolution process, but instead, brightness signals of contiguous pixels are collected in a predetermined unit and a common restoration filter is applied to the unit to perform the deconvolution process, the accuracy of the restoration process is enhanced. With respect to the color difference signals Cr and Cb, even though the resolution is not increased by the restoration process in terms of visual characteristics of human's eyes, an image may be allowed in terms of image quality. Further, in a case where an image is recorded in a compression format such as JPEG, since color difference signals are compressed at a high compression rate compared with that of a brightness signal, it is not necessary to increase the resolution by the restoration process. Thus, it is possible to enhance the accuracy of restoration, and simultaneously, to achieve simplification and speed increase of the process.

With respect to the restoration process of the above-described EDoF system, similarly, it is possible to apply the image filtering process according to the above-described embodiment.

Further, a form to which the invention is applicable is not limited to a digital camera and a computer (server). For example, the invention may be applied to various types of cameras that have an imaging function as a main function, and also, may be applied to various types of mobile devices that have other functions (call function, communication function, and other computer functions) in addition to an imaging function. As other forms to which the invention is applicable, for example, a mobile phone, a smartphone, a personal digital assistant (PDA) and a mobile game machine having a camera function may be used. Hereinafter, an example of a smartphone to which the invention is applicable will be described.

<Application Example to Smartphone>

FIG. 41 is a diagram showing an appearance of a smartphone 201. The smartphone 201 shown in FIG. 41 includes a flat housing 202, and a display input unit 220 that is disposed on one surface of the housing 202 and includes a display panel 221 which is a display unit and an operation panel 222 which is an input unit, in which the display panel 221 and the operation panel 222 are integrally formed. Further, the housing 202 includes a speaker 231, a microphone 232, an operation unit 240, and camera unit 241. The configuration of the housing 202 is not limited to thereto, and for example, a configuration in which a display unit and an input unit are provided in an independent manner may be employed, or a configuration in which a folding structure or a slide mechanism is provided may also be employed.

FIG. 42 is a block diagram showing a configuration of the smartphone 201 shown in FIG. 41. As shown in FIG. 42, as main components of the smartphone, a wireless communication unit 210, the display input unit 220, a call unit 230, the operation unit 240, the camera unit 241, a storage unit 250, an external input/output unit 260, a global positioning system (GPS) receiver unit 270, a motion sensor unit 280, a power source unit 290, and a main controller 200 (including the above-described main body controller 25) are provided. Further, as main functions of the smartphone 201, a wireless communication function for performing mobile wireless communication with a base station device BS through a mobile communication network NW.

The wireless communication unit 210 performs wireless communication with the base station device BS connected to the mobile communication network NW according to an instruction of the main controller 200. Using the wireless communication, the wireless communication unit 210 performs transmission and reception of a variety of file data such as sound data or image data, e-mail data, or the like, and performs reception of Web data, streaming data, or the like.

The display input unit 220 is a so-called touch panel that includes a display panel 221 and an operation panel 222, displays an image (a still image and a moving image), character information, or the like under the control of the main controller 200 to visually transmit information to a user, and detects a user operation with respect to the displayed information.

The display panel 221 uses a liquid crystal display (LCD), an organic electro-luminescence display (OELD), or the like as a display device. The operation panel 222 is a device that is provided so that an image displayed on a display surface of the display panel 221 can be visually recognized and detects one or a plurality of sets of coordinates operated by a user's finger or a stylus. If the device is operated by a user's finger or a stylus, the operation panel 222 outputs a detection signal generated due to the operation to the main controller 200. Then, the main controller 200 detects an operation position (coordinates) on the display panel 221 based on the received detection signal.

As shown in FIG. 41, as an embodiment of the imaging device of the invention, a configuration in which the display panel 221 and the operation panel 222 of the smartphone 201 shown as an example in FIG. 54 are integrated to form the display input unit 220 and the operation panel 222 is disposed to completely cover the display panel 221 may be used. In a case where such a configuration is employed, the operation panel 222 may have a function of detecting a user operation in a region out of the display panel 221. In other words, the operation panel 222 may include a detection region with respect to a portion that overlaps the display panel 221 (hereinafter, referred to as a "display region"), and a detection region with respect to an outer edge portion that does not overlap the display panel 221 (hereinafter, referred to as a "non-display region").

The size of the display region and the size of the display panel 221 may be completely the same, but it is not essential that both of the sizes are the same. Further, the operation panel 222 may include two sensitive regions of an outer edge portion and an inner portion other than the outer edge portion. Further, the width of the outer edge portion is appropriately designed according to the size of the housing 202, or the like. Furthermore, as a position detection method employed in the operation panel 222, any one of a matrix switch type, a resistive film type, a surface acoustic wave type, an infrared type, an electromagnetic induction type, an electrostatic capacitance type, and the like may be employed.

The call unit 230 includes the speaker 231 and the microphone 232. The call unit 230 converts user's voice input through the microphone 232 into voice data capable of being processed by the main controller 200 and outputs the result to the main controller 200, or decodes voice data received by the wireless communication unit 210 or the external input/output unit 260 and outputs the result through the speaker 231. Further, as shown in FIG. 41, for example, the speaker 231 may be mounted on the same surface as the surface where the display input unit 220 is provided, and the microphone 232 may be mounted on a side surface of the housing 202.

The operation unit 240 is a hardware key using a key switch or the like, and receives an instruction from a user. For example, as shown in FIG. 41, the operation unit 240 is a push button switch that is mounted on a side surface of the housing 202 of the smartphone 201, is turned on when being pressed by a finger or the like, and is turned off by a restoring force of a spring or the like when the finger is separated.

The storage unit 250 stores a control program or control data of the main controller 200, application software, address data in which a name, a telephone number, and the like of a communication partner are associated with each other, data on transmitted or received e-mails, Web data downloaded by a Web browser, or data on downloaded content, and temporarily stores streaming data or the like. Further, the storage unit 250 includes an internal storage unit 251 provided in the smartphone, and an external storage unit 252 provided with a slot for a detachable external memory. Each of the internal storage unit 251 and the external storage unit 252 that form the storage unit 250 is realized using a storage medium such as a flash memory, a hard disk, a multimedia card micro type memory, a card type memory (for example, MicroSD (registered trademark) memory or the like), a random access memory (RAM), a read only memory (ROM), or the like.

The external input/output unit 260 serves as an interface with respect to all types of external devices to be connected to the smartphone 201, and is directly or indirectly connected to other external devices through communication or the like (for example, Universal Serial Bus (USB), IEEE1394, or the like) or a network (for example, Internet, wireless LAN, Bluetooth (registered trademark), Radio Frequency Identification (RFID), Infrared Data Association (IrDA, registered trademark), Ultra Wideband (UWB, registered trademark), ZigBee (registered trademark), or the like).

As an external device to be connected to the smartphone 201, for example, a wired or wireless headset, a wired or wireless external charger, a wired or wireless data port, a memory card, a Subscriber Identity Module (SIM) card or a User Identity Module (UIM) card connected through a card socket, an external audio/video device connected through an audio/video input/output (I/O) terminal, an external audio/video device connected in a wireless manner, a smartphone connected in a wired or wireless manner, a personal computer connected in a wired or wireless manner, a PDA connected in a wired or wireless manner, an earphone or the like connected in a wired or wireless manner, may be used. The external input/output unit may be configured to transfer received data transmitted from the external device to respective components in the smartphone 201, or to transmit data in the smartphone 201 to the external device.

The GPS receiver unit 270 receives GPS signals transmitted from GPS satellites ST1 to STn according to an instruction of the main controller 200, executes a positioning computation process based on the plurality of received GPS signals, and detects a position specified by the latitude, longitude and altitude of the smartphone 201. In a case where position information can be acquired from the wireless communication unit 210 and/or the external input/output unit 260 (for example, wireless LAN), the GPS receiver unit 270 can also detect the position using the position information.

The motion sensor unit 280 includes a triaxial acceleration sensor or the like, for example, and detects a physical movement of the smartphone 201 according to an instruction of the main controller 200. By detecting the physical movement of the smartphone 201, a direction and an acceleration where the smartphone 201 moves are detected. The detection result is output to the main controller 200.

The power source unit 290 supplies power accumulated in a battery (not shown) to respective units of the smartphone 201 according to an instruction of the main controller 200.

The main controller 200 includes a microprocessor, and is operated according to a control program or control data stored in the storage unit 250 to generally control the respective units of the smartphone 201. Further, the main controller 200 has a mobile communication control function for controlling respective units of a communication system and an application processing function in order to perform voice communication or data communication through the wireless communication unit 210.

The application processing function is realized as the main controller 200 is operated according to application software stored in the storage unit 250. As the application processing function, for example, an infrared communication function for controlling the external input/output unit 260 to perform data communication with an opposing device, an e-mail function for performing transmission and reception of e-mails, a Web browsing function for browsing Web pages, or the like is used.

Further, the main controller 200 has an image processing function, for example, for displaying video on the display input unit 220 based on image data (data on a still image or a moving image) such as received data or downloaded streaming data. The image processing function refers to a function for decoding the image data, performing image processing with respect to the decoded image data, and displaying an image obtained through the image processing on the display input unit 220, by the main controller 200.

In addition, the main controller 200 executes a display control with respect to the display panel 221, and an operation detection control for detecting a user operation through the operation unit 240 or the operation panel 222.

By executing the display control, the main controller 200 displays an icon for starting up application software or a software key such as a scroll bar, or displays a window for creating an e-mail. The scroll bar refers to a software key for receiving, with respect to a large image which cannot be accommodated in a display region of the display panel 221, an instruction for movement of a display portion of the image.

Further, by execution of the operation detection control, the main controller 200 detects a user operation through the operation unit 240, receives an operation with respect to the icon or an input of a character string with respect to an input section of the window, through the operation panel 222, or receives a scroll request of a display image through the scroll bar.

Furthermore, by execution of the operation detection control, the main controller 200 includes a touch panel control function for determining whether an operation position with respect to the operation panel 222 corresponds to a portion (display region) that overlaps the display panel 221 or an outer edge portion (non-display region) that does not overlap the display panel 221, and controlling a sensitive region of the operation panel 222 and a display position of a software key.

The main controller 200 may detect a gesture operation with respect to the operation panel 222, and may execute a predetermined function according to the detected gesture operation. The gesture operation does not refer to a typical simple operation, but refers to an operation of drawing a locus using a finger or the like, an operation of simultaneously designating a plurality of positions, or an operation of drawing a locus with respect to at least one of a plurality of positions by combination of the above operations.

The camera unit 241 is a digital camera that performs electronic imaging using an imaging element such as a CMOS or a CCD. The camera unit 241 may convert image data obtained through imaging into compressed image data such as JPEG, for example, may record the image data in the storage unit 250, or may output the image data through the external input/output unit 260 or the wireless communication unit 210, under the control of the main controller 200. In the smartphone 201 shown in FIG. 41, the camera unit 241 is mounted on the same surface as that of the display input unit 220, but the mounting position of the camera unit 241 is not limited thereto, and the camera unit 241 may be mounted on a rear surface of the housing 202, instead of the front surface of the housing 202 where the display input unit 220 is provided, or a plurality of camera units 241 may be mounted on the housing 202. In a case where the plurality of camera units 241 are mounted, imaging may be performed using a single camera unit 241 while switching the plurality of camera units 241 to be provided for imaging, or may be performed using the plurality of camera units 241 at the same time.

Further, the camera unit 241 may be used for various functions of the smartphone 201. For example, an image acquired by the camera unit 241 may be displayed on the display panel 221, or an image in the camera unit 241 may be used as one of operation inputs through the operation panel 222. Further, when detecting a position using the GPS receiver unit 270, the position may be detected with reference to an image from the camera unit 241. In addition, it is possible to determine an optical axis direction or a current usage environment of the camera unit 241 of the smartphone 201 without using a triaxial acceleration sensor or by using the triaxial acceleration sensor together, with reference to the image from the camera unit 241. Furthermore, the image from the camera unit 241 may be used in the application software.

Furthermore, position information acquired by the GPS receiver unit 270, voice information (which may be text information obtained by performing voice text conversion by the main controller or the like) acquired by the microphone 232, posture information acquired by the motion sensor unit 280, or the like may be added to image data on a still image or a moving image, and the result may be recorded in the storage unit 250, or may be output through the external input/output unit 260 or the wireless communication unit 210.

The above-described image processing unit 35 (filtering process unit 41) may be realized by the main controller 200, for example.

The invention is not limited to the above-described embodiments, and various modifications may be made in a range without departing from the concept of the invention.

EXPLANATION OF REFERENCES

10: digital camera
11: lens unit
12: camera main body
14: lens
15: diaphragm
17: optical system operation unit
18: lens unit controller
19: lens unit storage unit
20: lens unit input/output unit
24: imaging element
25: main body controller
26: user interface
27: display unit
28: camera main body input/output unit
29: main body storage unit
30: input/output interface
34: device controller
35: image processing unit
36: display controller
40: pre-processing unit
41: filtering process unit
42: post-processing unit
43: gain specifying unit
44: gain candidate data storage unit
45: gain acquisition unit
47: filter application block
48: filter application unit
49: gain application unit
50: process data calculation unit
51: processed data acquisition unit
52: adder unit
54: repetitive computation determination unit
55: gain supply unit
56: filter supply unit
60: reference image acquisition unit
61: reference image analysis unit
62: target frequency characteristic acquisition unit
63: application gain calculation unit
66: frequency analysis unit
67: target frequency characteristic specifying unit
68: frequency characteristic storage unit
70: gain application block
70-1: first gain block
70-2: second gain block
71: position coordinate calculation unit
72-1: first gain output unit
72-2: second gain output unit
73: weight coefficient determination unit
74: weight adjustment unit
75: weight adder unit
76: filter acquisition apparatus
77: filter calculation unit
78: average calculation unit
79: variance calculation unit
80: filter characteristic acquisition unit
81: tap coefficient computation unit
82: filter group classification unit
92: computer
93: computer input/output unit
94: computer controller
95: display
96: network
97: server
98: server input/output unit
99: server controller
101: imaging module
110: EDoF optical system
110A: imaging lens
111: optical filter
112: imaging element
114: AD converter
120: restoration process block
122: black level adjustment unit
123: white balance gain unit
124: gamma processing unit
125: demosaicing unit
126: YCrCb converter
127: Y signal restoration processing unit
200: main controller
201: smartphone
202: housing
210: wireless communication unit
220: display input unit
221: display panel
222: operation panel
230: call unit
231: speaker
232: microphone
240: operation unit
241: camera unit
250: storage unit
251: internal storage unit
252: external storage unit
260: external input/output unit
270: GPS receiver unit
280: motion sensor unit
290: power source unit

What is claimed is:

1. An image processing apparatus comprising:
a filtering process circuit that performs an image filtering process that includes a plurality of times of filtering processes with respect to original image data to acquire processed image data,
wherein in each of the plurality of times of filtering processes, the filtering process circuit applies a filter to processing target data to acquire filter application process data, applies a gain to the filter application process data to acquire gain application process data, and acquires filtering process data from the gain application process data, and
wherein in each of the plurality of times of filtering processes, the gain applied to the filter application process data is acquired based on a target frequency characteristic of the image filtering process determined according to a pixel position in the original image data;
a gain candidate data storage that stores gain table information obtained by associating candidate data of the gain applied to the filter application process data with the pixel position, in each of the plurality of times of filtering processes; and
a gain specifying circuit that specifies, with reference to the gain table information, the candidate data associated with the pixel position according to the target frequency characteristic of the image filtering process as the gain applied to the filter application process data in each of the plurality of times of filtering processes,
wherein the filtering process circuit applies the gain specified by the gain specifying circuit to the filter application process data to acquire the gain application process data in each of the plurality of times of filtering processes.

2. The image processing apparatus according to claim 1,
wherein the target frequency characteristic of the image filtering process is a frequency characteristic based on an optical characteristic.

3. The image processing apparatus according to claim 1,
wherein the filtering process circuit performs the plurality of times of filtering processes for each pixel of the original image data, and
wherein the gain specifying circuit acquires processed pixel information indicating the pixel position in the original image data which is a target of the plurality of times of filtering processes, and specifies the candidate data associated with the pixel position indicated by the processed pixel information as the gain applied to the filter application process data in each of the plurality of times of filtering processes.

4. The image processing apparatus according to claim 1,
wherein the filtering process circuit acquires the filter application process data using a filter determined according to a characteristic of an optical system used when the original image data is acquired through imaging, in at least any one filtering process among the plurality of times of filtering processes.

5. The image processing apparatus according to claim 4,
wherein the filter determined according to the characteristic of the optical system is a filter determined based on a point spread function of the optical system.

6. The image processing apparatus according to claim 1,
wherein the filtering process circuit acquires the filter application process data using a filter determined irrespectively of a characteristic of an optical system used when the original image data is acquired through imaging, in at least any one filtering process among the plurality of times of filtering processes.

7. The image processing apparatus according to claim 6,
wherein the filter determined irrespectively of the characteristic of the optical system is a contour emphasis filter.

8. The image processing apparatus according to claim 1,
wherein the plurality of times of filtering processes include at least a first filtering process and a second filtering process, and
wherein the filtering process circuit uses the filtering process data acquired in the first filtering process as the processing target data in the second filtering process.

9. The image processing apparatus according to claim 1,
wherein the plurality of times of filtering processes include at least a first filtering process and a second filtering process, and
wherein the filtering process circuit uses the same data in the first filtering process and the second filtering process as the processing target data, and acquires the processed image data based on the filtering process data acquired in the first filtering process and the filtering process data acquired in the second filtering process.

10. The image processing apparatus according to claim 1,
wherein the plurality of times of filtering processes include at least a first filtering process and a second filtering process, and
wherein the filtering process circuit includes
a first filter application circuit that applies a filter for the first filtering process to the processing target data of the first filtering process and acquires the filter application process data,
a first gain application circuit that applies a gain for the first filtering process to the filter application process data of the first filtering process and acquires the gain application process data,
a second filter application circuit that applies a filter for the second filtering process to the processing target data of the second filtering process and acquires the filter application process data, and
a second gain application circuit that applies a gain for the second filtering process to the filter application process data of the second filtering process and acquires the gain application process data.

11. The image processing apparatus according to claim 1,
wherein the plurality of times of filtering processes include at least a first filtering process and a second filtering process,
wherein the filtering process circuit includes a filter application circuit that applies the filter to the processing target data to acquire the filter application process data, and a gain application circuit that applies the gain to the filter application process data to acquire the gain application process data,
wherein the filter application circuit acquires the filter application process data using a filter for the first filtering process in the first filtering process, and acquires the filter application process data using a filter for the second filtering process in the second filtering process, and
wherein the gain application circuit acquires the gain application process data using a gain for the first filtering process in the first filtering process, and acquires the gain application process data using a gain for the second filtering process in the second filtering process.

12. The image processing apparatus according to claim 1,
wherein the plurality of times of filtering processes include at least a first filtering process and a second filtering process, and
wherein the filtering process circuit
acquires the filter application process data using a reference filter determined according to an average of a plurality of types of frequency characteristics of the image filtering processes in the first filtering process, and
acquires the filter application process data using a variance filter determined according to a variance of the plurality of types of frequency characteristics of the image filtering processes in the second filtering process.

13. An image processing apparatus comprising:
a filtering process circuit that performs an image filtering process including a plurality of times of filtering processes with respect to original image data to acquire processed image data,
wherein the plurality of times of filtering processes include at least a first filtering process and a second filtering process,
wherein the filtering process circuit
applies a filter to a processing target data to acquire filter application process data, applies a gain to the filter application process data to acquire gain application process data, and acquires filtering process data from the gain application process data, in each of the plurality of times of filtering processes,
acquires, in the first filtering process, the filter application process data using a reference filter determined according to an average of frequency characteristics of the plurality of types of image filtering processes, which are frequency characteristics of the plurality of types of image filtering processes determined according to a pixel position in the original image data, and
acquires, in the second filtering process, the filter application process data using a variance filter determined according to a variance of the frequency characteristics of the plurality of types of image filtering processes, which are the frequency characteristics of the plurality of types of image filtering processes determined according to the pixel position in the original image data, and
wherein the gain applied to the filter application process data is determined according to the pixel position in the original image data, in each of the plurality of times of filtering processes.

14. The image processing apparatus according to claim 1,
wherein the gain table information is configured so that
specific candidate data is associated with a plurality of representative pixel positions, and
the candidate data associated with one or more pixel positions among the plurality of representative pixel positions is associated with pixel positions other than the plurality of representative pixel positions.

15. The image processing apparatus according to claim 14,
wherein the filtering process circuit applies a plurality of types of the filters to the processing target data to acquire a plurality of pieces of filter application process data, and
wherein the gain table information is configured so that a plurality of pieces of candidate data is respectively associated with the plurality of representative pixel positions, in which each of the plurality of pieces of candidate data respectively associated with the plurality of representative pixel positions is specified by the gain specifying circuit as the gains which are respectively applied to the plurality of pieces of filter application process data.

16. The image processing apparatus according to claim 15,
wherein the plurality of types of filters include a reference filter determined according to an average of a plurality of target frequency characteristics determined according to the plurality of representative pixel positions, and a variance filter determined according to a variance of the plurality of target frequency characteristics.

17. The image processing apparatus according to claim 15,
wherein the filtering process circuit includes
a filter application block that applies the plurality of types of filters to the processing target data to acquire the plurality of pieces of filter application process data,
a gain application block that applies the gain to the plurality of pieces of filter application process data to acquire the gain application process data and acquires the filtering process data from the gain application process data, and
a processed data acquisition circuit that acquires the processed image data,
wherein the gain application block includes a plurality of gain blocks, and the plurality of times of filtering processes are performed by the filter application block and each of the plurality of gain blocks,
wherein each of the plurality of gain blocks applies the gain to the plurality of pieces of filter application process data to acquire a plurality of pieces of gain application process data, acquires a plurality of pieces of filtering process data from the plurality of pieces of gain application process data, and acquires block process data from the plurality of pieces of filtering process data, and
wherein the processed data acquisition circuit acquires the processed image data based on the block process data acquired in the plurality of gain blocks.

18. The image processing apparatus according to claim 17,
wherein the plurality of gain blocks include at least a first gain block and a second gain block,
wherein each of the first gain block and the second gain block applies the gain to each of the plurality of pieces of filter application process data,
wherein the processed data acquisition circuit acquires the processed image data based on the block process data acquired in the first gain block and the block process data acquired in the second gain block, and
wherein in a case where the filtering process circuit performs the plurality of times of filtering processes with respect to the pixel positions other than the plurality of representative pixel positions, the gain specifying circuit specifies the candidate data associated with a first representative pixel position as the gain used in the first gain block and specifies the candidate data associated with a second representative pixel position as the gain used in the second gain block, among the candidate data associated with the pixel positions other than the plurality of representative pixel positions.

19. The image processing apparatus according to claim 17,
wherein the processed data acquisition circuit acquires the processed image data by performing a weighting computation with respect to the block process data acquired in the plurality of gain blocks.

20. The image processing apparatus according to claim 19,
wherein the processed data acquisition circuit determines a weight coefficient allocated to each piece of block process data acquired in the plurality of gain blocks based on the pixel position, and acquires the processed image data by performing the weighting computation for applying the weight coefficient to the block process data.

21. An image processing method for performing an image filtering process including a plurality of times of filtering processes with respect to original image data to acquire processed image data, comprising:
applying a filter to processing target data to acquire filter application process data, applying a gain to the filter application process data to acquire gain application process data, and acquiring filtering process data from the gain application process data, in each of the plurality of times of filtering processes,
acquiring the gain applied to the filter application process data based on a target frequency characteristic of the image filtering process determined according to a pixel position in the original image data, in each of the plurality of times of filtering processes,
storing gain table information obtained by associating candidate data of the gain applied to the filter application process data with the pixel position, in each of the plurality of times of filtering processes; and
specifying, with reference to the gain table information, the candidate data associated with the pixel position according to the target frequency characteristic of the image filtering process as the gain applied to the filter application process data in each of the plurality of times of filtering processes,
wherein applying the gain specified to the filter application process data to acquire the gain application process data in each of the plurality of times of filtering processes.

22. An image processing method for performing an image filtering process including a plurality of times of filtering processes with respect to original image data to acquire processed image data,
wherein the plurality of times of filtering processes include at least a first filtering process and a second filtering process,
wherein the method comprises:
applying a filter to processing target data to acquire filter application process data, applying a gain to the filter application process data to acquire gain application process data, and acquiring filtering process data from the gain application process data, in each of the plurality of times of filtering processes;
acquiring, in the first filtering process, the filter application process data using a reference filter determined according to an average of frequency characteristics of a plurality of types of image filtering processes, which are frequency characteristics of the plurality of types of image filtering processes determined according to a pixel position in the original image data; and
acquiring, in the second filtering process, the filter application process data using a variance filter determined according to a variance of the frequency characteristics of the plurality of types of image filtering processes, which are the frequency characteristics of the plurality of types of image filtering processes determined according to the pixel position in the original image data, and
wherein the gain applied to the filter application process data is determined according to the pixel position in the original image data, in each of the plurality of times of filtering processes.

23. A non-transitory computer-readable recording medium that stores a program that causes a computer to realize a function for performing an image filtering process including a plurality of times of filtering processes with respect to original image data to acquire processed image data, the program causing the computer to execute:
a process of applying a filter to processing target data to acquire filter application process data, a process of applying a gain to the filter application process data to acquire gain application process data, and a process of acquiring filtering process data from the gain application process data, in each of the plurality of times of filtering processes,
wherein the gain applied to the filter application process data is acquired based on a target frequency characteristic of the image filtering process determined according to a pixel position in the original image data, in each of the plurality of times of filtering processes,
storing gain table information obtained by associating candidate data of the gain applied to the filter application process data with the pixel position, in each of the plurality of times of filtering processes; and
specifying, with reference to the gain table information, the candidate data associated with the pixel position according to the target frequency characteristic of the image filtering process as the gain applied to the filter application process data in each of the plurality of times of filtering processes,
wherein applying the gain specified to the filter application process data to acquire the gain application process data in each of the plurality of times of filtering processes.

24. A non-transitory computer-readable recording medium that stores a program that causes a computer to realize a function for performing an image filtering process including a plurality of times of filtering processes with respect to original image data to acquire processed image data,
wherein the plurality of times of filtering processes include at least a first filtering process and a second filtering process,
wherein the program causes the computer to execute:
a process of applying a filter to processing target data to acquire filter application process data, a process of applying a gain to the filter application process data to acquire gain application process data, and a process of acquiring filtering process data from the gain application process data, in each of the plurality of times of filtering processes;
a process of acquiring, in the first filtering process, the filter application process data using a reference filter determined according to an average of frequency characteristics of the plurality of types of image filtering processes, which are the frequency characteristics of the plurality of types of image filtering processes determined according to a pixel position in the original image data; and a process of acquiring, in the second filtering process, the filter application process data using a variance filter determined according to a variance of the frequency characteristics of the plurality of types of image filtering processes, which are the frequency characteristics of the plurality of types of image filtering processes determined according to the pixel position in the original image data, and wherein the gain applied to the filter application process data is determined according to the pixel position in the original image data, in each of the plurality of times of filtering processes.

25. An image processing apparatus comprising:

a filtering process circuit that performs an image filtering process that includes a plurality of times of filtering processes with respect to original image data to acquire processed image data, wherein in each of the plurality of times of filtering processes, the filtering process circuit applies a filter to processing target data to acquire filter application process data, applies a gain to the filter application process data to acquire gain application process data, and acquires filtering process data from the gain application process data, wherein in each of the plurality of times of filtering processes, the gain applied to the filter application process data is acquired based on a target frequency characteristic of the image filtering process determined according to a pixel position in the original image data, and wherein the gain is acquired by fitting a frequency characteristic of the image filtering process to the target frequency characteristic of the image filtering process using a least squares method based on each frequency characteristic of the plurality of times of filtering processes.

26. The image processing apparatus according to claim 25, wherein the target frequency characteristic of the image filtering process is a frequency characteristic based on an optical characteristic.

27. The image processing apparatus according to claim 25, wherein weighting is performed based on a frequency in the least squares method.

28. The image processing apparatus according to claim 27, wherein a weight in a low-frequency band is set to be larger than a weight in a high-frequency band in the least squares method.

29. The image processing apparatus according to claim 27, wherein a weight in a high-frequency band is set to be larger than a weight in a low-frequency band according to an imaging condition when the original image data is acquired, in the least squares method.

30. The image processing apparatus according to claim 27, wherein the weight in the least squares method is determined according to the pixel position in the original image data.

31. The image processing apparatus according to claim 30, wherein the weight in the high-frequency band is large at a pixel position which is equal to or shorter than a first distance from the center of an image of the original image data, compared with a pixel position which is more distant than the first distance from the center of the image of the original image data, in the least squares method.

32. The image processing apparatus according to claim 30, wherein the weight in the low-frequency band is large at a pixel position which is more distant than a second distance from the center of an image of the original image data, compared with a pixel position which is equal to or shorter than the second distance from the center of the image of the original image data, in the least squares method.

33. The image processing apparatus according to claim 27, wherein the filtering process circuit uses a filter that makes the filtering process data equal to the processing target data in each of the plurality of times of filtering processes at a frequency where a ratio of the processed image data to the original image data is smaller than 1 in the target frequency characteristic of the image filtering process.

* * * * *